United States Patent
Pan et al.

(10) Patent No.: US 12,058,125 B2
(45) Date of Patent: Aug. 6, 2024

(54) REMOTE ATTESTATION MODE NEGOTIATION METHOD AND APPARATUS

(71) Applicant: HUAWEI TECHNOLOGIES CO., LTD., Guangdong (CN)

(72) Inventors: Wei Pan, Nanjing (CN); Liang Xia, Shenzhen (CN); Yulin Shi, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 278 days.

(21) Appl. No.: 17/560,581

(22) Filed: Dec. 23, 2021

(65) Prior Publication Data

US 2022/0116387 A1  Apr. 14, 2022

Related U.S. Application Data

(63) Continuation of application No. PCT/CN2020/097240, filed on Jun. 19, 2020.

(30) Foreign Application Priority Data

Jun. 24, 2019  (CN) .......................... 201910550444.5

(51) Int. Cl.
*H04L 9/32* (2006.01)
*G06F 21/57* (2013.01)
(Continued)

(52) U.S. Cl.
CPC ...... *H04L 63/0853* (2013.01); *H04L 41/0246* (2013.01); *H04L 63/0876* (2013.01); *H04L 63/205* (2013.01)

(58) Field of Classification Search
None
See application file for complete search history.

(56) References Cited

U.S. PATENT DOCUMENTS 10,033,805 B1   7/2018  Mutnuru
2015/0237502 A1*  8/2015  Schmidt ................. G06F 21/44
                                                     726/7

(Continued)

FOREIGN PATENT DOCUMENTS

CN   101043338 A   9/2007
CN   101344903 A   1/2009

(Continued)

OTHER PUBLICATIONS

H. Birkholz et al, Architecture and Reference Terminology for Remote Attestation Procedures, draft-birkholz-rats-architecture-01, Network Working Group Internet-Draft, Mar. 12, 2019, total 36 pages.

(Continued)

*Primary Examiner* — Christopher B Robinson
(74) *Attorney, Agent, or Firm* — WOMBLE BOND DICKINSON (US) LLP

(57) ABSTRACT

This application discloses a remote attestation mode negotiation method and apparatus. Before remote attestation is performed, automatic negotiation is performed between a to-be-verified network device and a server, so that the to-be-verified network device and the server can determine, through negotiation from remote attestation modes supported by both the to-be-verified network device and the server, a remote attestation mode used to subsequently perform remote attestation between the network device and the server, and there is no need to manually statically configure a remote attestation mode for the network device and the server, thereby greatly reducing labor costs of determining the remote attestation mode. In addition, when there are a large quantity of devices, the automatic remote attestation mode negotiation method also helps configure a remote attestation mode more flexibly.

20 Claims, 42 Drawing Sheets

(51) Int. Cl.
*H04L 9/40* (2022.01)
*H04L 41/0246* (2022.01)

(56) References Cited

U.S. PATENT DOCUMENTS

| | | | | |
|---|---|---|---|---|
| 2017/0289185 | A1* | 10/2017 | Mandyam | H04L 63/12 |
| 2017/0289197 | A1* | 10/2017 | Mandyam | H04L 63/0428 |
| 2018/0183609 | A1* | 6/2018 | Shaw | H04L 9/3271 |
| 2018/0341768 | A1* | 11/2018 | Marshall | G06F 21/53 |
| 2019/0036900 | A1* | 1/2019 | Zhang | H04L 63/08 |
| 2019/0045034 | A1* | 2/2019 | Alam | H04W 40/24 |
| 2019/0138294 | A1* | 5/2019 | Smith | H04L 63/12 |

FOREIGN PATENT DOCUMENTS

| | | |
|---|---|---|
| CN | 101610273 A | 12/2009 |
| CN | 102223420 A | 10/2011 |
| CN | 102685089 A | 9/2012 |
| CN | 103020533 A | 4/2013 |
| CN | 103220300 A | 7/2013 |
| CN | 103501303 A | 1/2014 |
| WO | 2018136087 A1 | 7/2018 |

OTHER PUBLICATIONS

M. Pritikin et al, Bootstrapping Remote Secure Key Infrastructures (BRSKI), draft-ietf-anima-bootstrapping-keyinfra-19, ANIMA WG Internet-Draft, Mar. 7, 2019, total 115 pages.
H. Birkholz et al, Reference Interaction Model for Challenge-Response-based Remote Attestation, draft-birkholz-rats-reference-interaction-model-00, TBD Internet-Draft, Mar. 12, 2019, total 9 pages.
M. Richardson et al, Constrained Voucher Artifacts for Bootstrapping Protocols, draft-ietf-anima-constrained-voucher-04, anima Working Group Internet-Draft, Jul. 4, 2019, total 49 pages.
K. Watsen et al, Secure Zero Touch Provisioning (SZTP), draft-ietf-netconf-zerotouch-29, NETCONF Working Group Internet-Draft, Jan. 15, 2019, total 111 pages.
Request for Comments: 8366, K. Watsen et al, A Voucher Artifact for Bootstrapping Protocols, May 2018, total 23 pages.
Ahmad-Reza Sadeghi et al, Extending IPsec for Efficient Remote Attestation, FC 2010 Workshops, LNCS 6054, 16 pages, XP019148479.
Jurgen Schonwalder et al, Network Configuration Management Using NETCONF and YANG, 2010 IEEE, 8 pages, XP011317502.
Ingo Bente et al, Interoperable Remote Attestation for VPN Environments (Work in Progress), INTRUST 2010, LNCS 6802, 14 pages, XP047375820.

* cited by examiner

| Type | Length | Value | Type | Length | Value | Type | Length | Value | ... |
|------|--------|-------|------|--------|-------|------|--------|-------|-----|
| TLV 1<br>Remote attestation<br>triggering mode | | | TLV 2<br>Remote attestation<br>direction | | | TLV 3<br>Quantity of remote<br>attestation parties | | | TLV ... |

FIG. 6

REMOTE ATTESTATION MODE NEGOTIATION METHOD AND APPARATUS

CROSS-REFERENCE TO RELATED APPLICATIONS

This application is a continuation of International Application No. PCT/CN2020/097240, filed on Jun. 19, 2020, which claims priority to Chinese Patent Application No. 201910550444.5, filed on Jun. 24, 2019. The disclosures of the aforementioned applications are hereby incorporated by reference in their entireties.

TECHNICAL FIELD

This application relates to the field of communications technologies, and in particular, to a remote attestation mode negotiation method and apparatus. A remote attestation mode is used to perform remote attestation on system trustworthiness of a network device.

BACKGROUND

For a network device with a trusted platform module (TPM), the TPM may perform trustworthiness measurement on a system status, such as a system startup process, a process running process, and a configuration file, on the network device, to obtain system trustworthiness measurement information. In a remote attestation scenario, the network device may send the system trustworthiness measurement information to a server, the server obtains a system trustworthiness attestation result based on the measurement information, and a user may view the attestation result by accessing the server.

As remote attestation on system trustworthiness is applied to an increasing quantity of scenarios, an increasing quantity of remote attestation modes may be used by the network device to remotely attest to system trustworthiness to the server. Different devices often support different remote attestation modes, and a same device often supports a plurality of remote attestation modes. Therefore, the network device and the server need to be statically configured to use a same remote attestation mode to perform remote attestation. However, when there are a large quantity of devices, the static configuration is not flexible enough and causes relatively high labor costs.

SUMMARY

Based on this, embodiments of this application provide a remote attestation mode negotiation method and apparatus, so that a network device and a server determine a remote attestation mode through negotiation, thereby configuring the remote attestation mode more flexibly, and greatly reducing labor costs.

According to a first aspect, an embodiment of this application provides a remote attestation mode negotiation method. In the method, a to-be-verified network device and a server determine, through automatic negotiation, a mode of performing remote attestation between the network device and the server. The method includes: A first network device sends first indication information to a second network device, where the first indication information is used to indicate a first remote attestation mode supported by the first network device. The second network device selects, from the first remote attestation mode based on the first indication information, a second remote attestation mode supported by the second network device. In addition, the second network device sends, to the first network device, second indication information used to indicate the second remote attestation mode. It may be understood that the remote attestation mode may be, for example, a mode in which measurement information is transmitted between the to-be-verified network device and the server, and a mode in which the server verifies the measurement information, in a remote attestation scenario.

It can be learned that, in this embodiment of this application, before remote attestation is performed, automatic negotiation is performed between the to-be-verified network device and the server, so that the to-be-verified network device and the server can determine, through negotiation from remote attestation modes supported by both the to-be-verified network device and the server, a remote attestation mode used to subsequently perform remote attestation between the network device and the server, and there is no need to manually statically configure a remote attestation mode for the network device and the server, thereby greatly reducing labor costs of determining the remote attestation mode. In addition, when there are a large quantity of devices, the automatic remote attestation mode negotiation method also helps configure a remote attestation mode more flexibly.

With reference to an embodiment of the first aspect, after it is determined through negotiation that a next remote attestation mode is the second remote attestation mode, this embodiment of this application may further include a process of performing remote attestation based on the second remote attestation mode. In an example, when the first network device is a to-be-verified network device Attester, the method may further include: The first network device sends first measurement information to the second network device in the second remote attestation mode, where the first measurement information is used to verify system trustworthiness of the first network device. It may be understood that a system trustworthiness attestation result of the first network device is used to determine whether the first network device is allowed to access a network. In one embodiment, if the attestation result indicates that a system is trustworthy, it is determined that the first network device is allowed to access the network; otherwise, it is determined that the first network device is not allowed to access the network. In another example, when the first network device is a verification server Verifier, the method may include: The first network device receives, in the second remote attestation mode, second measurement information sent by the second network device. The first network device verifies system trustworthiness of the second network device in the second remote attestation mode based on the second measurement information. It may be understood that a system trustworthiness attestation result of the second network device is used to determine whether the second network device is allowed to access a network. In still another example, when the first network device is a relying party, the method may include: The first network device receives, in the second remote attestation mode, third measurement information sent by the second network device. The first network device sends the third measurement information to a third network device, where the third measurement information is used to verify system trustworthiness of the second network device. It may be understood that a system trustworthiness attestation result of the second network device is used to determine whether the second network device is allowed to access a network. In this way, remote attestation can be effectively performed based on the remote attestation mode determined in this embodiment of this application, to accurately verify whether the to-be-verified network device is trustworthy, thereby ensuring trustworthiness of the network device accessed to the network.

With reference to another embodiment of the first aspect, before the first network device sends the first indication information to the second network device, the method may further include: The second network device sends third indication information to the first network device, where the third indication information is used to indicate the first network device to feed back the first indication information to the second network device.

With reference to still another embodiment of the first aspect, that a first network device sends first indication information to a second network device may be: If the remote attestation mode supported by the first network device changes, the first network device sends the first indication information to the second network device, where the first remote attestation mode is a changed remote attestation mode supported by the first network device. Alternatively, that a first network device sends first indication information to a second network device may be: The first network device periodically sends the first indication information to the second network device. In this way, remote attestation mode negotiation between the first network device and the second network device may be started through event trigger or periodic trigger.

With reference to yet another embodiment of the first aspect, to ensure that a remote attestation process can be accurately and effectively executed, reverse remote attestation mode renegotiation may be performed. In this case, the remote attestation mode negotiation method provided in this embodiment of this application may further include: The first network device receives fourth indication information sent by the second network device, where the fourth indication information is used to indicate a third remote attestation mode, and the third remote attestation mode is a remote attestation mode supported by the second network device. The first network device determines a fourth remote attestation mode from the third remote attestation mode, where the fourth remote attestation mode is a remote attestation mode supported by the first network device. The first network device sends fifth indication information to the second network device, where the fifth indication information is used to indicate the fourth remote attestation mode.

In this embodiment of this application, before the first network device receives the fourth indication information sent by the second network device, the method may further include: The first network device sends sixth indication information to the second network device, where the sixth indication information is used to indicate the second network device to feed back the fourth indication information to the first network device. In one case, that the first network device sends sixth indication information to the second network device may be: If the remote attestation mode supported by the first network device changes, the first network device sends the sixth indication information to the second network device. In another case, that the first network device sends sixth indication information to the second network device may be: The first network device periodically sends the sixth indication information to the second network device.

It may be understood that the first indication information and the second indication information in the first aspect are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

According to a second aspect, an embodiment of this application further provides a remote attestation mode negotiation method. The method is based on a second network device, and may include: The second network device receives first indication information sent by a first network device, where the first indication information is used to indicate a first remote attestation mode, and the first remote attestation mode is a remote attestation mode supported by the first network device. The second network device determines a second remote attestation mode from the first remote attestation mode, where the second remote attestation mode is a network device supported by the second network device. The second network device sends second indication information to the first network device, where the second indication information is used to indicate the second remote attestation mode.

With reference to a embodiment of the second aspect, in an example, when the second network device is a to-be-verified network device Attester, the method may further include: The second network device sends first measurement information to the first network device in the second remote attestation mode, where the first measurement information is used to verify system trustworthiness of the second network device. It may be understood that a system trustworthiness attestation result of the second network device is used to determine whether the first network device is allowed to access a network. In another example, when the second network device is a verification server Verifier, the method may include: The second network device receives, in the second remote attestation mode, second measurement information sent by the first network device. The second network device verifies system trustworthiness of the first network device in the second remote attestation mode based on the second measurement information. It may be understood that a system trustworthiness attestation result of the first network device is used to determine whether the first network device is allowed to access a network. In still another example, when the second network device is a relying party the method may include: The second network device receives, in the second remote attestation mode, third measurement information sent by the first network device. The second network device sends the third measurement information to a third network device in the second remote attestation mode, where the third measurement information is used to verify system trustworthiness of the first network device. It may be understood that a system trustworthiness attestation result of the first network device is used to determine whether the first network device is allowed to access a network.

With reference to another embodiment of the second aspect, the method may further include: The second network device sends third indication information to the first network device, where the third indication information is used to indicate the first network device to feed back the first indication information to the second network device.

With reference to still another embodiment of the second aspect, that the second network device sends third indication information to the first network device is: If the remote attestation mode supported by the second network device changes, the second network device sends the third indication information to the first network device. Alternatively, that the second network device sends third indication information to the first network device is: The second network device periodically sends the third indication information to the first network device.

With reference to yet another embodiment of the second aspect, the method may further include: The second network device sends fourth indication information to the first network device, where the fourth indication information is used to indicate a third remote attestation mode, and the third remote attestation mode is a remote attestation mode supported by the second network device. The second network device receives fifth indication information sent by the first network device, where the fifth indication information is used to indicate the fourth remote attestation mode, the fourth remote attestation mode is a remote attestation mode determined by the first network device from the third remote attestation mode, and the fourth remote attestation mode is a remote attestation mode supported by the first network device.

With reference to still yet another embodiment of the second aspect, before the second network device sends the fourth indication information to the first network device, the method further includes: The second network device receives sixth indication information sent by the first network device, where the sixth indication information is used to indicate the second network device to feed back the fourth indication information to the first network device.

With reference to a further embodiment of the second aspect, that the second network device sends fourth indication information to the first network device is: If the remote attestation mode supported by the second network device changes, the second network device sends the fourth indication information to the first network device, where the third remote attestation mode is a changed remote attestation mode supported by the second network device. Alternatively, that the second network device sends fourth indication information to the first network device is: The second network device periodically sends the fourth indication information to the first network device.

It may be understood that the first indication information and the second indication information are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

It should be noted that the method provided in the second aspect is applied to the second network device, and corresponds to the method applied to the first network device provided in the first aspect. Therefore, for various embodiments and technical effects of the method provided in the second aspect, refer to the descriptions of the method provided in the first aspect.

According to a third aspect, an embodiment of this application further provides a remote attestation mode negotiation apparatus, applied to a first network device, and including a first sending unit and a first receiving unit.

The first sending unit is configured to send first indication information to a second network device, where the first indication information is used to indicate a first remote attestation mode, and the first remote attestation mode is a remote attestation mode supported by the first network device.

The first receiving unit is configured to receive second indication information sent by the second network device, where the second indication information is used to indicate a second remote attestation mode, the second remote attestation mode is a remote attestation mode determined by the second network device from the first remote attestation mode, and the second remote attestation mode is a remote attestation mode supported by the second network device.

With reference to a embodiment of the third aspect, the apparatus further includes a second sending unit. The second sending unit is configured to send first measurement information to the second network device in the second remote attestation mode, where the first measurement information is used to verify system trustworthiness of the first network device. A system trustworthiness attestation result of the first network device is used to determine whether the first network device is allowed to access a network.

With reference to another embodiment of the third aspect, the apparatus further includes a second receiving unit and a first processing unit. The second receiving unit is configured to receive, in the second remote attestation mode, second measurement information sent by the second network device. The first processing unit is configured to verify system trustworthiness of the second network device in the second remote attestation mode based on the second measurement information. A system trustworthiness attestation result of the second network device is used to determine whether the second network device is allowed to access a network.

With reference to still another embodiment of the third aspect, the apparatus further includes a third receiving unit and a third sending unit. The third receiving unit is configured to receive, in the second remote attestation mode, third measurement information sent by the second network device. The third sending unit is configured to send the third measurement information to a third network device, where the third measurement information is used to verify system trustworthiness of the second network device. A system trustworthiness attestation result of the second network device is used to determine whether the second network device is allowed to access a network.

With reference to yet another embodiment of the third aspect, the apparatus may further include a fourth receiving unit. The fourth receiving unit is configured to: before the first indication information is sent to the second network device, receive third indication information sent by the second network device, where the third indication information is used to indicate the first network device to feed back the first indication information to the second network device.

With reference to still yet another embodiment of the third aspect, the first sending unit in the apparatus may be configured to: if the remote attestation mode supported by the first network device changes, send the first indication information to the second network device, where the first remote attestation mode is a changed remote attestation mode supported by the first network device. Alternatively, the first sending unit may be configured to periodically send the first indication information to the second network device.

With reference to a further embodiment of the third aspect, the apparatus may further include a fifth receiving unit, a second processing unit, and a fourth sending unit. The fifth receiving unit is configured to receive fourth indication information sent by the second network device, where the fourth indication information is used to indicate a third remote attestation mode, and the third remote attestation mode is a remote attestation mode supported by the second network device. The second processing unit is configured to determine a fourth remote attestation mode from the third remote attestation mode, where the fourth remote attestation mode is a remote attestation mode supported by the first network device. The fourth sending unit is configured to send fifth indication information to the second network device, where the fifth indication information is used to indicate the fourth remote attestation mode.

With reference to a still further embodiment of the third aspect, the apparatus may further include a fifth sending unit. The fifth sending unit is configured to send sixth indication information to the second network device before the fourth indication information sent by the second network device is received, where the sixth indication information is used to indicate the second network device to feed back the fourth indication information to the first network device. The fifth sending unit may be configured to: if the remote attestation mode supported by the first network device changes, send the sixth indication information to the second network device. Alternatively, the fifth sending unit may be configured to periodically send the sixth indication information to the second network device.

It may be understood that the first indication information and the second indication information are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

It should be noted that the apparatus provided in the third aspect is applied to the first network device, and corresponds to the method applied to the first network device provided in the first aspect. Therefore, for various embodiments and technical effects of the apparatus provided in the third aspect, refer to the descriptions of the method provided in the first aspect.

According to a fourth aspect, an embodiment of this application further provides a remote attestation mode negotiation apparatus, applied to a second network device, and including a first receiving unit, a first processing unit, and a first sending unit.

The first receiving unit is configured to receive first indication information sent by a first network device, where the first indication information is used to indicate a first remote attestation mode, and the first remote attestation mode is a remote attestation mode supported by the first network device.

The first processing unit is configured to determine a second remote attestation mode from the first remote attestation mode, where the second remote attestation mode is a network device supported by the second network device.

The first sending unit is configured to send second indication information to the first network device, where the second indication information is used to indicate the second remote attestation mode.

With reference to a embodiment of the fourth aspect, the apparatus may further include a second sending unit. The second sending unit is configured to send first measurement information to the first network device in the second remote attestation mode, where the first measurement information is used to verify system trustworthiness of the second network device. A system trustworthiness attestation result of the second network device is used to determine whether the first network device is allowed to access a network.

With reference to another embodiment of the fourth aspect, the apparatus may further include a second receiving unit and a second processing unit. The second receiving unit is configured to receive, in the second remote attestation mode, second measurement information sent by the first network device. The second processing unit is configured to verify system trustworthiness of the first network device in the second remote attestation mode based on the second measurement information. A system trustworthiness attestation result of the first network device is used to determine whether the first network device is allowed to access a network.

With reference to still another embodiment of the fourth aspect, the apparatus may further include a third receiving unit and a third sending unit. The third receiving unit is configured to receive, in the second remote attestation mode, third measurement information sent by the first network device. The third sending unit is configured to send the third measurement information to a third network device in the second remote attestation mode, where the third measurement information is used to verify system trustworthiness of the first network device. A system trustworthiness attestation result of the first network device is used to determine whether the first network device is allowed to access a network.

With reference to yet another embodiment of the fourth aspect, the apparatus may further include a fourth sending unit. The fourth sending unit is configured to send third indication information to the first network device, where the third indication information is used to indicate the first network device to feed back the first indication information to the second network device. The fourth sending unit may be configured to: if the remote attestation mode supported by the second network device changes, send the third indication information to the first network device. Alternatively, the fourth sending unit may be configured to periodically send the third indication information to the first network device.

With reference to still yet another embodiment of the fourth aspect, the apparatus may further include a fifth sending unit and a fourth receiving unit. The fifth sending unit is configured to send fourth indication information to the first network device, where the fourth indication information is used to indicate a third remote attestation mode, and the third remote attestation mode is a remote attestation mode supported by the second network device. The fourth receiving unit is configured to receive fifth indication information sent by the first network device, where the fifth indication information is used to indicate the fourth remote attestation mode, the fourth remote attestation mode is a remote attestation mode determined by the first network device from the third remote attestation mode, and the fourth remote attestation mode is a remote attestation mode supported by the first network device.

With reference to a further embodiment of the fourth aspect, the apparatus may further include a fifth receiving unit. The fifth receiving unit is configured to: before the fourth indication information is sent to the first network device, receive sixth indication information sent by the first network device, where the sixth indication information is used to indicate the second network device to feed back the fourth indication information to the first network device.

With reference to a still further embodiment of the fourth aspect, the fifth sending unit in the apparatus may be configured to: if the remote attestation mode supported by the second network device changes, send the fourth indication information to the first network device, where the third remote attestation mode is a changed remote attestation mode supported by the second network device. Alternatively, the fifth sending unit may be configured to periodically send the fourth indication information to the first network device.

It may be understood that the first indication information and the second indication information are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

It should be noted that the apparatus provided in the fourth aspect is applied to the second network device, and corresponds to the method applied to the second network device provided in the second aspect. Therefore, for various embodiments and technical effects of the apparatus provided in the fourth aspect, refer to the descriptions of the method provided in the second aspect.

According to a fifth aspect, an embodiment of this application further provides a network device. The network device includes a memory and a processor. The memory is configured to store program code. The processor is configured to run instructions in the program code, so that the network device performs the remote attestation mode negotiation method in any embodiment of the first aspect.

According to a sixth aspect, an embodiment of this application further provides a network device. The network device includes a memory and a processor. The memory is configured to store program code. The processor is configured to run instructions in the program code, so that the network device performs the remote attestation mode negotiation method in any embodiment of the second aspect.

According to a seventh aspect, an embodiment of this application further provides a computer program product. When the computer program product is run on a computer, the computer is enabled to perform the remote attestation mode negotiation method in any embodiment of the first aspect or the second aspect.

According to an eighth aspect, an embodiment of this application further provides a computer-readable storage medium. The computer-readable storage medium stores instructions, and when the instructions are run on a computer, the computer is enabled to perform the remote attestation mode negotiation method in any embodiment of the first aspect or the second aspect.

BRIEF DESCRIPTION OF DRAWINGS

To describe technical solutions in the embodiments of this application more clearly, the following briefly describes the accompanying drawings for describing the embodiments. It is clear that the accompanying drawings in the following description show merely some embodiments of this application, and a person of ordinary skill in the art may derive other drawings from these accompanying drawings.

FIG. 6 is another schematic diagram of describing a remote attestation mode according to an embodiment of this application;

DESCRIPTION OF EMBODIMENTS

Figure 1:
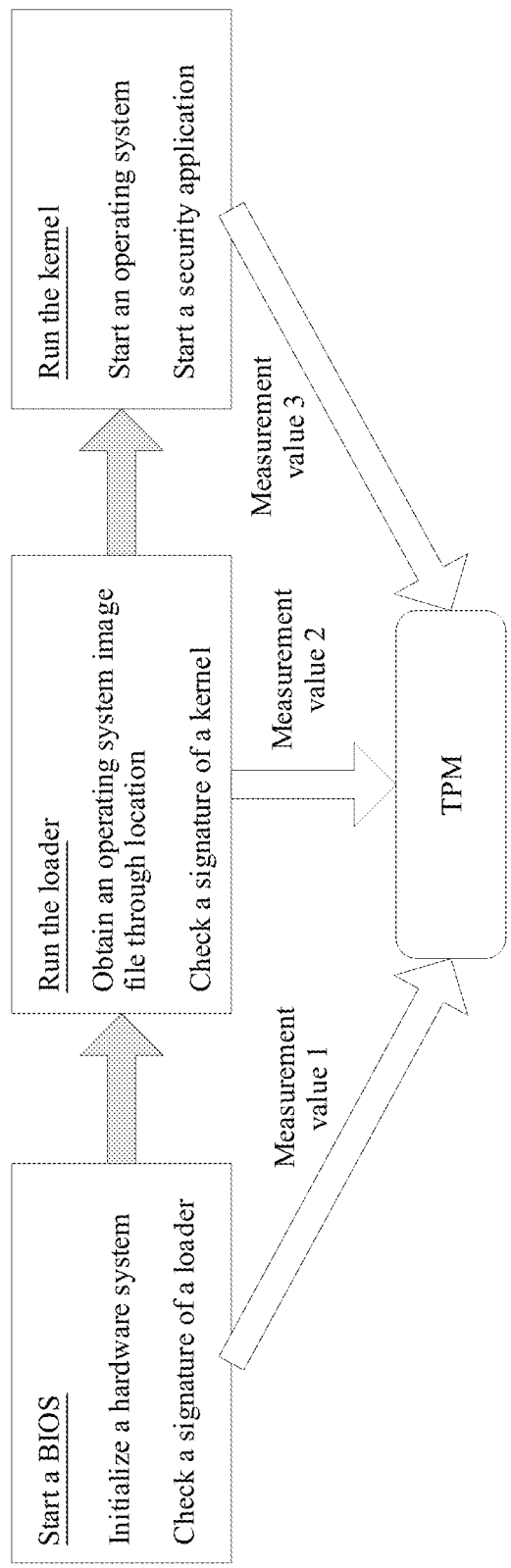
FIG. 1 is a schematic diagram of a structure of a trustworthiness attestation process during measurement startup according to an embodiment of this application.

With explosive growth of information and emergence of the internet of everything, a network includes an increasing quantity of network devices. To ensure a secure and reliable network environment, relatively high trustworthiness requirements need to be imposed on the network and the network devices. Therefore, strict trustworthiness verification is required for the network devices in the network.

It may be understood that the network device has a trusted platform module (TPM for short). The TPM has a trusted component (also referred to as a root of trust) that cannot be tampered with, is absolutely trusted, and does not require external maintenance, and is an indispensable part of trustworthiness verification. Generally, the TPM has three roots of trust: a root of trust for measurement (RTM for short), a root of trust for storage (RTS for short), and a root of trust for reporting (RTR for short). The RTM is used to perform integrity measurement on a network device to which the RTM belongs, and is a computing component that is controlled by using a core root of trust for measurement (CRTM for short). The CRTM is execution code used by the TPM to execute the RTM, and is generally stored in a basic input/output system (BIOS for short). Because measurement information is generated by the RTM, the RTM may be used as an origin of transmitting trustworthiness-related measurement information. The integrity measurement may be measurement performed on software on the network device in each phase during running. The RTS is a component used to store integrity measurement and a measurement sequence, and may include a component for storage encryption and an encryption key. The RTR is a component that generates a report through calculation, and can reliably report the measurement information stored in the RTS. Reliability of the RTR component can be ensured by using a signature. The RTM, the RTS, and the RTR may exist in the TPM and the BIOS of the network device, and an expert or a skilled person may determine, through evaluation, whether a system status of the network device meets a trustworthiness standard. It should be noted that the TPM and the BIOS are generally considered as absolutely trustworthy modules.

Verifying system trustworthiness of a network device may include: A TPM in the network device performs trustworthiness measurement on a system status such as a system startup process, a process running process, and a configuration file on the network device, to obtain system trustworthiness measurement information. The TPM compares the measurement information with a trustworthiness standard, to obtain a trustworthiness attestation result of the system status, that is, whether the system status of the network device is trustworthy. Therefore, a user may determine, by viewing the attestation result, whether the network device is trustworthy, and therefore determine a subsequent operation on the network device, for example, maintain an untrustworthy network device or allow a trustworthy network device to access a network.

In an example, to describe a system trustworthiness verification process of the network device more clearly, the following describes system trustworthiness verification in a startup process of the network device by using a startup model shown in FIG. 1 as an example.

It may be understood that, in the startup process, the TPM measures a key startup operation in the system startup process, and records a measurement value. For example, as shown in FIG. 1, a process in which the network device performs measurement startup may include: Operation 1: A root of trust in the TPM provides a trust basis for a BIOS. Operation 2: The BIOS is started, to initialize a hardware system, check, by invoking the root of trust in the TPM, a signature of a loader to be run in a next phase, measure the loader and configuration information, and record a measurement value in the TPM. Operation 3: The loader is run, to obtain an operating system image file through location, check, by invoking the root of trust in the TPM, a signature of an operating system kernel to be run in a next phase, measure the kernel, and record a measurement value in the TPM. Operation 4: The kernel is run, to start an operating system, a security application, and the like, measure configuration information, and record a measurement value in the TPM. The foregoing startup process may be referred to as a measurement startup process. The measurement startup process is characterized by the following: In the system startup process, only measurement is performed and a measurement value is recorded, and the startup process is not affected, that is, startup is not stopped because a measurement value corresponding to a startup operation is untrustworthy.

When system startup is completed, in one case, the network device may perform local verification, that is, the network device generates a report based on the measurement value recorded in the TPM and performs trustworthiness verification, to obtain a attestation result. In another case, the network device may perform remote attestation, that is, the network device generates a report based on the measurement value recorded in the TPM, and sends the report to a server, and the server performs trustworthiness verification based on the received report, to obtain a attestation result. Alternatively, the TPM performs trustworthiness verification on a generated report to obtain a attestation result, and sends the attestation result to a server.

Currently, with an increase of to-be-verified network devices, remote attestation is easier to monitor device integrity in a centralized manner compared with local attestation. Therefore, remote attestation on system trustworthiness of the network device is applied to more scenarios. It may be understood that the remote attestation means that a network device on which trustworthiness verification is to be performed sends measurement information to a server, and the server performs, based on the received measurement information, remote attestation on the network device on which trustworthiness verification is to be performed. For example, the remote attestation may include: The server performs remote attestation on measurement information generated in a startup process of the network device. Alternatively, the server performs remote attestation on measurement information generated in a process of performing dynamic measurement on a dynamically changing object such as a process in a running process of the network device. Alternatively, the server performs remote attestation on measurement information generated in a process of performing static measurement on static data generated in the network device, such as configuration information or a file.

Figure 2:
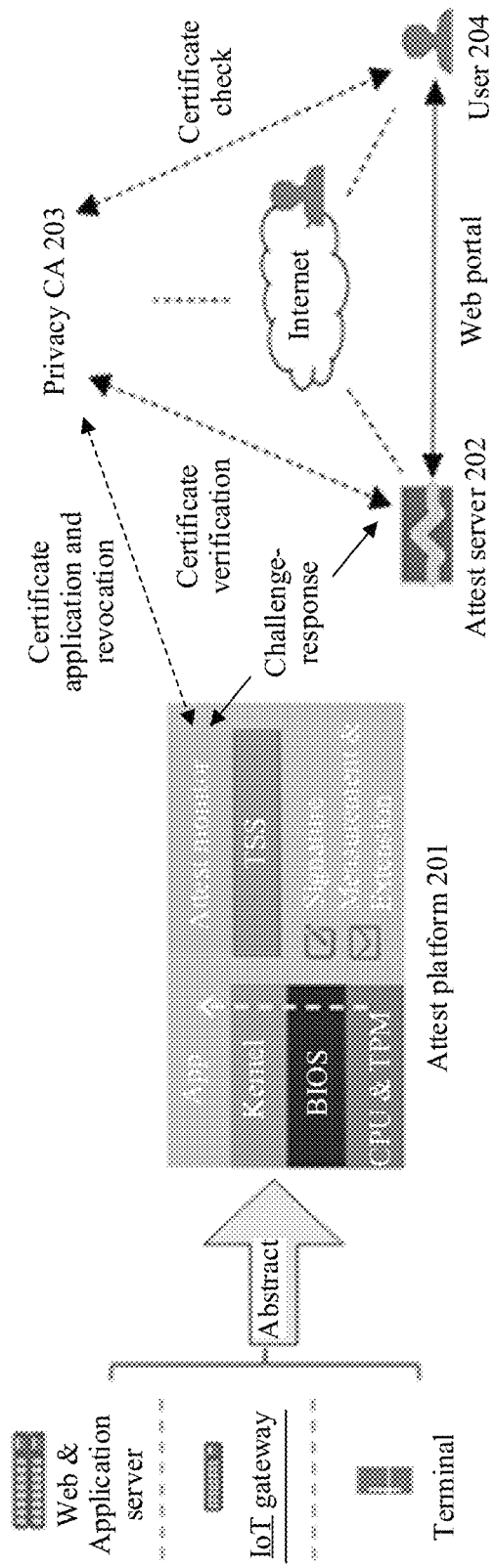
FIG. 2 is a schematic diagram of an architecture of remote attestation in an application scenario according to an embodiment of this application.

A network model shown in FIG. 2 shows a scenario of remote attestation. The scenario includes an attest platform 201, an attest server 202, a privacy certificate authority (CA for short) 203, and a user 204. The attest platform 201 may be a network device on which remote attestation needs to be performed, for example, a terminal, an internet of things (IoT for short) gateway, a network, or an application server. The attest platform 201 may include four parts: a central processing unit (CPU for short) & a TPM, a BIOS, a kernel, and an application (app for short), and is used to calculate and record an integrity value.

During implementation, the attest platform 201 may securely send security attributes (for example, security attributes such as software and hardware integrity values, configuration information, and a node status) to the attest server 202 in a particular format and an interaction process by using a challenge-response interaction mechanism, and the attest server 202 performs remote attestation according to a particular policy, to finally attest whether the attest platform 201 is trustworthy. In addition, to ensure device and communication security in the entire remote attestation interaction process, a certificate mechanism (including certificate application and revocation) needs to be pre-deployed to support operations such as certificate verification and check in the interaction process. In one embodiment, the attest platform 201 encrypts and signs, by using a certificate obtained from the privacy CA 203, an integrity value recorded by the attest platform 201. The attest server 202 decrypts received information, and interacts with the privacy CA 203 to verify whether the certificate of the attest platform 201 is valid. The user 204 may check the certificate issued externally by the privacy CA 203, and check a result of remote attestation performed by the attest server 202 on the attest platform 201.

Figure 3:
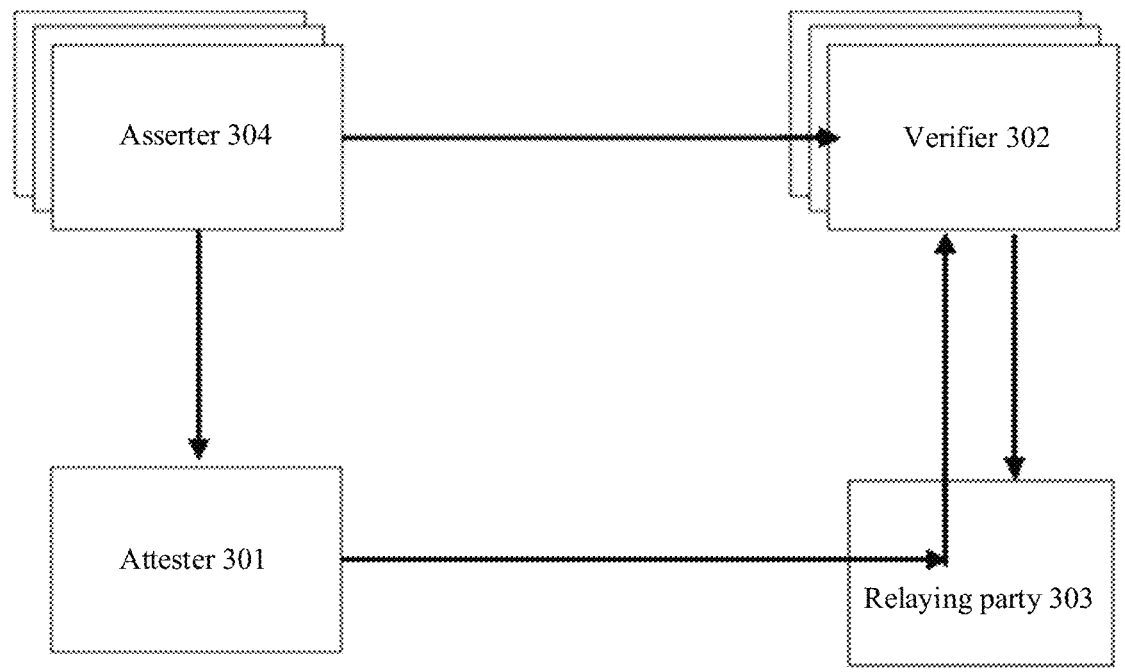
FIG. 3 is a schematic diagram of an architecture of remote attestation in another application scenario according to an embodiment of this application.

For example, the Internet Engineering Task Force (IETF for short) Remote Attestation Procedures (RATS for short) Working Group defines a remote attestation architecture shown in FIG. 3, and defines that remote attestation is performed in a challenge-response mode of a network configuration protocol (NETCONF for short). Remote attestation-related information may be described by using a Yet Another Next Generation (YANG for short) data model. It should be noted that, for related descriptions in this example, refer to related descriptions in draft-birkholz-rats-architecture-01 and draft-birkholz-rats-reference-interaction-model-00.

As shown in FIG. 3, a remote attestation system 300 shown in this scenario includes a to-be-attested device Attester 301, a verification server Verifier 302, a relying party 303, and a supply chain entity Asserter 304. The attester 301 is a to-be-verified device or application in the remote attestation system 300, and may be a switch, a router, a terminal, a personal computer (PC for short), the IoT, an application, or the like. The verifier 302 may be a server with a remote attestation function. The relying party 303 may be, for example, a network management device. In the remote attestation system 300, the relaying party 303 may simultaneously communicate with the attester 301 and the verifier 302 to exchange information during remote attestation. The supply chain entity Asserter 304 may be, for example, a network device of a device manufacturer. A process of implementing remote attestation may include: S11: The attester 301 calculates and collects various pieces of integrity attestation information of the attester 301 by using a root of trust, and provides the integrity attestation information for the relying party 303 as measurement information. S12: The relying party 303 receives the measurement information that is sent by the attester 301 and that is to be used for remote attestation, and verifies an identity of the attester 301 through signature authentication. S13: After the verification succeeds, the relying party 303 signs, by using a certificate of the relying party 303, the measurement information that is sent by the attester 301 and that is to be used for remote attestation, and sends the signature to the verifier 302. S14: The verifier 302 verifies the measurement information provided by the attester 301, and sends a attestation result to the relying party 303. Before S11 to S14, the asserter 304 is configured to provide configuration information such as an initial device ID for the attester 301, where the configuration information includes an integrity attestation reference value or standard value of the attester 301. The asserter 304 is further configured to send the reference value or standard value to the verifier 302, so that the verifier 302 can perform remote attestation. It should be noted that the attester 301 may correspond to the attest platform 201 in FIG. 2, and the verifier 302 may correspond to the attest server 202 in FIG. 2.

With wide application of remote attestation, a plurality of remote attestation modes are proposed to meet evolving network scenarios and requirements. For example, remote attestation triggering modes further include a periodic cyclic triggering mode and an event triggering mode in addition to a challenge-response mode. A same device usually supports a plurality of remote attestation modes, and different devices usually support different remote attestation modes. Therefore, to ensure accurate execution of remote attestation, a network device and a server need to perform remote attestation in a same remote attestation mode. In other words, before the server provides remote attestation for the network device, a remote attestation mode to be used by the server and the network device needs to be determined. For example, the network device supports remote attestation modes 1, 2, and 3, and the server supports remote attestation modes 2, 4, and 6. Before the server and the network device perform remote attestation, a remote attestation mode to be used by the server and the network device needs to be determined: the remote attestation mode 2.

Generally, a skilled person statically configures a remote attestation mode on the server and the network device manually or in advance, so that the server and the network device perform remote attestation in the configured remote attestation mode.

However, when a quantity of remote attestation modes still increases and a quantity of devices is relatively large, statically configuring a remote attestation mode causes a sharp increase in labor costs, and makes a process of determining the remote attestation mode not flexible and fast enough.

Based on this, to adapt to a network scenario in which a quantity of devices is relatively large, in the embodiments of this application, before remote attestation is performed, automatic negotiation is performed between a to-be-verified network device and a server, so that the to-be-verified network device and the server can determine, through negotiation from remote attestation modes supported by both the to-be-verified network device and the server, a remote attestation mode used to subsequently perform remote attestation between the network device and the server, and there is no need to manually statically configure a remote attestation mode for the network device and the server, thereby greatly reducing labor costs of determining the remote attestation mode. In addition, when there are a large quantity of devices, the automatic remote attestation mode negotiation method also helps configure a remote attestation mode more flexibly.

It may be understood that the scenarios shown in FIG. 2 and FIG. 3 are merely examples of scenarios provided in the embodiments of this application, and the embodiments of this application are not limited to the scenarios.

With reference to the accompanying drawings, the following describes in detail a implementation of a remote attestation mode negotiation method in the embodiments of this application by using embodiments.

The remote attestation mode negotiation method provided in the embodiments of this application may be as follows: A to-be-attested device Attester negotiates with a verification server Verifier/relying party. The negotiation may be initiated by the attester or the verifier/relaying party. It should be noted that the relaying party is separately connected to the verifier and the attester, and is used as a bridge for information exchange between the verifier and the attester. The relaying party and the verifier may be disposed in a same network device, or may be two independently disposed network devices.

Figure 4:
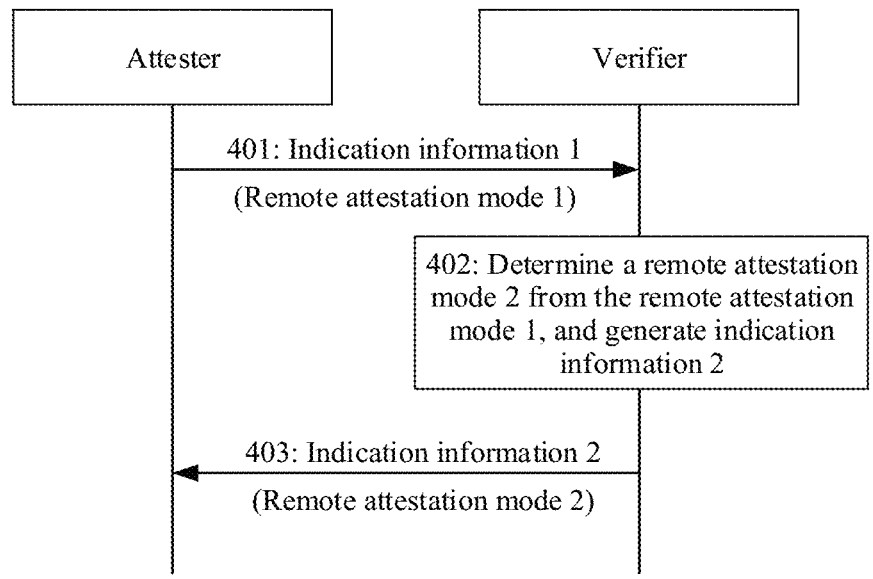
FIG. 4 is a signaling flowchart of a remote attestation mode negotiation method according to an embodiment of this application.

For the negotiation initiated by the attester to the verifier, refer to FIG. 4. The remote attestation mode negotiation method provided in the embodiments of this application may include operation 401 to operation 403.

Operation 401: The attester sends indication information 1 to the verifier, where the indication information 1 is used to indicate a remote attestation mode 1, and the remote attestation mode 1 is a remote attestation mode supported by the attester.

During implementation, when the attester needs to initiate remote attestation mode negotiation, the attester may generate the indication information 1 based on the remote attestation mode 1 supported by the attester, and send the indication information 1 to the verifier.

The remote attestation mode may be a mode in which measurement information is transmitted between the to-be-remotely-attested network device and the server, and a mode in which the server verifies, based on the measurement information, whether the to-be-remotely-attested network device is trustworthy. The remote attestation mode 1 supported by the attester may include one or more remote attestation modes.

In the embodiments of this application, remote attestation modes may be defined and classified, so that the remote attestation modes are standardized, thereby more conveniently implementing automatic remote attestation mode negotiation.

It may be understood that there may be the following 10 types of remote attestation modes:

(1) Whether remote attestation is supported (2) Remote attestation triggering mode, which may include: (a) Challenge-response (Challenge-Response) mode: During remote attestation, the Relying Party or the server Verifier initiates an integrity challenge, and the network device Attester responds to the challenge and returns integrity information. Remote attestation is performed once only after the network device Attester is started. (b) Periodic cyclic triggering mode: The relying party or the verifier periodically initiates a remote attestation request to the attester at a specified interval. The attester responds to the request and returns currently recorded integrity information. (c) Event triggering mode: When an event such as restart, active/standby switchover, or board removal occurs on the attester, the attester actively notifies the relying party or the verifier to perform remote attestation again.

(3) Remote attestation direction, which may include: (a) Unidirectional attestation: The attester trusts in an identity and integrity of the relying party and those of the verifier, and only the relying party and the verifier verify an identity and integrity of the attester. (b) Bidirectional attestation: The attester does not trust in an identity and integrity of the relying party and those of the verifier. The relying party and the verifier verify an identity and integrity of the attester, and the attester also needs to verify the identity and the integrity of the relying party and those of the verifier.

(4) Quantity of remote attestation parties, which may include: (a) Single attestation: The verifier and a single attester may perform remote attestation to verify an identity and integrity of the attester. (b) Batch attestation: The verifier and a plurality of attesters perform remote attestation at the same time to verify identities and integrity of the plurality of attesters.

(5) Remote attestation openness, which may include: (a) Explicit remote attestation: Remote attestation content carries identity information of the attester, and the verifier may identify the identity of the to-be-verified attester. (b) Anonymous remote attestation: Remote attestation content does not carry identity information of the attester or carries processed identity information of the attester, and the verifier cannot identify the identity of the to-be-verified attester.

(6) Remote attestation check mode, which may include: (a) The attester reports a attestation result to the verifier after local check: The attester may directly report the attestation result to the verifier for verification based on an integrity report of the local check. (b) The verifier checks evidence reported by the attester: The attester only reports an original integrity report, and the verifier verifies integrity.

(7) Remote attestation content, which may include: (a) Hardware integrity value, that is, a set of measurement values generated by a hardware driver (for example, a startup driver) in the attester. (b) Software integrity value, that is, a set of measurement values generated by a dynamically changing object such as a process running in the attester. (c) Configuration information, that is, static data generated in the attester, such as configuration information and a file, and information generated during static measurement.

(8) Signature algorithm (9) Maximum remote attestation message length

(10) Remote attestation capability renegotiation, which may include: (a) Whether renegotiation is performed. (b) A renegotiation mode is periodic renegotiation or single renegotiation. (c) Renegotiation interval.

The remote attestation content in (7) may be applied to a scenario of a plurality of verifiers. The attester negotiates with different verifiers about different remote attestation content.

The remote attestation mode may include a remote attestation mode corresponding to at least one option of each of the foregoing 10 types. (1) to (10) indicate the 10 types of remote attestation modes, and (a), (b), or (c) in each type indicates one option in the type. For example, a remote attestation mode may include: (1) Remote attestation is supported. (2) Remote attestation triggering mode: (b) Periodic cyclic triggering mode. (3) Remote attestation direction: (a) Unidirectional attestation. (4) Amount of remote attestation: (a) Single attestation. (5) Remote attestation openness: (a) Explicit attestation. (6) Remote attestation check mode: (b) The verifier checks evidence reported by the attester. (7) Remote attestation content: (a) Hardware integrity value. (b) Software integrity value. (8) Signature algorithm: X. (9) Remote attestation message length: Y.

It should be noted that the foregoing manner of classifying the remote attestation modes is merely an example. The classification of the remote attestation modes in the embodiments of this application is not limited to the foregoing example. Classification may alternatively be performed in another manner based on an actual requirement, or may not be performed, that is, the remote attestation mode indicates only a option supported by the network device.

It should be noted that the remote attestation triggering mode in (2) is a triggering mode supported by a device in a remote attestation process. For example, remote attestation can be triggered in a challenge-response mode. However, subsequent remote attestation mode negotiation triggering conditions shown in FIG. 8 to FIG. 11, FIG. 13 to FIG. 16, FIG. 18 to FIG. 21, or FIG. 23 to FIG. 26 are different, and a remote attestation mode renegotiation triggering mode may include: The remote attestation mode supported by the device changes, and a remote attestation mode between devices is periodically renegotiated.

For example, if the attester and the verifier negotiate with each other by using a NETCONF protocol, a remote attestation mode may be described by using a YANG data model, and the YANG data model may include a query part of the remote attestation mode. The query part of the YANG data model may be used to describe the remote attestation mode 1 supported by the attester in operation 401, that is, the query part of the remote attestation mode is as follows:

```
module: remote-attestation-capability //Remote attestation mode
   +--ro remote-attestation-capability-query //Query part of the remote attestation
mode
        +--ro remote-attestation-enable bool //Whether remote attestation is enabled
        +--ro attestation-model-capability //Remote attestation triggering mode
        | +--ro challenge-response-attestation bool//Whether a challenge-response
```

```
mode is supported
    | +--ro periodic-attestation bool//Whether a periodic cyclic triggering mode is
supported
    | +--ro event-trigger-attestation bool//Whether an event triggering mode is
supported
    +--ro attestation-direction-capability //Remote attestation direction
    | +--ro unidirectional bool//Unidirectional attestation
    | +--ro bidirectional bool//Bidirectional attestation
    +--ro attestation-number-capability //Amount of remote attestation
    | +-ro single-attestation bool//Single attestation
    | +--ro batch-attestation bool//Batch attestation
    +--ro attestation-privacy-capability //Remote attestation openness
    | +--ro explicit-attestation bool//Explicit remote attestation
    | +--ro anonymous-attestation bool//Anonymous remote attestation
    +--ro attestation-validate-capability //Remote attestation check mode
    | +--ro attester-local-validate bool//The attester performs reporting after local
check
    | +--ro verifier-validate bool//The verifier performs check
    +--ro attestation-content-capability //Remote attestation content
    | +--ro hardware-integrity bool//Hardware integrity value
    | +--ro software-integrity bool//Software integrity value
    | +--ro configuration-information bool//Configuration information
    | +--ro ...
    +--ro sign-algorithm-capability //Signature algorithm
    | +--ro SHA-256    bool
    | +--ro SHA-512    bool
    | +--ro ...
    +--ro message-length-capability //Remote attestation message length
    | +--ro minimal-length   integer
    | +--ro maximal-length   integer
    +--ro re-negotiation-capability //Remote attestation renegotiation mode
       +--ro re-negotiation-enable    bool
       +--ro periodic-re-negotiation-enable    bool
       +--ro re-negotiation-time-interval   integer
    +--ro ...
```

An option may mark a range of the remote attestation message length in the remote attestation mode by using a value of an integer variable integer, or may mark, by using a value of a boolean variable bool, whether the option is supported in the remote attestation mode. For example, the remote attestation triggering mode is used as an example for description. If a remote attestation mode supports the challenge-response mode in the remote attestation triggering mode in (2), the following may be described by using a YANG data model:

```
+--ro attestation-model-capability//Remote attestation
    triggering mode
   | +--ro challenge-response-attestation true//The challenge-response mode is supported
   | +--ro periodic-attestation false//The periodic cyclic triggering mode is not supported
   | +--ro event-trigger-attestation false//The event triggering mode is not supported
```

In addition, in addition to the NETCONF protocol, the attester and the verifier may also perform remote attestation mode negotiation by using another protocol. In this case, the indication information 1 in operation 401 may also be described by using a data model corresponding to the another protocol.

It may be understood that the indication information 1 may be carried in a message payload of a packet. Therefore, in operation 401, the attester sends the packet that carries the indication information 1 to the verifier. In this case, after receiving the packet, the verifier may obtain the indication information 1 by reading the message payload of the packet. The message payload of the packet may include a payload type and payload content, a value of the payload type may indicate that the message payload carries related information of all corresponding remote attestation modes, and a value of the payload content may indicate the remote attestation mode 1, that is, the remote attestation mode supported by the attester. The message payload may be used to carry the indication information 1.

For example, the message payload of the packet may be type-length-value (TLV for short). In this case, the indication information 1 may be carried in the TLV. In this case, there are two modes in which the TLV is used to carry the indication information 1. In a first mode, a remote attestation mode included in the remote attestation mode 1 is carried in one piece of TLV to describe and transmit the indication information 1. In a second mode, the remote attestation mode 1 is carried in a plurality of pieces of TLV for description and transmission.

In the first mode in which the TLV is used to carry the indication information 1, a type field in the TLV indicates that information carried in the TLV is related information of a remote attestation mode; a length field indicates a quantity of bytes of the TLV or a quantity of bytes of a value field in the TLV, and is determined according to an actually used transmission protocol; and the value field indicates the remote attestation mode 1.

Figure 5:
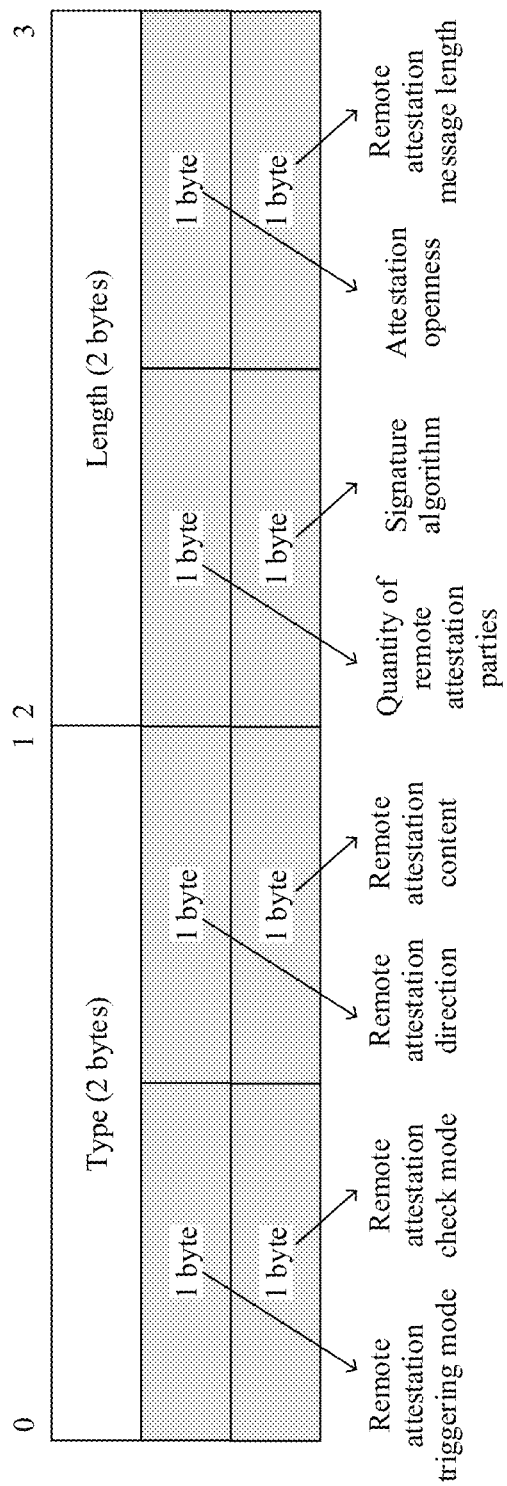
FIG. 5 is a schematic diagram of describing a remote attestation mode according to an embodiment of this application.

In one case, the value field indicates a remote attestation mode, subfields in the value field may be used to indicate different remote attestation modes, and each subfield corresponds to one type. One subfield may be a byte (byte) or a bit (bit). For example, as shown in FIG. 5, one byte (that is, eight bits) in the value field (a gray part in FIG. 5) is used as one subfield to indicate the last eight types of remote attestation modes. A value of eight bits of each byte is used to indicate an option supported by the attester in this type. For example, a first byte of the value field indicates a remote attestation triggering mode. If a value of the byte is equal to 00000001, it indicates that the attester supports a challenge-response mode. If the value of the byte is equal to 00000010, it indicates that the attester supports a periodic cyclic triggering mode. If the value of the byte is 00000100, it indicates that the attester supports an event triggering mode. If the value of the byte is 00000011, it indicates that the attester supports both the challenge-response mode and the periodic cyclic triggering mode.

In another case, the value field indicates a remote attestation mode, or classification may not be performed, and each bit in the value field is used to indicate whether the attester supports an option corresponding to the bit. For example, if a value of a first bit in the value field is equal to 0, it indicates that the attester does not support a challenge-response mode. If the value of the first bit is equal to 1, it indicates that the attester supports the challenge-response mode. Similarly, if a value of a second bit in the value field is equal to 0, it indicates that the attester does not support a periodic cyclic triggering mode. If the value of the second bit is equal to 1, it indicates that the attester supports the periodic cyclic triggering mode. By analogy, a remote attestation mode is indicated by using an option corresponding to each bit.

In the second mode in which the TLV is used to carry the indication information 1, one piece of TLV may be used to indicate one type of remote attestation mode, or an option in the remote attestation mode.

In one case, one piece of TLV may indicate one type of remote attestation mode. As shown in FIG. 6, a type field in the TLV indicates one type of remote attestation mode 1 corresponding to the TLV. For example, a type field in TLV 1 in FIG. 6 indicates that the TLV 1 carries a remote attestation triggering mode, and a type field in TLV 2 in FIG. 6 indicates that the TLV 2 carries a remote attestation direction. A length field in each piece of TLV indicates a quantity of bytes of the TLV or a quantity of bytes of a value field in the TLV, and is determined according to an actually used transmission protocol. The value field indicates a option supported in the remote attestation mode 1.

In another case, one piece of TLV may indicate an option in a remote attestation mode. A type field in the TLV indicates an option in a remote attestation mode 1 corresponding to the TLV. For example, a type field in TLV 1 in FIG. 6 indicates whether a challenge-response mode is supported, and a type field in TLV 2 in FIG. 6 indicates whether a periodic cyclic triggering mode is supported. A length field in the TLV indicates a quantity of bytes of the TLV or a quantity of bytes of a value field in the TLV, and is determined according to an actually used transmission protocol. The value field indicates whether the remote attestation mode 1 supports the option. For example, if a value of a value field in the TLV 1 in FIG. 6 is equal to 0, it indicates that the remote attestation mode 1 does not support the challenge-response mode. If a value of a value field in the TLV 2 in FIG. 6 is equal to 1, it indicates that the remote attestation mode 1 supports the periodic cyclic triggering mode.

It should be noted that, in the foregoing two modes in which the TLV is used to carry the indication information 1, standard TLV is used to carry the indication information 1. However, in addition to a standard TLV format, all variant formats of the TLV format (for example, TLV variant formats of some fields are added to the original TLV) can be used in the indication information 1 in the embodiments of this application, provided that a message type Type and a message value Value are included.

For example, assuming that the remote attestation mode 1 supported by the attester indicates that the attester supports both the challenge-response mode and the event triggering mode, it may be considered that the remote attestation mode 1 includes at least two remote attestation modes, that is, the attester supports at least two remote attestation modes.

It may be understood that, in operation 401, the attester sends the indication information 1 to the verifier. In one case, the attester may add the indication information 1 to a remote attestation mode negotiation request, and send the remote attestation mode negotiation request to the verifier. After receiving the remote attestation mode negotiation request, the verifier determines that the attester initiates remote attestation mode negotiation. In addition, the verifier may obtain the indication information 1 by parsing the remote attestation mode negotiation request, and determine the remote attestation mode 1 supported by the attester. In another case, after the verifier sends a query request message or a negotiation notification message to the attester, the attester adds the indication information 1 to a query feedback message or a negotiation notification feedback message, and returns the query feedback message or the negotiation notification feedback message to the verifier. In this case, the verifier may obtain the indication information 1 by parsing the query feedback message or the negotiation notification feedback message, to determine the remote attestation mode 1 supported by the attester.

It should be noted that the indication information 1 may be described by using the foregoing YANG data model or TLV.

Operation 402: The verifier determines a remote attestation mode 2 from the remote attestation mode 1, and generates indication information 2, where the indication information 2 is used to indicate the remote attestation mode 2 supported by the verifier.

During implementation, after receiving the indication information 1 from the attester, the verifier may obtain the remote attestation mode 1 from the indication information 1, to learn of the remote attestation mode supported by the attester on which remote attestation is to be performed. In this case, the verifier may determine, from the remote attestation mode 1 based on the remote attestation mode supported by the verifier and a security requirement of the verifier, the remote attestation mode 2 used to subsequently perform remote attestation with the attester. In addition, the verifier may further generate the indication information 2 based on the remote attestation mode 2, so that the verifier notifies the attester of the remote attestation mode 2 determined by the verifier. The security requirement may be, for example, a priority of a remote attestation mode defined on the verifier.

It should be noted that the indication information 2 may also be described by using the foregoing YANG data model, or may be carried in the TLV for indication. For a implementation, refer to related descriptions in operation 401. The following describes the indication information 2 by using the YANG data model as an example. The YANG data model may include a configuration (that is, a determining) part of a remote attestation mode. The configuration part of the YANG data model may be used to describe the remote attestation mode 2 determined by the verifier in operation 402, that is, the configuration part of the remote attestation mode is as follows:

+--rw remote-attestation-capability-config//Configuration part of the remote attestation mode
  +--rw remote-attestation-enable bool//Whether remote attestation is enabled
  +--rw attestation-model attestation-model-type//Determined remote attestation triggering mode

```
+--rw attestation-direction attestation-direction-type//
    Determined remote attestation direction
+--rw attestation-number attestation-number-type//De-
    termined amount of remote attestation
+--rw attestation-privacy attestation-privacy-type//De-
    termined remote attestation openness
+--rw attestation-validate attestation-validate-type//De-
    termined remote attestation check mode
+--rw attestation-content attestation-content-type//De-
    termined remote attestation content
+--rw sign-algorithm sign-algorithm-type//Determined
    signature algorithm
+--rw message-length integer//Determined remote
    attestation message length
+--rw re-negotiation re-negotiation-type//Determined
    renegotiation mode
```

Operation 403: The verifier sends the indication information 2 to the attester.

It may be understood that the verifier sends the indication information 2 to the attester. In one case, if the indication information 1 is carried in a remote attestation mode negotiation request, the verifier may add the indication information 2 to a remote attestation mode negotiation reply message, and send the remote attestation mode negotiation reply message to the attester. After receiving the remote attestation mode negotiation reply message, the attester may obtain the indication information 2 by parsing the remote attestation mode negotiation reply message, and determine the remote attestation mode 2 used to subsequently perform remote attestation with the verifier. In another case, if the indication information 1 is carried in a query feedback message or a negotiation notification feedback message, the verifier may add the indication information 2 to a configuration message or a negotiation decision message, and send the configuration message or the negotiation decision message to the attester. When the attester returns a configuration feedback message or a negotiation decision feedback message, the negotiation is completed.

It should be noted that the indication information 2 may be described by using the foregoing YANG data model or TLV.

In this way, before remote attestation is performed, the to-be-verified attester actively initiates negotiation with the verifier about a remote attestation mode used to perform remote attestation between the to-be-verified attester and the verifier, to determine, from remote attestation modes supported by both the to-be-verified attester and the verifier, a remote attestation mode used to subsequently perform remote attestation between the to-be-verified attester and the verifier, and there is no need to manually statically configure a remote attestation mode for the attester and the verifier, thereby greatly reducing labor costs of determining the remote attestation mode. In addition, when there are a large quantity of devices, the method for automatically negotiating a remote attestation mode also helps configure the remote attestation mode more flexibly.

Figure 7:
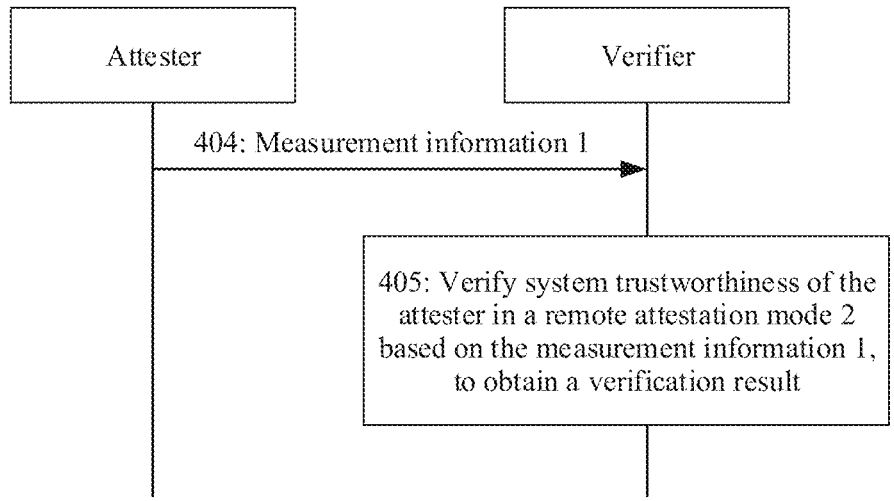
FIG. 7 is a signaling flowchart of remote attestation according to an embodiment of this application.

After the embodiment shown in FIG. 4, remote attestation may be performed between the attester and the verifier in the remote attestation mode 2. As shown in FIG. 7, after operation 403, the method in the embodiments of this application may further include the following operations.

Operation 404: The attester sends measurement information 1 to the verifier in the remote attestation mode 2.

It may be understood that the measurement information 1 may be information that is generated in a running process of the attester and that is used to verify system trustworthiness of the attester. Alternatively, the measurement information 1 may be a attestation result obtained after the attester performs trustworthiness verification on system trustworthiness information generated by the attester in a running process.

Operation 405: The verifier verifies system trustworthiness of the attester in the remote attestation mode 2 based on the measurement information 1, to obtain a attestation result.

It may be understood that the verifier determines, in the remote attestation mode 2, whether an exception occurs in the measurement information 1, for example, whether some measurement parameters do not meet a standard or whether a measurement parameter is missing. If yes, the verifier may determine that a system of the attester is untrustworthy. If no, the verifier may determine that the system of the attester is trustworthy, and obtain a attestation result based on the determined system trustworthiness.

Figure 43A:
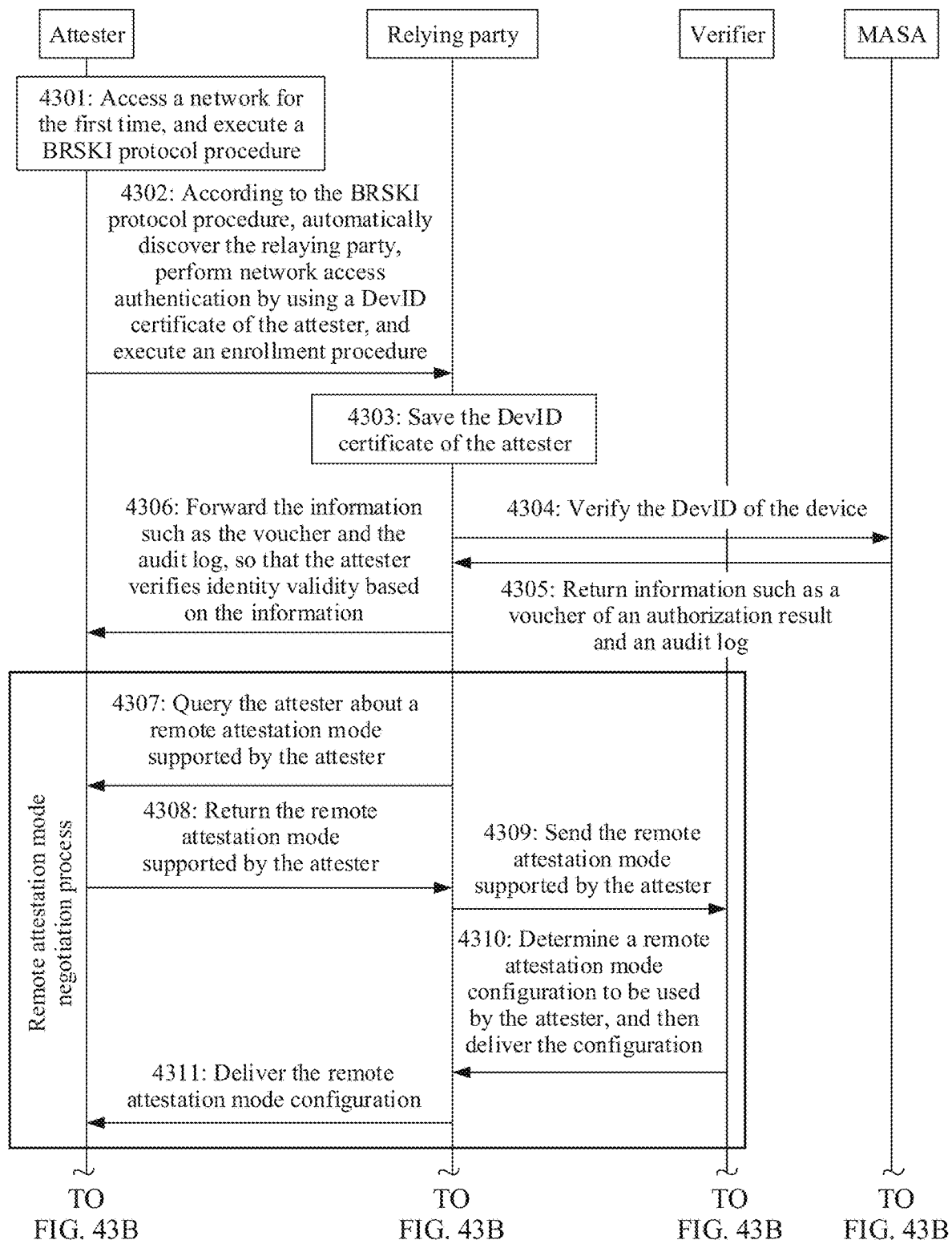
FIG. 43A and FIG. 43B are a signaling flowchart of a preparation process of first network access by a network device according to an embodiment of this application.
Figure 43B:
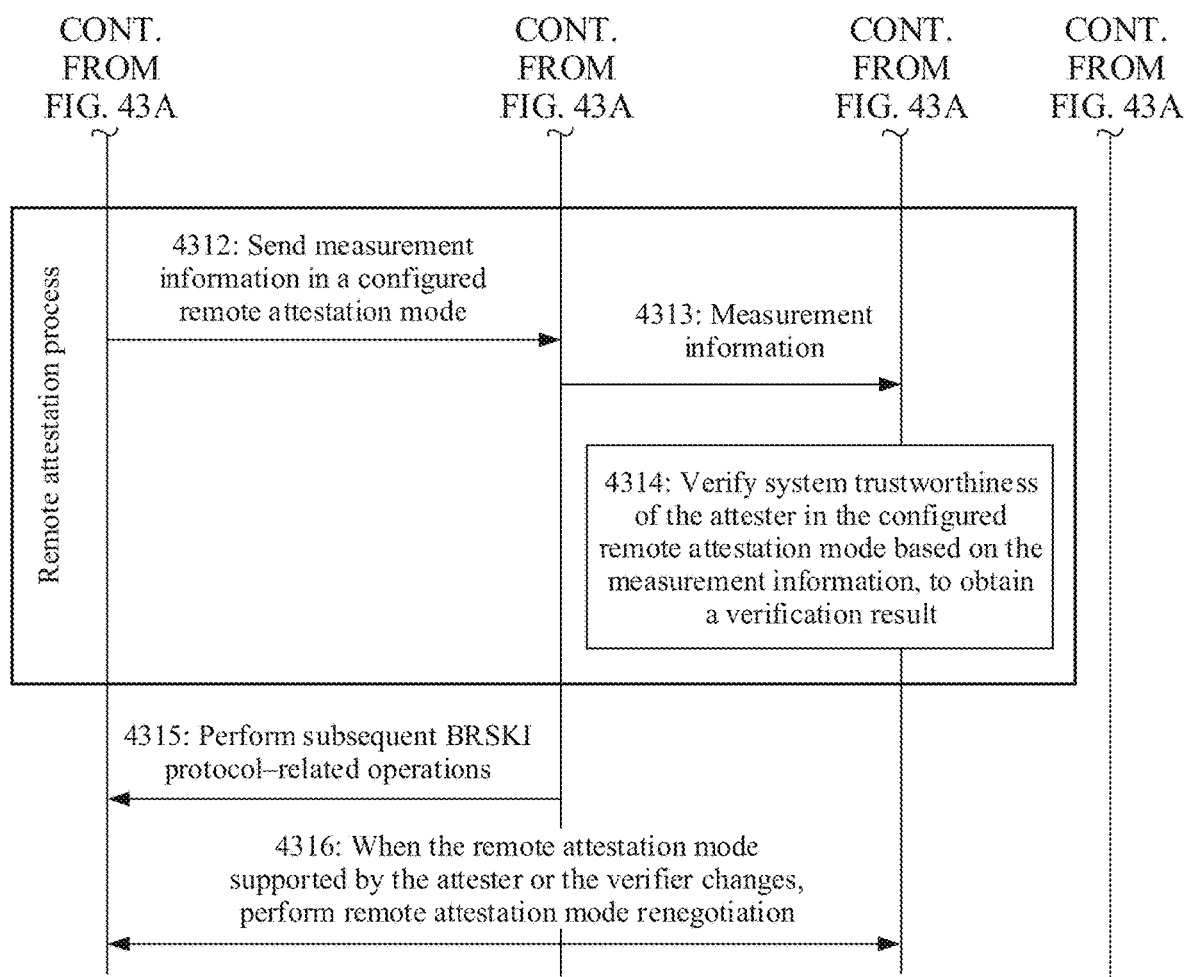

The attestation result may be used as one of conditions for whether the attester can access a network. If the system trustworthiness attestation result of the attester indicates that the system of the attester is trustworthy, the attester can access the network when another condition such as authorized signature authentication is met. If the system trustworthiness attestation result of the attester indicates that the system of the attester is untrustworthy, the attester cannot access the network even when another condition such as authorized signature authentication is met. An operation such as authorized signature authentication may be performed on the attester by using the Manufacturer Authorized Signing Authority (MASA for short). The MASA is used in a scenario of combining remote attestation and a bootstrapping remote secure key infrastructures (BRSKI for short) protocol of the IETF. For details, refer to related descriptions in an embodiment that is shown in FIG. 43A and FIG. 43B and that includes a remote attestation mode negotiation method and a remote attestation method in a BRSKI framework.

In some embodiments, the remote attestation modes supported by the attester and the verifier may change. Therefore, to ensure remote attestation accuracy, a remote attestation mode may be re-determined or verified in a renegotiation mode. For example, a renegotiation period may be preset. When an interval between a current time and a previous negotiation time reaches the renegotiation period, remote attestation mode renegotiation is performed in a previous negotiation mode or in a negotiation mode opposite to the previous negotiation mode. The negotiation mode opposite to the previous negotiation mode means that a remote attestation mode is previously determined by the attester, and a remote attestation mode is currently determined by the verifier through renegotiation. For another example, when an event occurs, for example, when the remote attestation mode supported by either of the attester and the verifier changes, renegotiation between the attester and the verifier is triggered to determine a remote attestation mode used during remote attestation.

When the verifier is upgraded, the remote attestation mode supported by the verifier is very likely to change. In this case, the following three examples are used to describe the process of renegotiation between the attester and the verifier.

Figure 8:
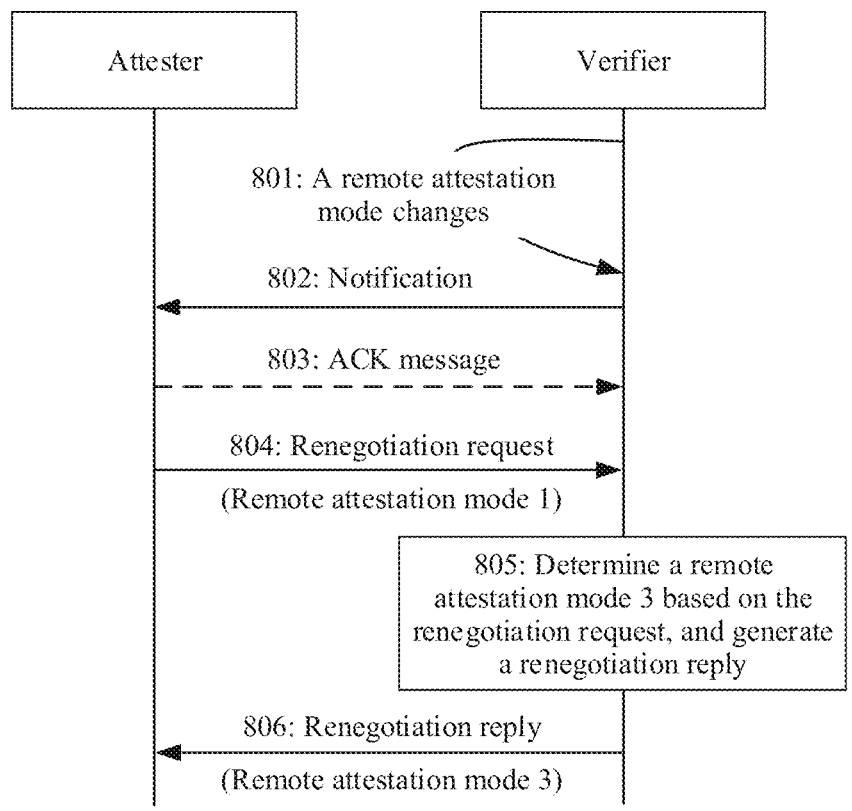
FIG. 8 is a signaling flowchart of another remote attestation mode negotiation method according to an embodiment of this application.

In an example, as shown in FIG. 8, the verifier may notify the attester that a remote attestation mode change event occurs on the verifier corresponding to the attester, and then the attester initiates remote attestation mode renegotiation. During implementation, the method may include the following operations.

Operation 801: A remote attestation mode supported by the verifier changes.

Operation 802: The verifier sends a notification to the attester, to notify the attester of the event that the remote attestation mode supported by the verifier changes.

Operation 803: The attester returns an ACK message.

It may be understood that operation 803 is an optional operation. In one embodiment, the attester may return an ACK message, to notify the verifier that the attester has learned that the remote attestation mode supported by the verifier changes, or the attester may not return an ACK message, but directly performs operation 804 after operation 802.

Operation 804: The attester initiates a remote attestation mode renegotiation request to the verifier.

It may be understood that the renegotiation request includes indication information 1, which is used to indicate a remote attestation mode 1 currently supported by the attester. The indication information 1 may be described by using the foregoing YANG data model or TLV.

Operation 805: The verifier obtains, based on the renegotiation request, the remote attestation mode 1 supported by the attester, and then determines, based on a remote attestation mode and a security requirement of the verifier, a remote attestation mode 3 subsequently used by the verifier and the attester. The security requirement may be, for example, a priority of a remote attestation mode defined on the verifier.

Operation 806: The verifier sends a renegotiation reply to the attester, where the renegotiation reply carries indication information corresponding to the determined remote attestation mode 3.

It should be noted that, in operation 804 to operation 806, the renegotiation request may be the same as the remote attestation mode negotiation request in the embodiments of this application, and the renegotiation reply may be the same as the remote attestation mode negotiation reply in the embodiments of this application. Therefore, for implementations and effects of operation 804 to operation 806, refer to related descriptions in the embodiment corresponding to FIG. 4.

Figure 9:
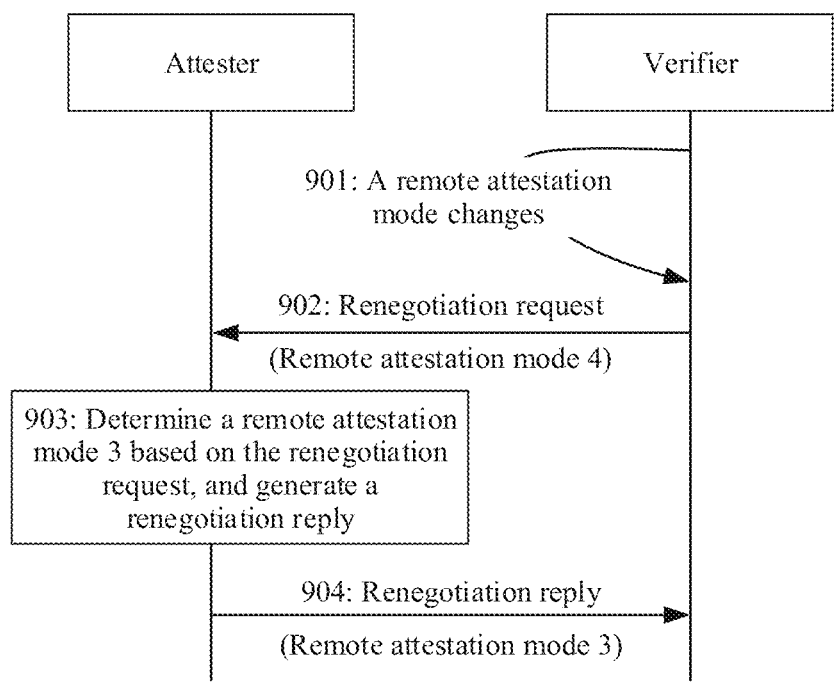
FIG. 9 is a signaling flowchart of still another remote attestation mode negotiation method according to an embodiment of this application.

In another example, as shown in FIG. 9, the verifier may actively initiate remote attestation mode renegotiation. During implementation, the method may include the following operations.

Operation 901: A remote attestation mode supported by the verifier changes.

Operation 902: The verifier initiates a remote attestation mode renegotiation request to the attester, where the renegotiation request carries indication information corresponding to a remote attestation mode 4 currently supported by the verifier.

Operation 903: The attester obtains, based on the renegotiation request, the remote attestation mode 4 supported by the verifier, and then determines, based on a remote attestation mode and a security requirement of the attester, a remote attestation mode 3 subsequently used by the attester and the verifier. The security requirement may be, for example, a priority of a remote attestation mode defined on the verifier.

Operation 904: The attester sends a renegotiation reply to the verifier, where the renegotiation reply carries indication information corresponding to the determined remote attestation mode 3.

It should be noted that the renegotiation request may be the same as the remote attestation mode negotiation request in the embodiments of this application, and the renegotiation reply may be the same as the remote attestation mode negotiation reply in the embodiments of this application.

Figure 12:
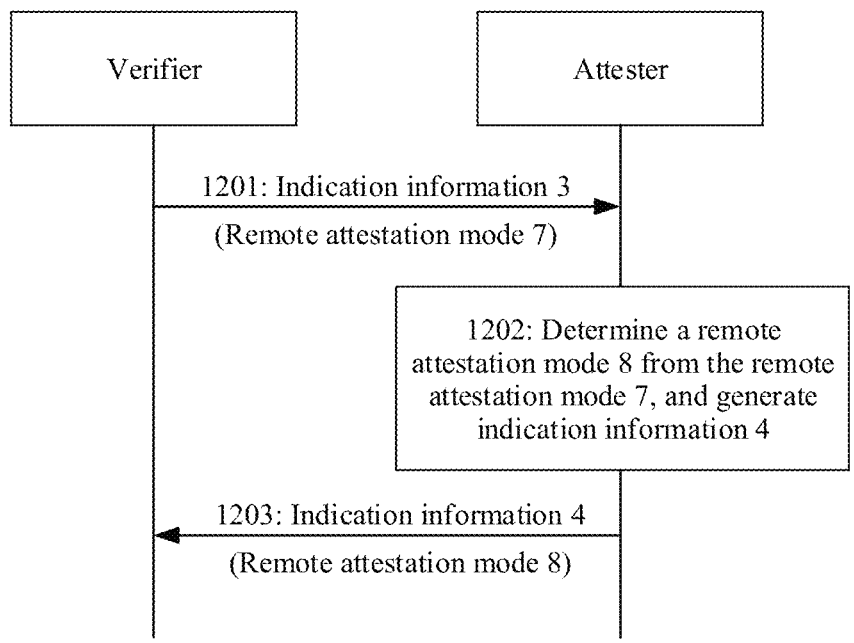
FIG. 12 is a signaling flowchart of a remote attestation mode negotiation method according to an embodiment of this application.

Therefore, for implementations and effects of operation 902 to operation 904, refer to related descriptions of the embodiment corresponding to FIG. 4, or related descriptions of an embodiment, shown in FIG. 12, in which the verifier initiates negotiation with the attester.

Figure 10:
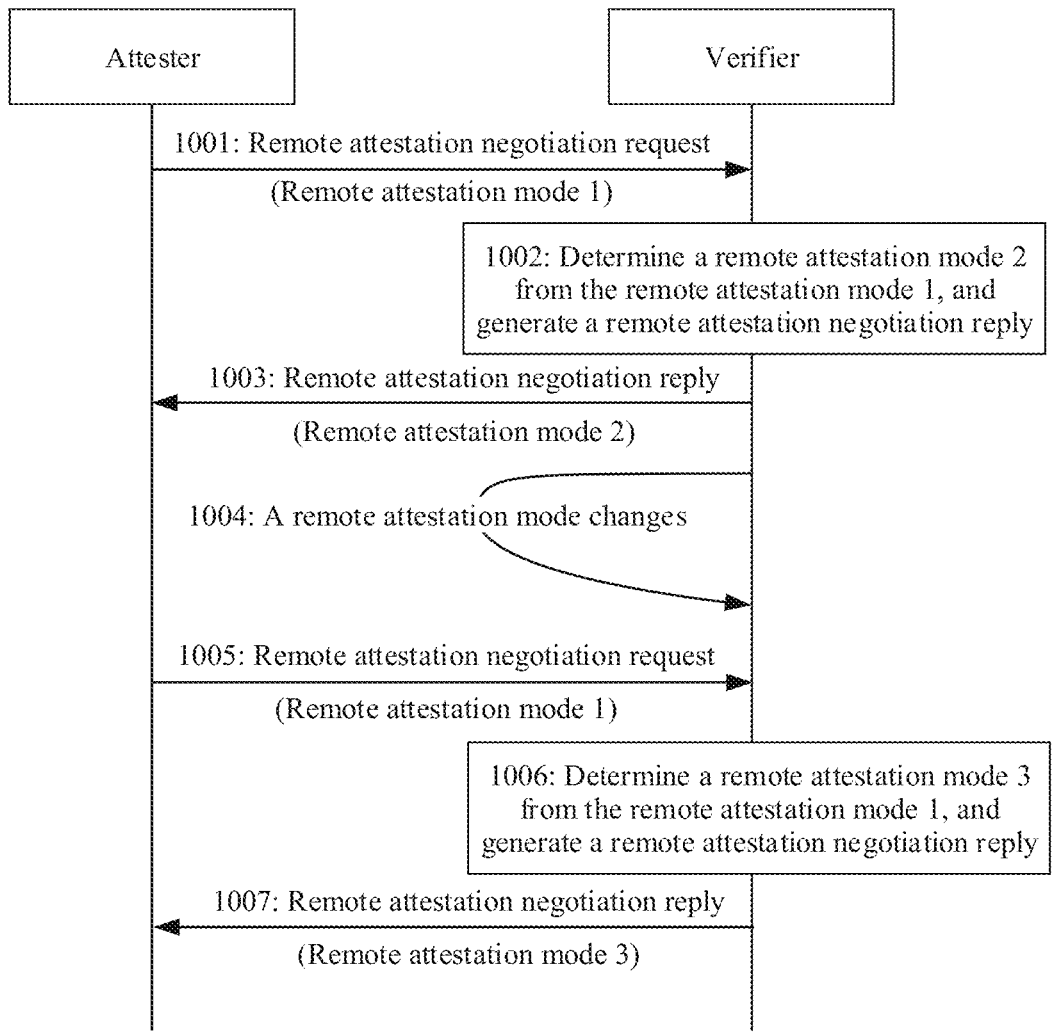
FIG. 10 is a signaling flowchart of yet another remote attestation mode negotiation method according to an embodiment of this application.

In still another example, as shown in FIG. 10, if the attester and the verifier periodically negotiate with each other about a remote attestation mode between the attester and the verifier, the verifier may update a remote attestation mode between the attester and the verifier through negotiation in a next period. During implementation, the method may include the following operations.

Operation 1001: In a first period, the attester initiates a remote attestation mode negotiation request to the verifier, where the negotiation request carries indication information corresponding to a remote attestation mode 1 supported by the attester.

Operation 1002: The verifier obtains, based on the remote attestation mode negotiation request, the remote attestation mode 1 supported by the attester, and then determines, based on a remote attestation mode and a security requirement of the verifier, a remote attestation mode 2 subsequently used by the verifier and the attester. The security requirement may be, for example, a priority of a remote attestation mode defined on the verifier.

Operation 1003: The verifier sends a remote attestation mode negotiation reply to the attester, where the negotiation reply carries indication information corresponding to the determined remote attestation mode 2.

Operation 1004: The remote attestation mode supported by the verifier changes.

Operation 1005: In a second period, the attester initiates a remote attestation mode renegotiation request to the verifier, where the renegotiation request carries indication information corresponding to a remote attestation mode 1 supported by the attester.

Operation 1006: The verifier obtains, based on the remote attestation mode negotiation request, the remote attestation mode 1 supported by the attester, and then determines, based on a remote attestation mode and a security requirement of the verifier, a remote attestation mode 3 subsequently used by the verifier and the attester. The security requirement may be, for example, a priority of a remote attestation mode defined on the verifier.

Operation 1007: The verifier sends a remote attestation mode negotiation reply to the attester, where the negotiation reply carries indication information corresponding to the determined remote attestation mode 3.

It should be noted that, to periodically renegotiate a remote attestation mode, a renegotiation period may be preset, or a renegotiation period may be negotiated during previous negotiation. When an interval between a current time and a previous negotiation time reaches the renegotiation period, remote attestation mode renegotiation may be performed in a previous negotiation mode. Alternatively, to make renegotiation more reliable, the renegotiation may be performed in a negotiation mode opposite to the previous negotiation mode, for example, by switching an initiator of the negotiation.

It should be noted that, for implementations and effects of operation 1001 to operation 1003 and operation 1005 to operation 1007, refer to related descriptions of the embodiment corresponding to FIG. 4.

In this way, remote attestation mode renegotiation between the attester and the verifier is implemented after the remote attestation mode supported by the verifier changes, thereby ensuring accuracy and reliability of subsequent remote attestation.

Figure 11:
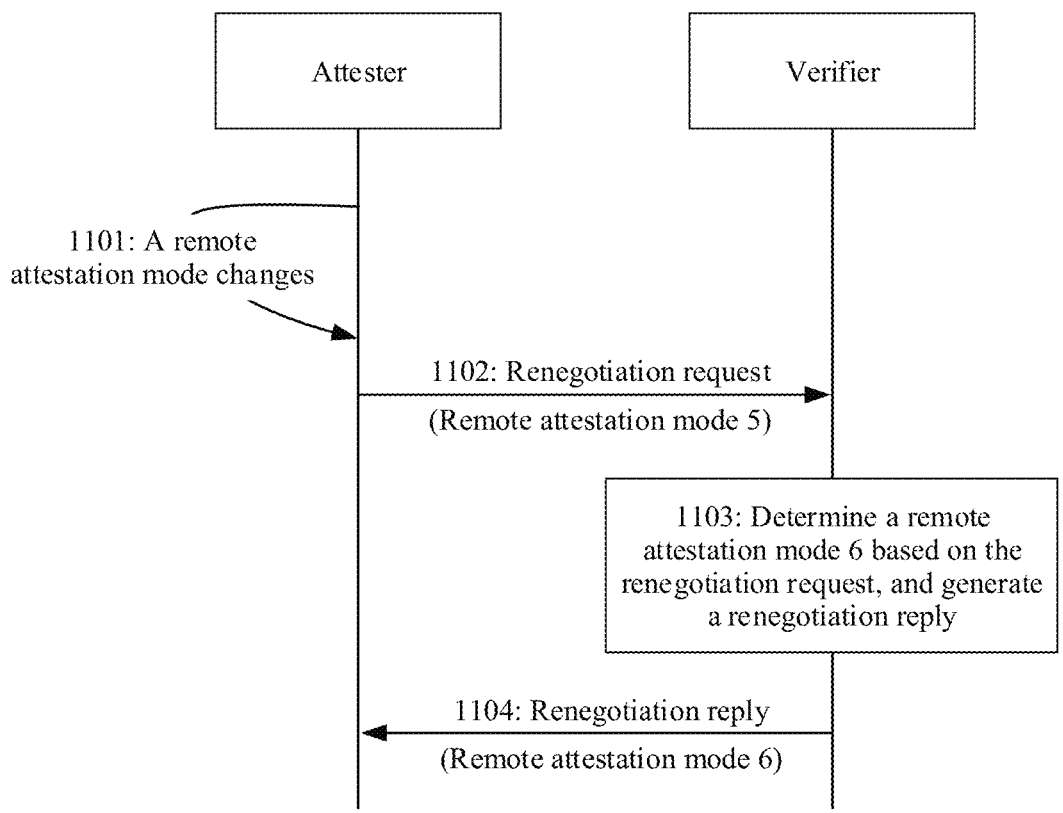
FIG. 11 is a signaling flowchart of still yet another remote attestation mode negotiation method according to an embodiment of this application.

When the attester is upgraded, the remote attestation mode supported by the attester is very likely to change. In this case, in an example, as shown in FIG. 11, the verifier may actively initiate remote attestation mode renegotiation. During implementation, the method may include the following operations.

Operation 1101: A remote attestation mode supported by the attester changes.

Operation 1102: The attester initiates a remote attestation mode renegotiation request to the verifier, where the renegotiation request carries indication information corresponding to a remote attestation mode 5 supported by the attester.

Operation 1103: The verifier obtains, based on the renegotiation request, the remote attestation mode 5 supported by the attester, and then determines, based on a remote attestation mode and a security requirement of the verifier, a remote attestation mode 6 subsequently used by the verifier and the attester. The security requirement may be, for example, a priority of a remote attestation mode defined on the verifier.

Operation 1104: The verifier sends a renegotiation reply to the attester, where the renegotiation reply carries indication information corresponding to the determined remote attestation mode 6.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1102 to operation 1104, refer to related descriptions in the embodiment corresponding to FIG. 4.

In this way, remote attestation mode renegotiation between the attester and the verifier is implemented after the remote attestation mode supported by the attester changes, thereby ensuring accuracy and reliability of subsequent remote attestation.

It should be noted that, in the embodiments, the attester and the verifier may directly perform remote attestation negotiation without using the relying party. In this case, the attester and the verifier directly establish a connection. Alternatively, the relying party exists between the attester and the verifier, but the relying party functions as a relay and is only used to transfer messages such as a remote attestation mode negotiation request, a remote attestation mode negotiation reply, a renegotiation request, and a renegotiation reply between the attester and the verifier.

It should be noted that, to improve remote attestation reliability, a remote attestation mode may be re-determined or verified in a renegotiation mode even if a remote attestation mode supported by a device participating in remote attestation does not change. For example, a renegotiation period may be preset, or may be determined during previous negotiation. When an interval between a current time and a previous negotiation time reaches the renegotiation period, remote attestation mode renegotiation is performed in a previous negotiation mode or in a negotiation mode opposite to the previous negotiation mode.

For the negotiation initiated by the verifier to the attester, refer to FIG. 12. The remote attestation mode negotiation method provided in the embodiments of this application may include operation 1201 to operation 1203.

Operation 1201: The verifier sends indication information 3 to the attester, where the indication information 3 is used to indicate a remote attestation mode 7, and the remote attestation mode 7 is a remote attestation mode supported by the verifier.

During implementation, when the verifier needs to initiate remote attestation mode negotiation, the verifier may generate the indication information 3 based on the remote attestation mode 7 supported by the verifier, and send the indication information 3 to the attester.

It may be understood that, in operation 1201, the verifier sends the indication information 3 to the attester. In one case, the verifier may add the indication information 3 to a remote attestation mode negotiation request, and send the remote attestation mode negotiation request to the attester. After receiving the remote attestation mode negotiation request, the attester determines that the verifier initiates remote attestation mode negotiation. In addition, the attester may obtain the indication information 3 by parsing the remote attestation mode negotiation request, and determine the remote attestation mode 7 supported by the verifier. In another case, after the attester sends a query request message or a negotiation notification message to the verifier, the verifier adds the indication information 3 to a query feedback message or a negotiation notification feedback message, and returns the query feedback message or the negotiation notification feedback message to the attester. In this case, the attester may obtain the indication information 3 by parsing the query feedback message or the negotiation notification feedback message, to determine the remote attestation mode 7 supported by the verifier.

It should be noted that the indication information 3 may be described by using the foregoing YANG data model or TLV.

Operation 1202: The attester determines a remote attestation mode 8 from the remote attestation mode 7, and generates indication information 4, where the indication information 4 is used to indicate the remote attestation mode 8 supported by the attester.

During implementation, after receiving the indication information 3 from the verifier, the attester may obtain the remote attestation mode 7 from the indication information 3, to learn of the remote attestation mode supported by the verifier on which remote attestation is to be performed. In this case, the attester may determine, from the remote attestation mode 7 based on the remote attestation mode supported by the attester and a security requirement of the attester, the remote attestation mode 8 used to subsequently perform remote attestation with the verifier. In addition, the attester may further generate the indication information 4 based on the remote attestation mode 8, so that the attester notifies the verifier of the remote attestation mode 8 determined by the attester. The security requirement may be, for example, a priority of a remote attestation mode defined on the verifier.

It should be noted that the indication information 4 may be described by using the foregoing YANG data model or TLV.

Operation 1203: The attester sends the indication information 4 to the verifier.

It may be understood that the attester sends the indication information 4 to the verifier. In one case, if the indication information 4 is carried in a remote attestation mode negotiation request, the attester may add the indication information 4 to a remote attestation mode negotiation reply message, and send the remote attestation mode negotiation reply message to the verifier. After receiving the remote attestation mode negotiation reply message, the verifier may obtain the indication information 4 by parsing the remote attestation mode negotiation reply message, and determine the remote attestation mode 8 used to subsequently perform remote attestation with the attester. In another case, if the indication information 4 is carried in a query feedback message or a negotiation notification feedback message, the attester may add the indication information 4 to a configuration message or a negotiation decision message, and send the configuration message or the negotiation decision message to the verifier. When the verifier returns a configuration feedback message or a negotiation decision feedback message, the negotiation is completed.

In this way, before remote attestation is performed, the verifier actively initiates negotiation with the to-be-verified attester about a remote attestation mode used to perform remote attestation between the verifier and the to-be-verified attester, to determine, from remote attestation modes supported by both the to-be-verified attester and the verifier, a remote attestation mode used to subsequently perform remote attestation between the to-be-verified attester and the verifier, and there is no need to manually statically configure a remote attestation mode for the attester and the verifier, thereby greatly reducing labor costs of determining the remote attestation mode. In addition, when there are a large quantity of devices, the method for automatically negotiating a remote attestation mode also helps configure the remote attestation mode more flexibly.

Similar to the case in which remote attestation is performed between the verifier and the attester in the mode in FIG. 7 after remote attestation mode negotiation is performed in the negotiation mode in FIG. 4, for a process of performing remote attestation between the verifier and the attester after remote attestation mode negotiation is performed in the negotiation mode in FIG. 12, refer to related descriptions in the embodiment corresponding to FIG. 7. Details are not described herein again.

In some embodiments, remote attestation modes supported by the verifier and attester may change. Therefore, to ensure remote attestation accuracy, periodic renegotiation or event-triggered renegotiation may be performed. The event-triggered renegotiation means that once the remote attestation mode supported by either of the verifier and the attester changes, the verifier and the attester need to renegotiate to determine a remote attestation mode used during remote attestation.

When the attester is upgraded, the remote attestation mode supported by the attester is very likely to change. In this case, the following three examples are used to describe the process of renegotiation between the attester and the verifier.

Figure 13:
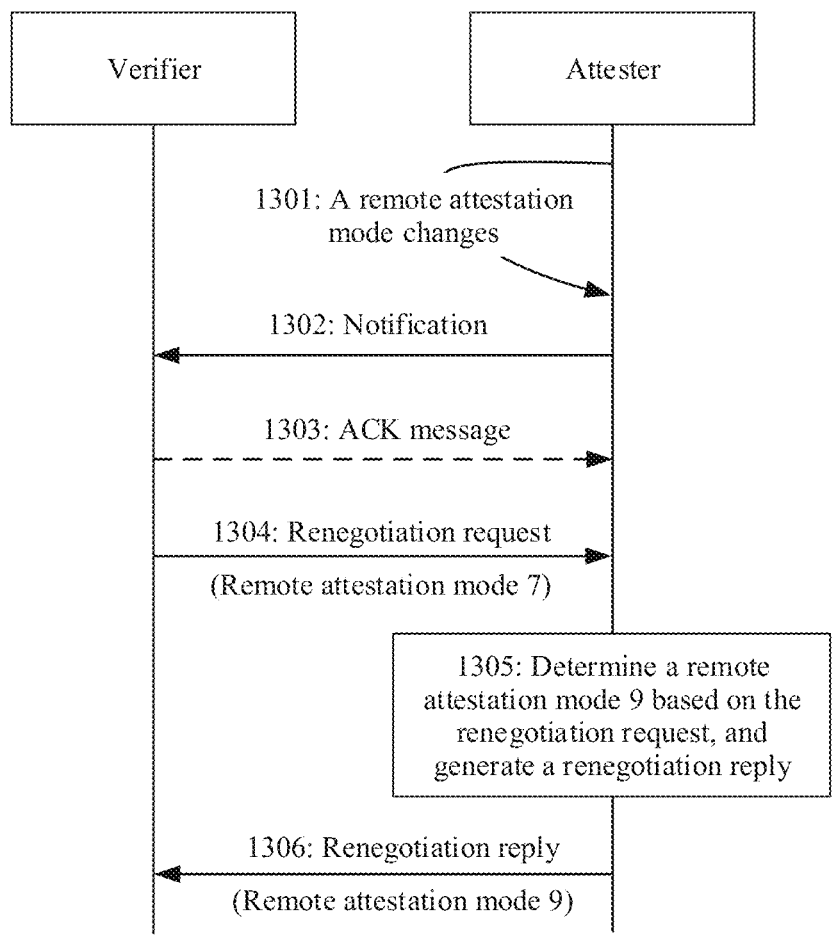
FIG. 13 is a signaling flowchart of another remote attestation mode negotiation method according to an embodiment of this application.

In an example, as shown in FIG. 13, the attester may notify the verifier that a remote attestation mode change event occurs on the attester corresponding to the verifier, and then the verifier initiates remote attestation mode renegotiation. During implementation, the method may include the following operations.

Operation 1301: A remote attestation mode supported by the attester changes.

Operation 1302: The attester sends a notification to the verifier, to notify the verifier of the event that the remote attestation mode supported by the attester changes.

Operation 1303: The verifier returns an ACK message.

It may be understood that operation 1303 is an optional operation.

Operation 1304: The verifier initiates a remote attestation mode renegotiation request to the attester, where the renegotiation request carries indication information corresponding to a remote attestation mode 7 supported by the verifier.

Operation 1305: The attester obtains, based on the renegotiation request, the remote attestation mode 7 supported by the verifier, and then determines, based on a remote attestation mode and a security requirement of the attester, a remote attestation mode 9 subsequently used by the attester and the verifier. The security requirement may be, for example, a priority of a remote attestation mode defined on the attester.

Operation 1306: The attester sends a renegotiation reply to the verifier, where the renegotiation reply carries indication information corresponding to the determined remote attestation mode 9.

It should be noted that, in operation 1304 to operation 1306, the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1304 to operation 1306, refer to related descriptions in the embodiment corresponding to FIG. 12.

Figure 14:
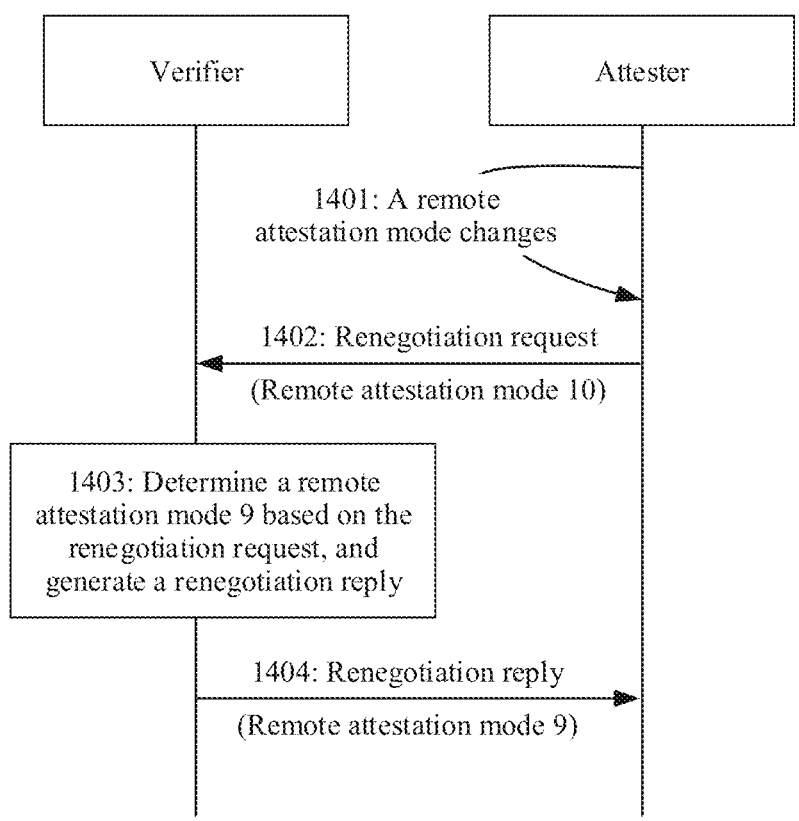
FIG. 14 is a signaling flowchart of still another remote attestation mode negotiation method according to an embodiment of this application.

In another example, as shown in FIG. 14, the attester may actively initiate remote attestation mode renegotiation. During implementation, the method may include the following operations.

Operation 1401: A remote attestation mode supported by the attester changes.

Operation 1402: The attester initiates a remote attestation mode renegotiation request to the verifier, where the renegotiation request carries indication information corresponding to a remote attestation mode 10 currently supported by the attester.

Operation 1403: The verifier obtains, based on the renegotiation request, the remote attestation mode 10 supported by the attester, and then determines, based on a remote attestation mode and a security requirement of the verifier, a remote attestation mode 9 subsequently used by the verifier and the attester. The security requirement may be, for example, a priority of a remote attestation mode defined on the attester.

Operation 1404: The verifier sends a renegotiation reply to the attester, where the renegotiation reply carries indication information corresponding to the determined remote attestation mode 9.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1402 to operation 1404, refer to related descriptions in the embodiment corresponding to FIG. 4.

Figure 15:
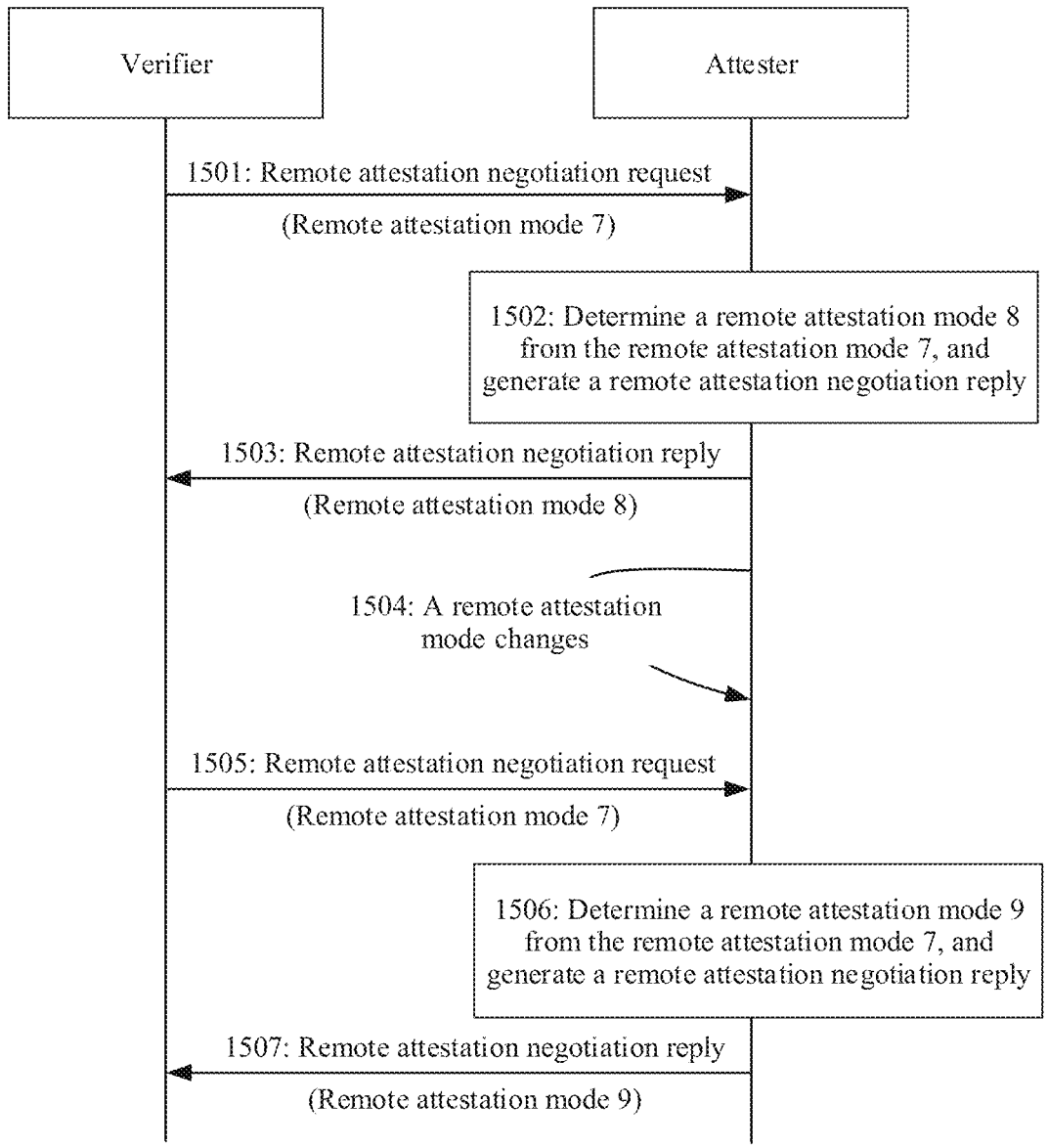
FIG. 15 is a signaling flowchart of yet another remote attestation mode negotiation method according to an embodiment of this application.

In still another example, as shown in FIG. 15, if the verifier and the attester periodically negotiate with each other about a remote attestation mode between the verifier and the attester, the attester may update a remote attestation mode between the verifier and the attester through negotiation in a next period. During implementation, the method may include the following operations.

Operation 1501: In a first period, the verifier initiates a remote attestation mode negotiation request to the attester, where the negotiation request carries indication information corresponding to a remote attestation mode 7 supported by the verifier.

Operation 1502: The attester obtains, based on the remote attestation mode negotiation request, the remote attestation mode 7 supported by the verifier, and then determines, based on a remote attestation mode and a security requirement of the attester, a remote attestation mode 8 subsequently used by the attester and the verifier. The security requirement may be, for example, a priority of a remote attestation mode defined on the attester.

Operation 1503: The attester sends a remote attestation mode negotiation reply to the verifier, where the negotiation reply carries indication information corresponding to the determined remote attestation mode 8.

Operation 1504: The remote attestation mode supported by the attester changes.

Operation 1505: In a second period, the verifier initiates a remote attestation mode renegotiation request to the attester, where the renegotiation request carries indication information corresponding to a remote attestation mode 7 supported by the verifier.

Operation 1506: The attester obtains, based on the remote attestation mode negotiation request, the remote attestation mode 7 supported by the verifier, and then determines, based on a remote attestation mode and a security requirement of the attester, a remote attestation mode 9 subsequently used by the attester and the verifier. The security requirement may be, for example, a priority of a remote attestation mode defined on the attester.

Operation 1507: The attester sends a remote attestation mode negotiation reply to the verifier, where the negotiation reply carries indication information corresponding to the determined remote attestation mode 9.

It should be noted that, for implementations and effects of operation 1501 to operation 1503 and operation 1505 to operation 1507, refer to related descriptions of the embodiment corresponding to FIG. 12.

In this way, remote attestation mode renegotiation between the verifier and the attester is implemented after the remote attestation mode supported by the attester changes, thereby ensuring accuracy and reliability of subsequent remote attestation.

Figure 16:
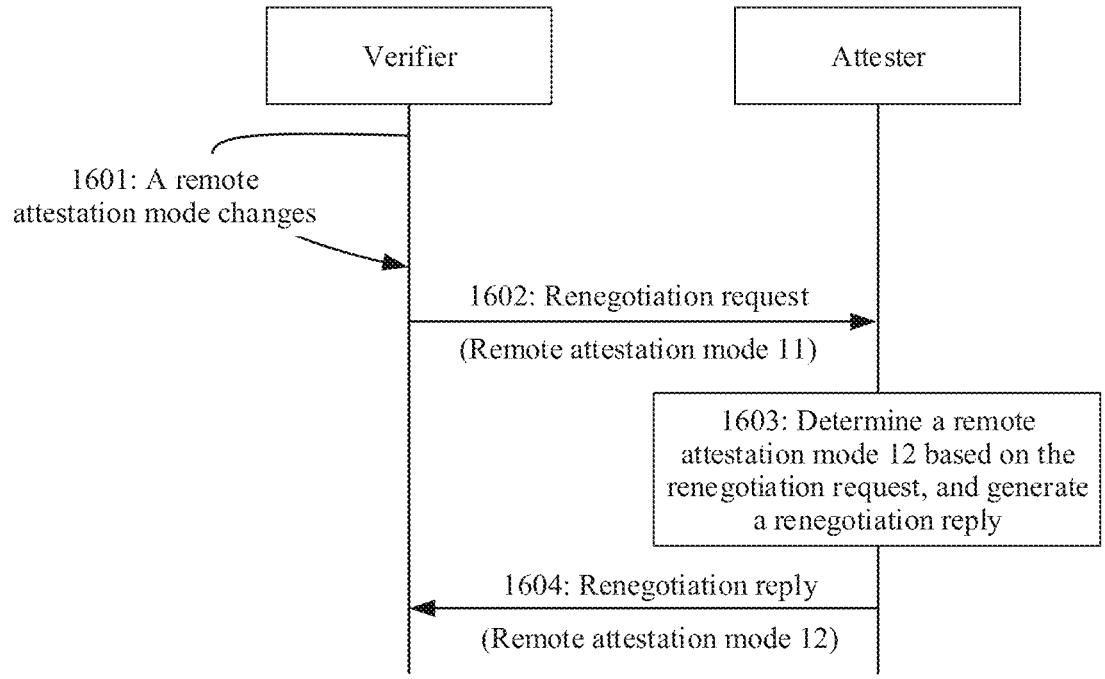
FIG. 16 is a signaling flowchart of still yet another remote attestation mode negotiation method according to an embodiment of this application.

When the verifier is upgraded, the remote attestation mode supported by the verifier is very likely to change. In this case, in an example, as shown in FIG. 16, the attester may actively initiate remote attestation mode renegotiation. During implementation, the method may include the following operations.

Operation 1601: A remote attestation mode supported by the verifier changes.

Operation 1602: The verifier initiates a remote attestation mode renegotiation request to the attester, where the renegotiation request carries indication information corresponding to a remote attestation mode 11 supported by the verifier.

Operation 1603: The attester obtains, based on the renegotiation request, the remote attestation mode 11 supported by the verifier, and then determines, based on a remote attestation mode and a security requirement of the attester, a remote attestation mode 12 subsequently used by the attester and the verifier. The security requirement may be, for example, a priority of a remote attestation mode defined on the attester.

Operation 1604: The attester sends a renegotiation reply to the verifier, where the renegotiation reply carries indication information corresponding to the determined remote attestation mode 12.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1602 to operation 1604, refer to related descriptions in the embodiment corresponding to FIG. 12.

In this way, remote attestation mode renegotiation between the verifier and the attester is implemented after the remote attestation mode supported by the verifier changes, thereby ensuring accuracy and reliability of subsequent remote attestation.

It should be noted that, in the embodiments, the attester and the verifier may directly perform remote attestation negotiation without using the relying party. In this case, the attester and the verifier directly establish a connection. Alternatively, the relying party exists between the attester and the verifier, but the relying party functions as a relay and is only used to transfer messages such as a remote attestation mode negotiation request, a remote attestation mode negotiation reply, a renegotiation request, and a renegotiation reply between the attester and the verifier.

Figure 17:
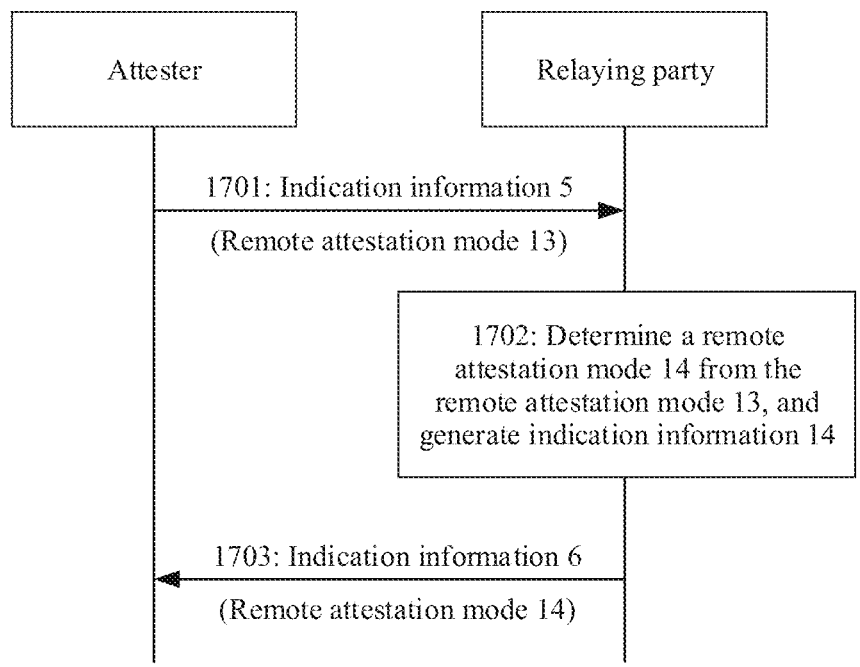
FIG. 17 is a signaling flowchart of a remote attestation mode negotiation method according to an embodiment of this application.
Figure 22:
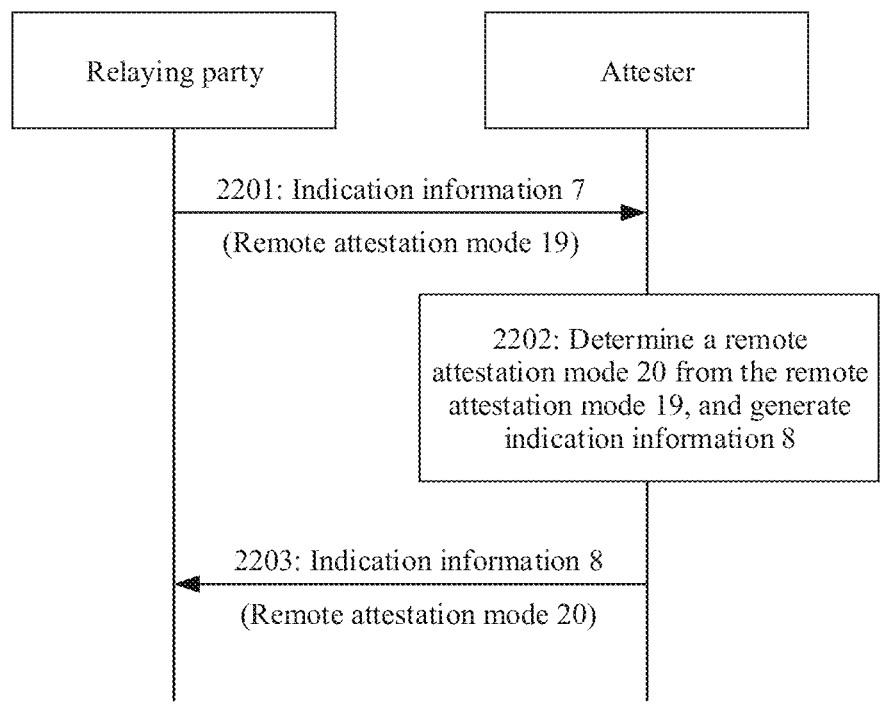
FIG. 22 is a signaling flowchart of a remote attestation mode negotiation method according to an embodiment of this application.

It should be noted that, in the following embodiments of negotiation between the attester and the relaying party corresponding to FIG. 17 and FIG. 22, the relaying party may be a device that has a function of performing remote attestation with the attester. Therefore, FIG. 17 and FIG. 22 show a process in which the relaying party and the attester perform remote attestation mode negotiation. Alternatively, the relaying party may be a relying party, connects the attester and the verifier, and may learn of a remote attestation mode supported by the verifier. Therefore, FIG. 17 and FIG. 22 show a process in which the relaying party replaces the verifier to perform remote attestation mode negotiation with the attester, and the relaying party may notify the verifier of a remote attestation mode determined through negotiation.

For the negotiation initiated by the attester to the relaying party, refer to FIG. 17. The remote attestation mode negotiation method provided in the embodiments of this application may include operation 1701 to operation 1703.

Operation 1701: The attester sends indication information 5 to the relaying party, where the indication information 5 is used to indicate a remote attestation mode 13, and the remote attestation mode 13 is a remote attestation mode supported by the attester.

During implementation, when the attester needs to initiate remote attestation mode negotiation, the attester may generate the indication information 5 based on the remote attestation mode 13 supported by the attester, and send the indication information 5 to the relaying party.

It may be understood that, in operation 1701, the attester sends the indication information 5 to the relaying party. In one case, the attester may add the indication information 5 to a remote attestation mode negotiation request, and send the remote attestation mode negotiation request to the relaying party. After receiving the remote attestation mode negotiation request, the relaying party determines that the attester initiates remote attestation mode negotiation. In addition, the relaying party may obtain the indication information 5 by parsing the remote attestation mode negotiation request, and determine the remote attestation mode 13 supported by the attester. In another case, after the relaying party sends a query request message or a negotiation notification message to the attester, the attester adds the indication information 5 to a query feedback message or a negotiation notification feedback message, and returns the query feedback message or the negotiation notification feedback message to the relaying party. In this case, the relaying party may obtain the indication information 5 by parsing the query feedback message or the negotiation notification feedback message, to determine the remote attestation mode 13 supported by the attester.

It should be noted that the indication information 5 may be described by using the foregoing YANG data model or TLV.

Operation 1702: The relaying party determines a remote attestation mode 14 from the remote attestation mode 13, and generates indication information 6, where the indication information 6 is used to indicate the remote attestation mode 14 supported by the relaying party.

During implementation, after receiving the indication information 5 from the attester, the relaying party may obtain the remote attestation mode 13 from the indication information 5, to learn of the remote attestation mode supported by the attester on which remote attestation is to be performed. In this case, the relaying party may determine, from the remote attestation mode 13 based on the remote attestation mode supported by the relaying party and a security requirement of the relaying party, the remote attestation mode 14 used to subsequently perform remote attestation with the attester. In addition, the relaying party may further generate the indication information 6 based on the remote attestation mode 14, so that the relaying party notifies the attester of the remote attestation mode 14 determined by the relaying party. The security requirement may be, for example, a priority of a remote attestation mode defined on the relaying party.

It should be noted that the indication information 6 may be described by using the foregoing YANG data model or TLV.

Operation 1703: The relaying party sends the indication information 6 to the attester.

It may be understood that the relaying party sends the indication information 6 to the attester. In one case, if the indication information 6 is carried in a remote attestation mode negotiation request, the relaying party may add the indication information 6 to a remote attestation mode negotiation reply message, and send the remote attestation mode negotiation reply message to the attester. After receiving the remote attestation mode negotiation reply message, the attester may obtain the indication information 6 by parsing the remote attestation mode negotiation reply message, and determine the remote attestation mode 14 used to subsequently perform remote attestation with the relaying party. In another case, if the indication information 6 is carried in a query feedback message or a negotiation notification feedback message, the relaying party may add the indication information 6 to a configuration message or a negotiation decision message, and send the configuration message or the negotiation decision message to the attester. When the attester returns a configuration feedback message or a negotiation decision feedback message, the negotiation is completed.

It should be noted that the indication information 6 may be described by using the foregoing YANG data model or TLV.

In this way, before remote attestation is performed, the to-be-verified attester actively initiates negotiation with the relaying party about a remote attestation mode used to perform remote attestation between the to-be-verified attester and the relaying party, to determine, from remote attestation modes supported by both the to-be-verified attester and the relaying party, a remote attestation mode used to subsequently perform remote attestation between the to-be-verified attester and the relaying party, and there is no need to manually statically configure a remote attestation mode for the attester and the relaying party, thereby greatly reducing labor costs of determining the remote attestation mode. In addition, when there are a large quantity of devices, the method for automatically negotiating a remote attestation mode also helps configure the remote attestation mode more flexibly.

Similar to the case in which remote attestation is performed between the verifier and the attester in the mode in FIG. 7 after remote attestation mode negotiation is performed in the negotiation mode in FIG. 4, for a process of performing remote attestation between the relaying party/verifier and the attester after remote attestation mode negotiation is performed in the negotiation mode in FIG. 17, refer to related descriptions in the embodiment corresponding to FIG. 7. Details are not described herein again.

In some implementations, remote attestation modes supported by the attester and the relaying party may change. Therefore, to ensure remote attestation accuracy, once the remote attestation mode supported by either of the attester and the relaying party changes, the attester and the relaying party need to renegotiate to determine a remote attestation mode used during remote attestation.

When the relaying party is upgraded, the remote attestation mode supported by the relaying party is very likely to change. In this case, the following three examples are used to describe the process of renegotiation between the attester and the relaying party.

Figure 18:
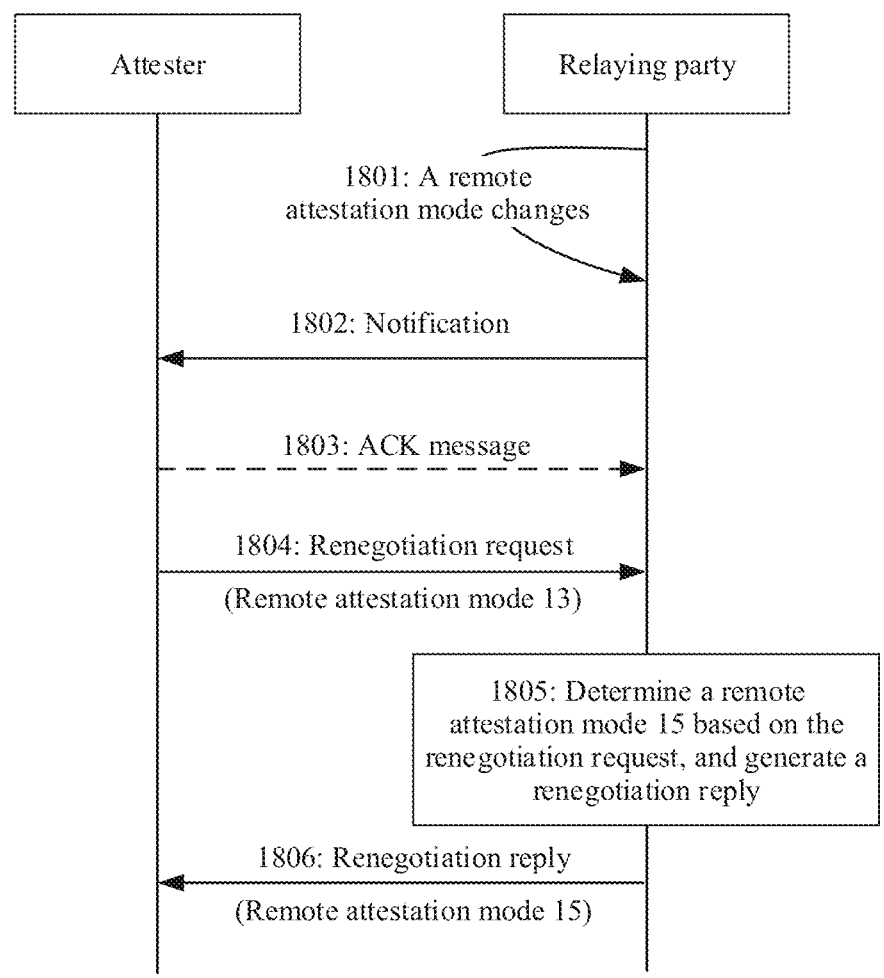
FIG. 18 is a signaling flowchart of another remote attestation mode negotiation method according to an embodiment of this application.

In an example, as shown in FIG. 18, the relaying party may notify the attester that a remote attestation mode change event occurs on the relaying party corresponding to the attester, and then the attester initiates remote attestation mode renegotiation. During implementation, the method may include the following operations.

Operation 1801: A remote attestation mode supported by the relaying party changes.

Operation 802: The relaying party sends a notification to the attester, to notify the attester of the event that the remote attestation mode supported by the relaying party changes.

Operation 1803: The attester returns an ACK message.

It may be understood that operation 1803 is an optional operation.

Operation 1804: The attester initiates a remote attestation mode renegotiation request to the relaying party, where the renegotiation request carries indication information corresponding to a remote attestation mode 13 supported by the attester.

Operation 1805: The relaying party obtains, based on the renegotiation request, the remote attestation mode 13 supported by the attester, and then determines, based on a remote attestation mode and a security requirement of the relaying party, a remote attestation mode 15 subsequently used by the relaying party and the attester. The security requirement may be, for example, a priority of a remote attestation mode defined on the relaying party.

Operation 1806: The relaying party sends a renegotiation reply to the attester, where the renegotiation reply carries indication information corresponding to the determined remote attestation mode 15.

It should be noted that, in operation 1804 to operation 1806, the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1804 to operation 1806, refer to related descriptions in the embodiment corresponding to FIG. 4.

Figure 19:
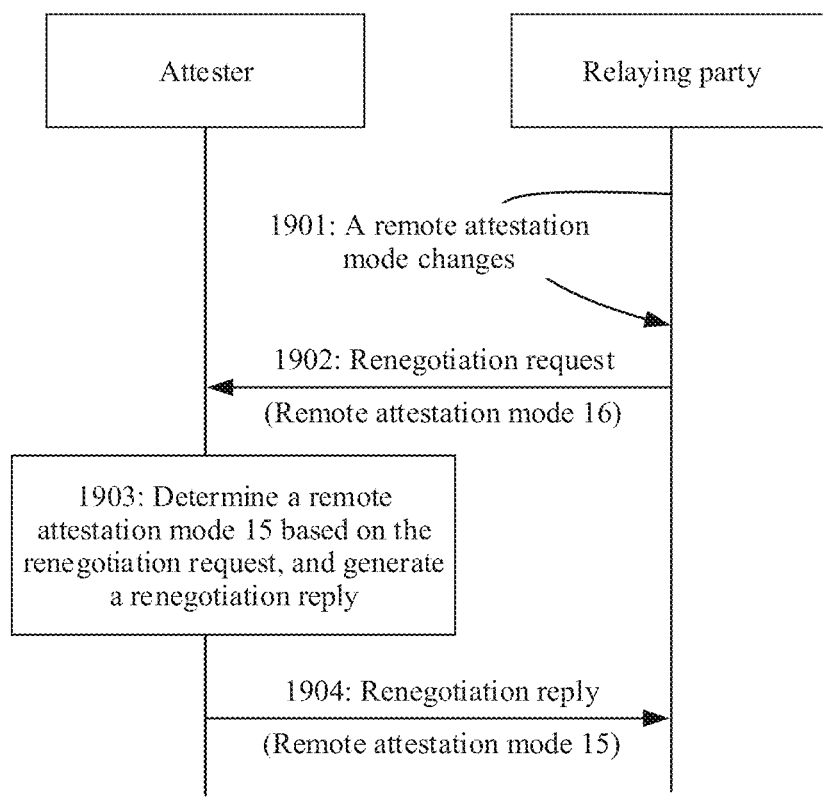
FIG. 19 is a signaling flowchart of still another remote attestation mode negotiation method according to an embodiment of this application.

In another example, as shown in FIG. 19, the relaying party may actively initiate remote attestation mode renegotiation. During implementation, the method may include the following operations.

Operation 1901: A remote attestation mode supported by the relaying party changes.

Operation 1902: The relaying party initiates a remote attestation mode renegotiation request to the attester, where the renegotiation request carries indication information corresponding to a remote attestation mode 16 currently supported by the relaying party.

Operation 1903: The attester obtains, based on the renegotiation request, the remote attestation mode 16 supported by the relaying party, and then determines, based on a remote attestation mode and a security requirement of the attester, a remote attestation mode 15 subsequently used by the attester and the relaying party. The security requirement may be, for example, a priority of a remote attestation mode defined on the relaying party.

Operation 1904: The attester sends a renegotiation reply to the relaying party, where the renegotiation reply carries indication information corresponding to the determined remote attestation mode 15.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 1902 to operation 1904, refer to related descriptions in the embodiment corresponding to FIG. 12.

Figure 20:
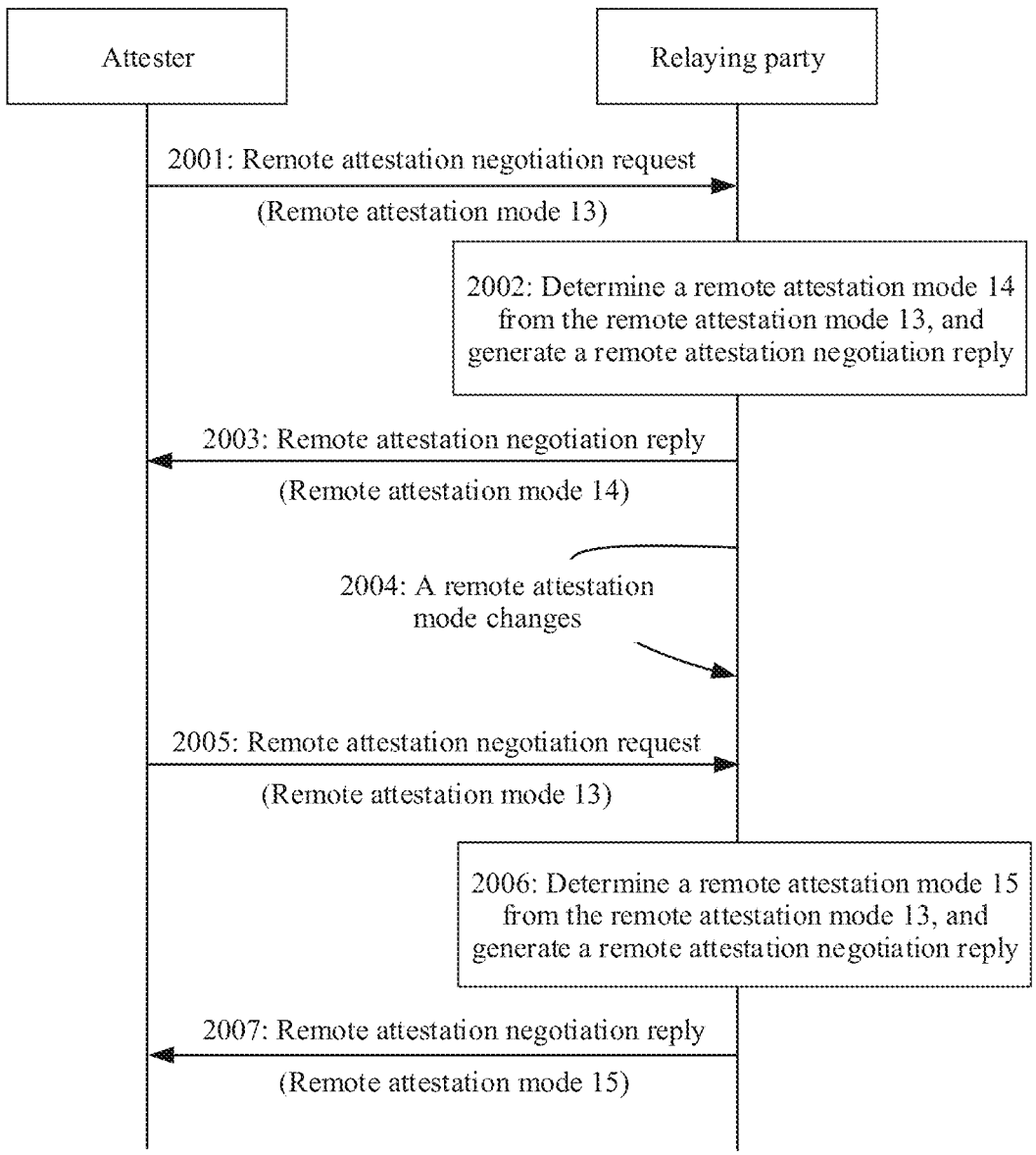
FIG. 20 is a signaling flowchart of yet another remote attestation mode negotiation method according to an embodiment of this application.

In still another example, as shown in FIG. 20, if the attester and the relaying party periodically negotiate with each other about a remote attestation mode between the attester and the relaying party, the relaying party may update a remote attestation mode between the attester and the relaying party through negotiation in a next period. During implementation, the method may include the following operations.

Operation 2001: In a first period, the attester initiates a remote attestation mode negotiation request to the relaying party, where the negotiation request carries indication information corresponding to a remote attestation mode 13 supported by the attester.

Operation 2002: The relaying party obtains, based on the remote attestation mode negotiation request, the remote attestation mode 13 supported by the attester, and then determines, based on a remote attestation mode and a security requirement of the relaying party, a remote attestation mode 14 subsequently used by the relaying party and the attester. The security requirement may be, for example, a priority of a remote attestation mode defined on the relaying party.

Operation 2003: The relaying party sends a remote attestation mode negotiation reply to the attester, where the negotiation reply carries indication information corresponding to the determined remote attestation mode 14.

Operation 2004: The remote attestation mode supported by the relaying party changes.

Operation 2005: In a second period, the attester initiates a remote attestation mode renegotiation request to the relaying party, where the renegotiation request carries indication information corresponding to a remote attestation mode 13 supported by the attester.

Operation 2006: The relaying party obtains, based on the remote attestation mode negotiation request, the remote attestation mode 13 supported by the attester, and then determines, based on a remote attestation mode and a security requirement of the relaying party, a remote attestation mode 15 subsequently used by the relaying party and the attester. The security requirement may be, for example, a priority of a remote attestation mode defined on the relaying party.

Operation 2007: The relaying party sends a remote attestation mode negotiation reply to the attester, where the negotiation reply carries indication information corresponding to the determined remote attestation mode 15.

It should be noted that, for implementations and effects of operation 2001 to operation 2003 and operation 2005 to operation 2007, refer to related descriptions of the embodiment corresponding to FIG. 4.

In this way, remote attestation mode renegotiation between the attester and the relaying party is implemented after the remote attestation mode supported by the relaying party changes, thereby ensuring accuracy and reliability of subsequent remote attestation.

Figure 21:
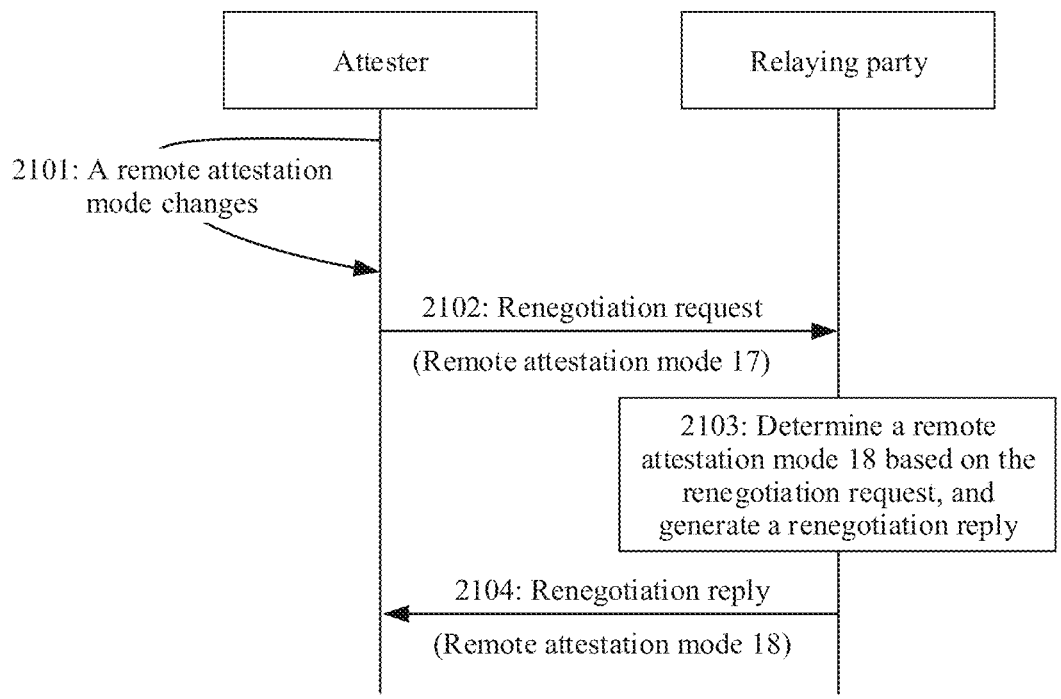
FIG. 21 is a signaling flowchart of still yet another remote attestation mode negotiation method according to an embodiment of this application.

When the attester is upgraded, the remote attestation mode supported by the attester is very likely to change. In this case, in an example, as shown in FIG. 21, the relaying party may actively initiate remote attestation mode renegotiation. During implementation, the method may include the following operations.

Operation 2101: A remote attestation mode supported by the attester changes.

Operation 2102: The attester initiates a remote attestation mode renegotiation request to the relaying party, where the renegotiation request carries indication information corresponding to a remote attestation mode 17 supported by the attester.

Operation 2103: The relaying party obtains, based on the renegotiation request, the remote attestation mode 17 supported by the attester, and then determines, based on a remote attestation mode and a security requirement of the relaying party, a remote attestation mode 18 subsequently used by the relaying party and the attester. The security requirement may be, for example, a priority of a remote attestation mode defined on the relaying party.

Operation 2104: The relaying party sends a renegotiation reply to the attester, where the renegotiation reply carries indication information corresponding to the determined remote attestation mode 18.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 2102 to operation 2104, refer to related descriptions in the embodiment corresponding to FIG. 4.

In this way, remote attestation mode renegotiation between the attester and the relaying party is implemented after the remote attestation mode supported by the attester changes, thereby ensuring accuracy and reliability of subsequent remote attestation.

For the negotiation initiated by the relaying party to the attester, refer to FIG. 22. The remote attestation mode negotiation method provided in the embodiments of this application may include operation 2201 to operation 2203.

Operation 2201: The relaying party sends indication information 7 to the attester, where the indication information 7 is used to indicate a remote attestation mode 19, and the remote attestation mode 19 is a remote attestation mode supported by the relaying party.

During implementation, when the relaying party needs to initiate remote attestation mode negotiation, the relaying party may generate the indication information 7 based on the remote attestation mode 19 supported by the relaying party, and send the indication information 7 to the attester.

It may be understood that, in operation 2201, the relaying party sends the indication information 7 to the attester. In one case, the relaying party may add the indication information 7 to a remote attestation mode negotiation request, and send the remote attestation mode negotiation request to the attester. After receiving the remote attestation mode negotiation request, the attester determines that the relaying party initiates remote attestation mode negotiation. In addition, the attester may obtain the indication information 7 by parsing the remote attestation mode negotiation request, and determine the remote attestation mode 19 supported by the relaying party. In another case, after the attester sends a query request message or a negotiation notification message to the relaying party, the relaying party adds the indication information 7 to a query feedback message or a negotiation notification feedback message, and returns the query feedback message or the negotiation notification feedback message to the attester. In this case, the attester may obtain the indication information 7 by parsing the query feedback message or the negotiation notification feedback message, to determine the remote attestation mode 19 supported by the relaying party.

It should be noted that the indication information 7 may be described by using the foregoing YANG data model or TLV.

Operation 2202: The attester determines a remote attestation mode 20 from the remote attestation mode 19, and generates indication information 8, where the indication information 8 is used to indicate the remote attestation mode 20 supported by the attester.

During implementation, after receiving the indication information 7 from the relaying party, the attester may obtain the remote attestation mode 19 from the indication information 7, to learn of the remote attestation mode supported by the relaying party on which remote attestation is to be performed. In this case, the attester may determine, from the remote attestation mode 19 based on the remote attestation mode supported by the attester and a security requirement of the attester, the remote attestation mode 20 used to subsequently perform remote attestation with the relaying party. In addition, the attester may further generate the indication information 8 based on the remote attestation mode 20, so that the attester notifies the relaying party of the remote attestation mode 20 determined by the attester. The security requirement may be, for example, a priority of a remote attestation mode defined on the relaying party.

It should be noted that the indication information 8 may be described by using the foregoing YANG data model or TLV.

Operation 2203: The attester sends the indication information 8 to the relaying party.

It may be understood that the attester sends the indication information 8 to the relaying party. In one case, if the indication information 8 is carried in a remote attestation mode negotiation request, the attester may add the indication information 8 to a remote attestation mode negotiation reply message, and send the remote attestation mode negotiation reply message to the relaying party. After receiving the remote attestation mode negotiation reply message, the relaying party may obtain the indication information 8 by parsing the remote attestation mode negotiation reply message, and determine the remote attestation mode 20 used to subsequently perform remote attestation with the attester. In another case, if the indication information 8 is carried in a query feedback message or a negotiation notification feedback message, the attester may add the indication information 8 to a configuration message or a negotiation decision message, and send the configuration message or the negotiation decision message to the relaying party. When the relaying party returns a configuration feedback message or a negotiation decision feedback message, the negotiation is completed.

In this way, before remote attestation is performed, the relaying party actively initiates negotiation with the to-be-verified attester about a remote attestation mode used to perform remote attestation between the relaying party and the to-be-verified attester, to determine, from remote attestation modes supported by both the to-be-verified attester and the relaying party, a remote attestation mode used to subsequently perform remote attestation between the to-be-verified attester and the relaying party, and there is no need to manually statically configure a remote attestation mode for the attester and the relaying party, thereby greatly reducing labor costs of determining the remote attestation mode. In addition, when there are a large quantity of devices, the method for automatically negotiating a remote attestation mode also helps configure the remote attestation mode more flexibly.

Similar to the case in which remote attestation is performed between the relaying party and the attester in the mode in FIG. 7 after remote attestation mode negotiation is performed in the negotiation mode in FIG. 4, for a process of performing remote attestation between the relaying party and the attester after remote attestation mode negotiation is performed in the negotiation mode in FIG. 22, refer to related descriptions in the embodiment corresponding to FIG. 7. Details are not described herein again.

In some implementations, remote attestation modes supported by the relaying party and the attester may change. Therefore, to ensure remote attestation accuracy, once the remote attestation mode supported by either of the relaying party and the attester changes, the relaying party and the attester need to renegotiate to determine a remote attestation mode used during remote attestation.

When the attester is upgraded, the remote attestation mode supported by the attester is very likely to change. In this case, the following three examples are used to describe the process of renegotiation between the attester and the relaying party.

Figure 23:
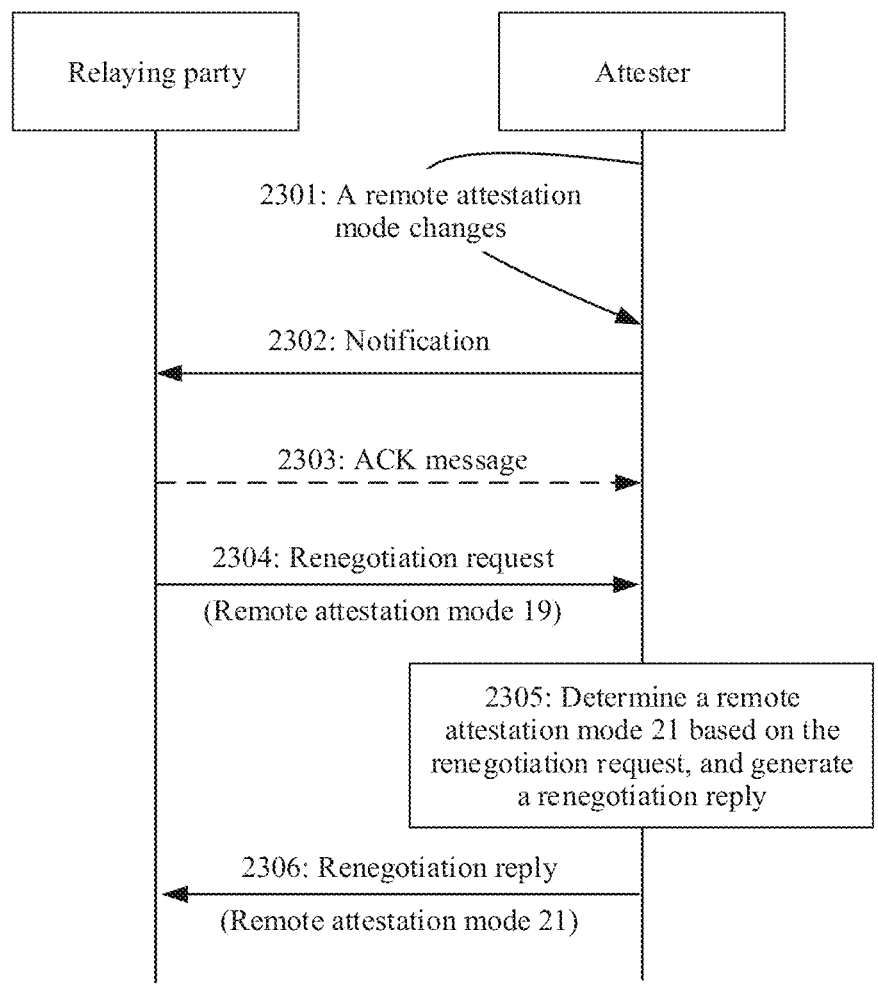
FIG. 23 is a signaling flowchart of another remote attestation mode negotiation method according to an embodiment of this application.

In an example, as shown in FIG. 23, the attester may notify the relaying party that a remote attestation mode change event occurs on the attester corresponding to the relaying party, and then the relaying party initiates remote attestation mode renegotiation. During implementation, the method may include the following operations.

Operation 2301: A remote attestation mode supported by the attester changes.

Operation 2302: The attester sends a notification to the relaying party, to notify the relaying party of the event that the remote attestation mode supported by the attester changes.

Operation 2303: The relaying party returns an ACK message.

It may be understood that operation 2303 is an optional operation.

Operation 2304: The relaying party initiates a remote attestation mode renegotiation request to the attester, where the renegotiation request carries indication information corresponding to a remote attestation mode 19 supported by the relaying party.

Operation 2305: The attester obtains, based on the renegotiation request, the remote attestation mode 19 supported by the relaying party, and then determines, based on a remote attestation mode and a security requirement of the attester, a remote attestation mode 21 subsequently used by the attester and the relaying party. The security requirement may be, for example, priorities of different remote attestation modes defined on the attester.

Operation 2306: The attester sends a renegotiation reply to the relaying party, where the renegotiation reply carries indication information corresponding to the determined remote attestation mode 21.

It should be noted that, in operation 2304 to operation 2306, the renegotiation request may be the same as the remote attestation mode negotiation request in the embodiments of this application, and the renegotiation reply may be the same as the remote attestation mode negotiation reply in the embodiments of this application. Therefore, for implementations and effects of operation 2304 to operation 2306, refer to related descriptions in the embodiment corresponding to FIG. 12.

Figure 24:
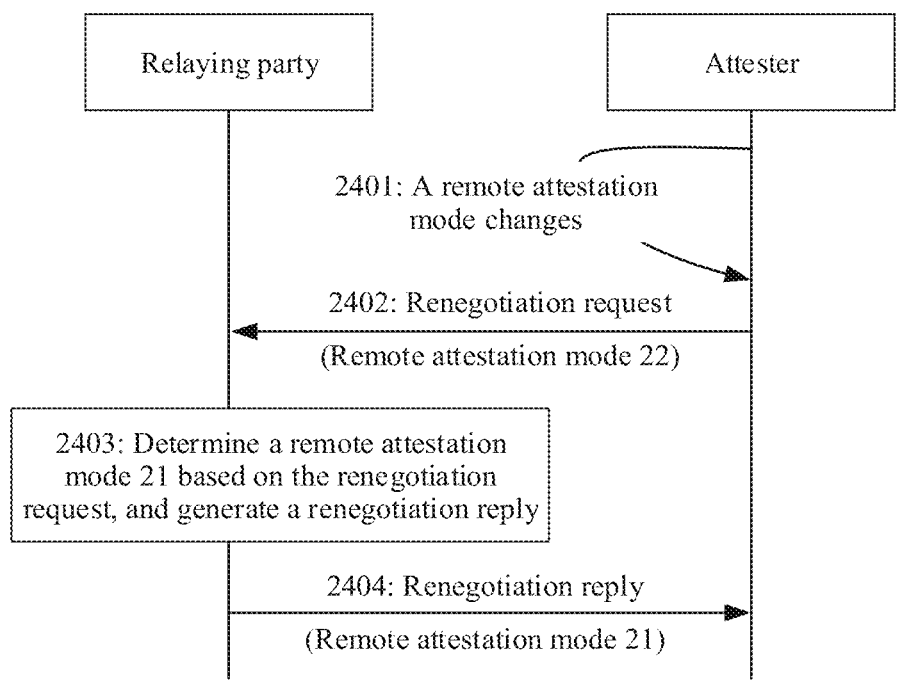
FIG. 24 is a signaling flowchart of still another remote attestation mode negotiation method according to an embodiment of this application.

In another example, as shown in FIG. 24, the attester may actively initiate remote attestation mode renegotiation. During implementation, the method may include the following operations.

Operation 2401: A remote attestation mode supported by the attester changes.

Operation 2402: The attester initiates a remote attestation mode renegotiation request to the relaying party, where the renegotiation request carries indication information corresponding to a remote attestation mode 22 currently supported by the attester.

Operation 2403: The relaying party obtains, based on the renegotiation request, the remote attestation mode 22 supported by the attester, and then determines, based on a remote attestation mode and a security requirement of the relaying party, a remote attestation mode 21 subsequently used by the relaying party and the attester. The security requirement may be, for example, priorities of different remote attestation modes defined on the attester.

Operation 2404: The relaying party sends a renegotiation reply to the attester, where the renegotiation reply carries indication information corresponding to the determined remote attestation mode 21.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 2402 to operation 2404, refer to related descriptions in the embodiment corresponding to FIG. 4.

Figure 25:
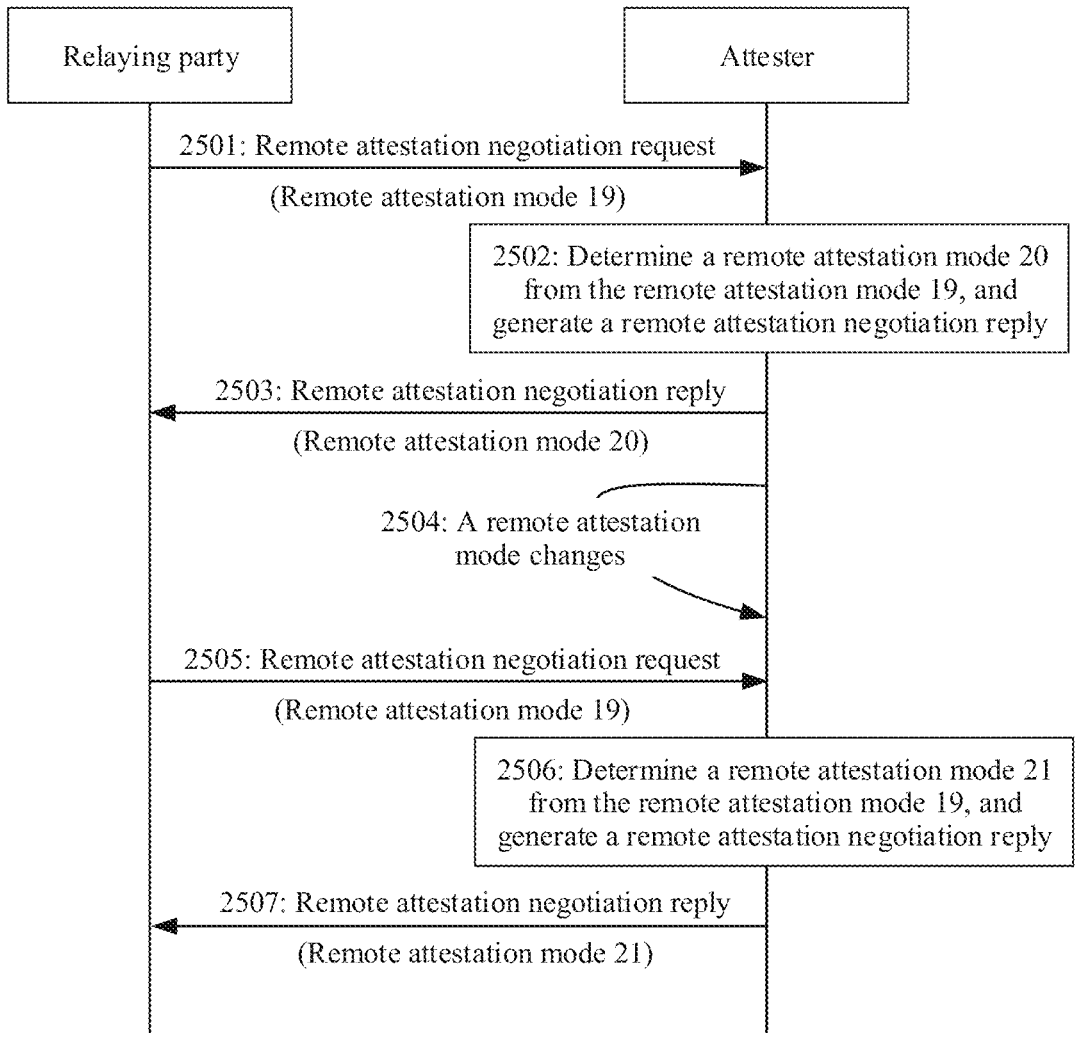
FIG. 25 is a signaling flowchart of yet another remote attestation mode negotiation method according to an embodiment of this application.

In still another example, as shown in FIG. 25, if the relaying party and the attester periodically negotiate with each other about a remote attestation mode between the relaying party and the attester, the attester may update a remote attestation mode between the relaying party and the attester through negotiation in a next period. During implementation, the method may include the following operations.

Operation 2501: In a first period, the relaying party initiates a remote attestation mode negotiation request to the attester, where the negotiation request carries indication information corresponding to a remote attestation mode 19 supported by the relaying party.

Operation 2502: The attester obtains, based on the remote attestation mode negotiation request, the remote attestation mode 19 supported by the relaying party, and then determines, based on a remote attestation mode and a security requirement of the attester, a remote attestation mode 20 subsequently used by the attester and the relaying party. The security requirement may be, for example, priorities of different remote attestation modes defined on the attester.

Operation 2503: The attester sends a remote attestation mode negotiation reply to the relaying party, where the negotiation reply carries indication information corresponding to the determined remote attestation mode 20.

Operation 2504: The remote attestation mode supported by the attester changes.

Operation 2505: In a second period, the relaying party initiates a remote attestation mode renegotiation request to the attester, where the renegotiation request carries indication information corresponding to a remote attestation mode 19 supported by the relaying party.

Operation 2506: The attester obtains, based on the remote attestation mode negotiation request, the remote attestation mode 19 supported by the relaying party, and then determines, based on a remote attestation mode and a security requirement of the attester, a remote attestation mode 21 subsequently used by the attester and the relaying party. The security requirement may be, for example, priorities of different remote attestation modes defined on the attester.

Operation 2507: The attester sends a remote attestation mode negotiation reply to the relaying party, where the negotiation reply carries indication information corresponding to the determined remote attestation mode 21.

It should be noted that, for implementations and effects of operation 2501 to operation 2503 and operation 2505 to operation 2507, refer to related descriptions of the embodiment corresponding to FIG. 12.

In this way, remote attestation mode renegotiation between the relaying party and the attester is implemented after the remote attestation mode supported by the attester changes, thereby ensuring accuracy and reliability of subsequent remote attestation.

Figure 26:
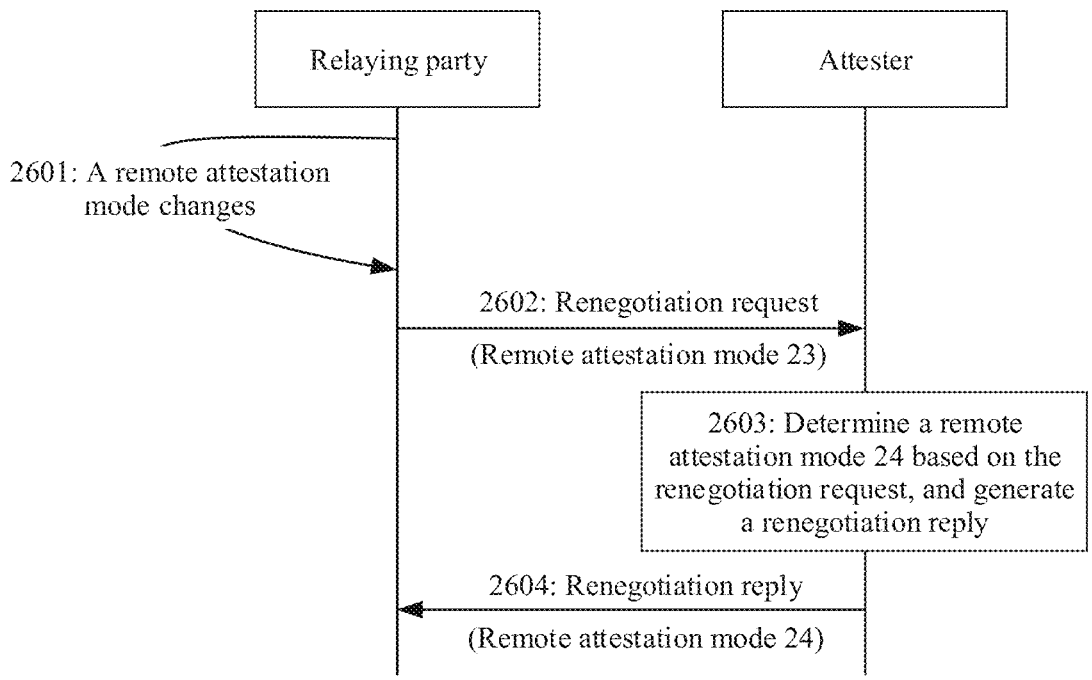
FIG. 26 is a signaling flowchart of still yet another remote attestation mode negotiation method according to an embodiment of this application.

When the relaying party is upgraded, the remote attestation mode supported by the relaying party is very likely to change. In this case, in an example, as shown in FIG. 26, the attester may actively initiate remote attestation mode renegotiation. During implementation, the method may include the following operations.

Operation 2601: A remote attestation mode supported by the relaying party changes.

Operation 2602: The relaying party initiates a remote attestation mode renegotiation request to the attester, where the renegotiation request carries indication information corresponding to a remote attestation mode 23 supported by the relaying party.

Operation 2603: The attester obtains, based on the renegotiation request, the remote attestation mode 23 supported by the relaying party, and then determines, based on a remote attestation mode and a security requirement of the attester, a remote attestation mode 24 subsequently used by the attester and the relaying party. The security requirement may be, for example, priorities of different remote attestation modes defined on the attester.

Operation 2604: The attester sends a renegotiation reply to the relaying party, where the renegotiation reply carries indication information corresponding to the determined remote attestation mode 24.

It should be noted that the renegotiation request may be the same as the remote attestation mode negotiation request in the embodiments of this application, and the renegotiation reply may be the same as the remote attestation mode negotiation reply in the embodiments of this application. Therefore, for implementations and effects of operation 2602 to operation 2604, refer to related descriptions in the embodiment corresponding to FIG. 12.

In this way, remote attestation mode renegotiation between the relaying party and the attester is implemented after the remote attestation mode supported by the relaying party changes, thereby ensuring accuracy and reliability of subsequent remote attestation.

To make the remote attestation mode negotiation method provided in the embodiments of this application clearer, with reference to the accompanying drawings, the following describes an example process of the remote attestation mode negotiation method in detail by using an example in which a to-be-attested device Attester and a verification server Verifier/relying party Relaying Party perform remote attestation mode negotiation by using a NETCONF protocol. It should be noted that the relaying party is separately connected to the verifier and the attester, and is used as a bridge for information exchange between the verifier and the attester. The relaying party and the verifier may be disposed in a same network device, or may be two independently disposed network devices.

Figure 27:
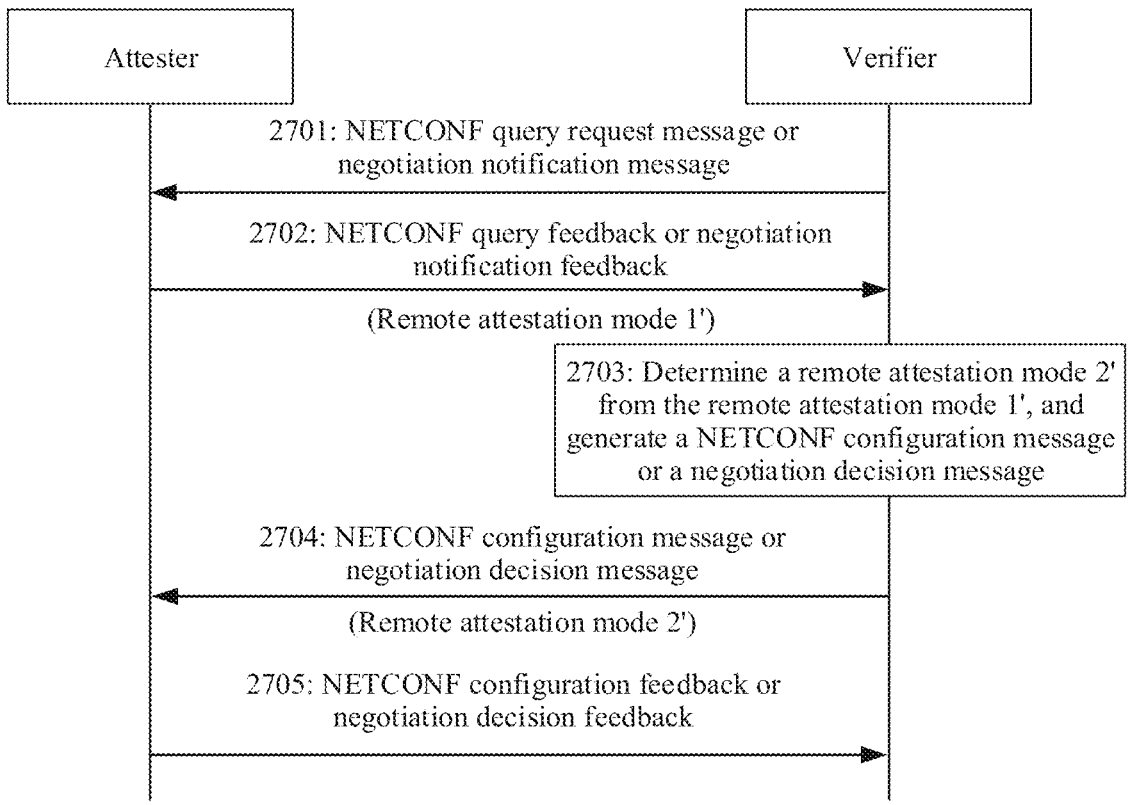
FIG. 27 is a signaling flowchart of a NETCONF protocol-based negotiation method according to an embodiment of this application.

In a first example, for the negotiation initiated by the verifier to the attester, refer to FIG. 27. The NETCONF protocol-based remote attestation mode negotiation method provided in the embodiments of this application may include operation 2701 to operation 2703.

Operation 2701: The verifier sends a NETCONF query request message or a negotiation notification message to the attester.

It may be understood that the NETCONF query request message or the negotiation notification message is used to notify the attester that negotiation starts, and is used to notify the attester that the verifier needs to learn of a remote attestation mode supported by the attester.

Operation 2702: The attester sends a NETCONF query feedback or a negotiation notification feedback to the verifier, where the NETCONF query feedback or the negotiation notification feedback is used to indicate a remote attestation mode 1', and the remote attestation mode 1' is the remote attestation mode supported by the attester.

It should be noted that the remote attestation mode 1' may be described by using the foregoing YANG data model.

Operation 2703: The verifier determines a remote attestation mode 2' from the remote attestation mode 1', and generates a NETCONF configuration message or a negotiation decision message, where the NETCONF configuration message or the negotiation decision message is used to indicate the remote attestation mode 2' supported by the verifier.

It may be understood that the verifier may determine, based on the remote attestation mode of the verifier, the remote attestation mode 1' supported by the attester, and a security requirement of the verifier (for example, priorities of different remote attestation modes defined on the verifier), a remote attestation mode subsequently used by the verifier and the attester for remote attestation.

Operation 2704: The verifier sends the NETCONF configuration message or the negotiation decision message to the attester.

Operation 2705: The attester sends a NETCONF configuration feedback or a negotiation decision feedback to the verifier.

It should be noted that the remote attestation mode 2' may be described by using the foregoing YANG data model.

Similar to the case in which remote attestation is performed between the verifier and the attester in the mode in FIG. 7 after remote attestation mode negotiation is performed in the negotiation mode in FIG. 4, for a process of performing remote attestation between the verifier and the attester after remote attestation mode negotiation is performed in the negotiation mode in FIG. 27, refer to related descriptions in the embodiment corresponding to FIG. 7. Details are not described herein again.

In some implementations, to ensure remote attestation accuracy, once the remote attestation mode supported by either of the attester and the verifier changes, the attester and the verifier need to renegotiate to determine a remote attestation mode used during remote attestation.

When the attester is upgraded, the remote attestation mode supported by the attester is very likely to change. In this case, the following two examples are used to describe the process of renegotiation between the attester and the verifier.

Figure 28:
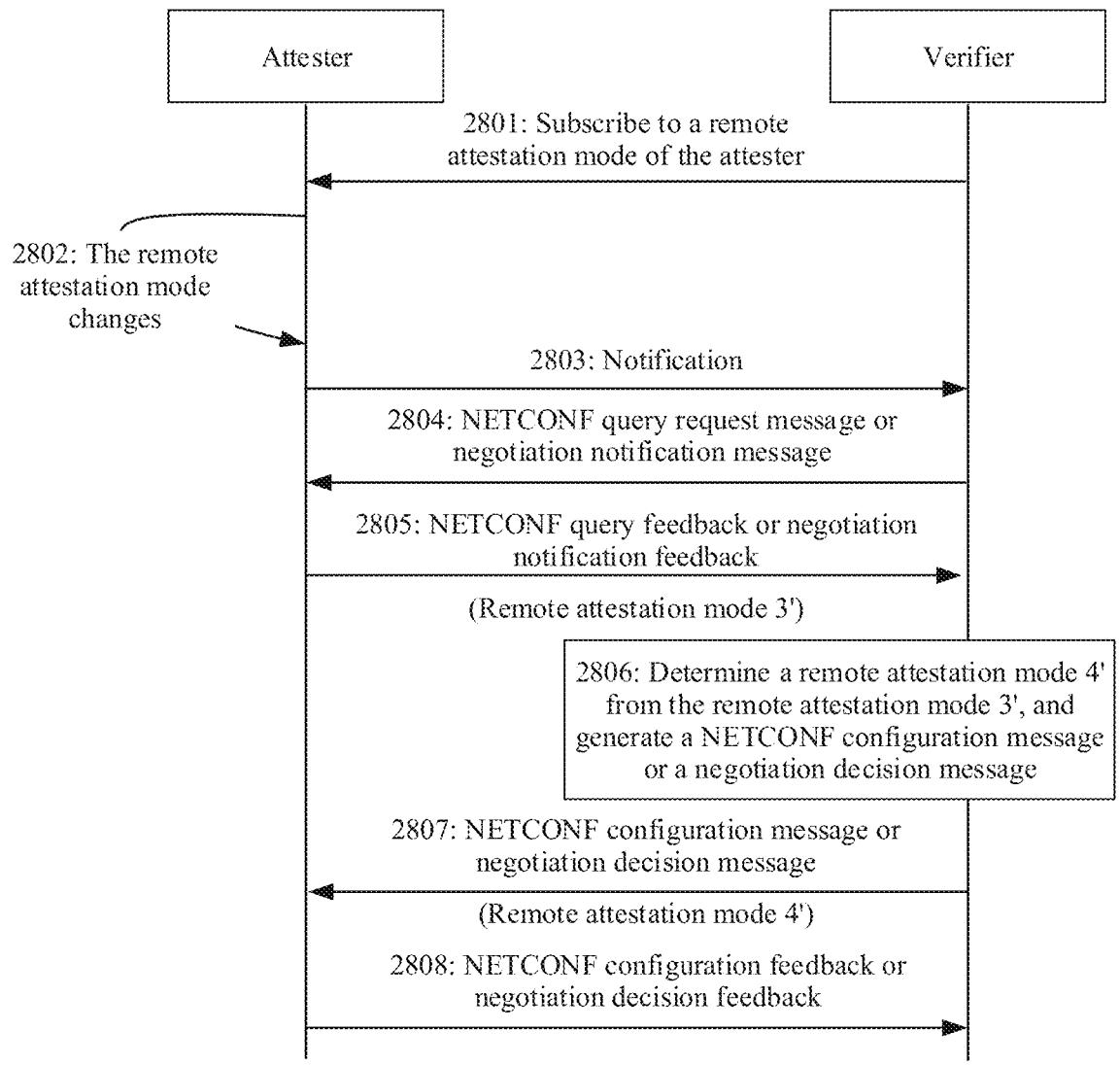
FIG. 28 is a signaling flowchart of another NETCONF protocol-based negotiation method according to an embodiment of this application.

In a first example, as shown in FIG. 28, the attester may notify the verifier that a remote attestation mode change event occurs on the attester corresponding to the verifier, and then the verifier initiates remote attestation mode renegotiation. During implementation, the method may include the following operations.

Operation 2801: The verifier subscribes to a remote attestation mode of the attester from the attester by using a mechanism such as a NETCONF notification.

Operation 2802: The remote attestation mode of the attester changes.

Operation 2803: The attester sends a notification to the verifier.

In one case, the notification is only used to notify the verifier of the event that the remote attestation mode supported by the attester changes. In this case, operation 2804 and operation 2805 need to be performed to query a changed remote attestation mode supported by the attester.

In another case, the notification may carry a changed remote attestation mode supported by the attester or indicate changed content. In this case, operation 2804 and operation 2805 are optional operations, and may be performed to determine the changed remote attestation mode supported by the attester. Alternatively, operation 2804 and operation 2805 may not be performed, but operation 2806 is directly performed for determining.

Operation 2804: The verifier sends a NETCONF query request message or a negotiation notification message to the attester.

Operation 2805: The attester sends a NETCONF query feedback or a negotiation notification feedback to the verifier, where the NETCONF query feedback or the negotiation notification feedback is used to indicate a remote attestation mode 3', and the remote attestation mode 3' is the remote attestation mode supported by the attester.

Operation 2806: The verifier determines a remote attestation mode 4' from the remote attestation mode 3', and generates a NETCONF configuration message or a negotiation decision message, where the NETCONF configuration message or the negotiation decision message is used to indicate the remote attestation mode 4' supported by the verifier.

Operation 2807: The verifier sends the NETCONF configuration message or the negotiation decision message to the attester, where the NETCONF configuration message or the negotiation decision message carries the remote attestation mode 4'.

Operation 2808: The attester sends a NETCONF configuration feedback or a negotiation decision feedback to the verifier.

Figure 29:
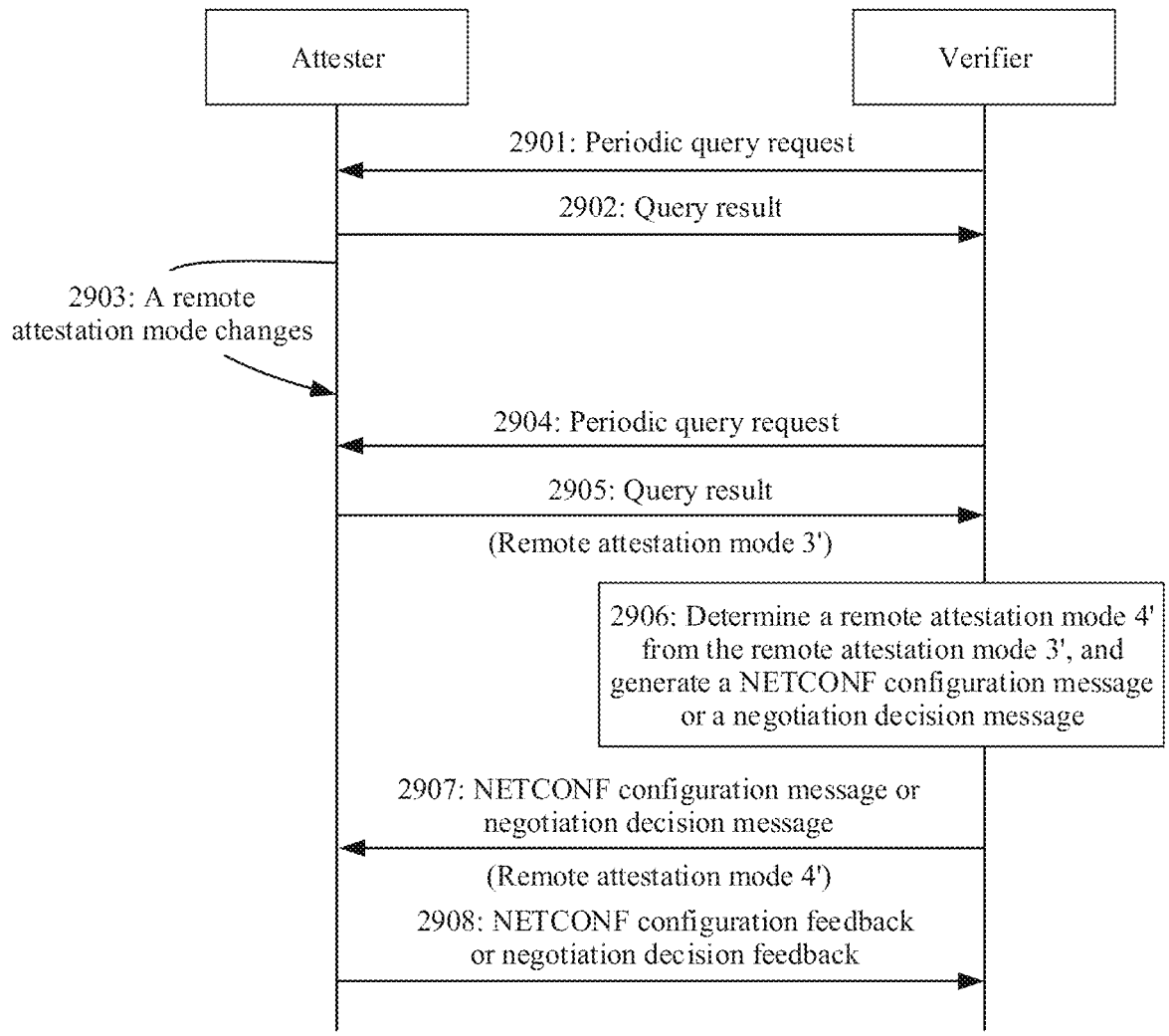
FIG. 29 is a signaling flowchart of still another NETCONF protocol-based negotiation method according to an embodiment of this application.

In a second example, as shown in FIG. 29, if the verifier periodically queries a remote attestation mode supported by the attester, the verifier may perform renegotiation by querying a remote attestation mode in a next period. During implementation, the method may include the following operations.

Operation 2901: The verifier sends a periodic query request to the attester.

Operation 2902: The attester returns a query result to the verifier.

It should be noted that the query result may include a remote attestation mode currently supported by the attester, or status information about whether a remote attestation mode changes. When the query result indicates that the remote attestation mode supported by the attester remains unchanged, no renegotiation is required, that is, the verifier does not need to re-determine a new remote attestation mode. When the query result indicates that the remote attestation mode supported by the attester changes, operations similar to operation 2703 to operation 2705 in FIG. 27 need to be performed for re-determining.

Operation 2903: The remote attestation mode of the attester changes.

Operation 2904: In a next period, the verifier sends a periodic query request to the attester.

Operation 2905: The attester returns a query result to the verifier, where the query result includes a changed remote attestation mode 3' supported by the attester.

Operation 2906: The verifier determines a remote attestation mode 4' from the remote attestation mode 3', and generates a NETCONF configuration message or a negotiation decision message, where the NETCONF configuration message or the negotiation decision message is used to indicate the remote attestation mode 4' supported by the verifier.

Operation 2907: The verifier sends the NETCONF configuration message or the negotiation decision message to the attester, where the NETCONF configuration message or the negotiation decision message carries the remote attestation mode 4'.

Operation 2908: The attester sends a NETCONF configuration feedback or a negotiation decision feedback to the verifier.

In this way, in the foregoing two examples, remote attestation mode renegotiation between the attester and the verifier is implemented after the remote attestation mode supported by the attester changes, thereby ensuring accuracy and reliability of subsequent remote attestation.

Figure 30:
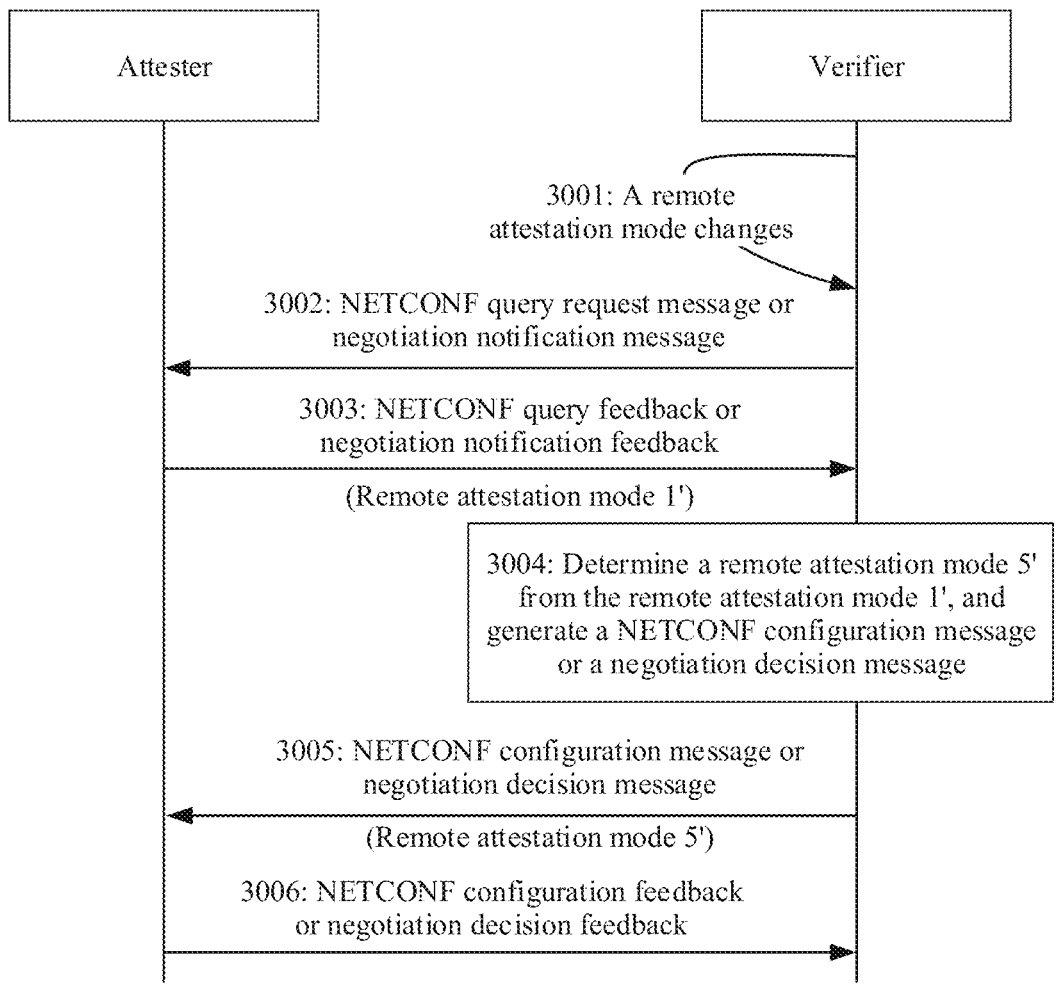
FIG. 30 is a signaling flowchart of yet another NETCONF protocol-based negotiation method according to an embodiment of this application.

When the verifier is upgraded, the remote attestation mode supported by the verifier is very likely to change. In this case, as shown in FIG. 30, the verifier may actively initiate remote attestation mode renegotiation. During implementation, the method may include the following operations.

Operation 3001: A remote attestation mode supported by the verifier changes.

Operation 3002: The verifier sends a NETCONF query request message or a negotiation notification message to the attester.

It should be noted that, because a remote attestation mode supported by the attester remains unchanged, operation 3002 and operation 3003 are optional operations, that is, operation 3004 to operation 3006 may be directly performed for determining without querying the remote attestation mode supported by the attester again. Alternatively, operation 3002 and operation 3003 may be performed to re-query a remote attestation mode currently supported by the attester, so that the negotiation process is more reliable.

Operation 3003: The attester sends a NETCONF query feedback or a negotiation notification feedback to the verifier, where the NETCONF query feedback or the negotiation notification feedback is used to indicate a remote attestation mode 1', and the remote attestation mode 1' is the remote attestation mode supported by the attester.

Operation 3004: The verifier determines a remote attestation mode 5' from the remote attestation mode 1', and generates a NETCONF configuration message or a negotiation decision message, where the NETCONF configuration message or the negotiation decision message is used to indicate the remote attestation mode 5' supported by the verifier.

Operation 3005: The verifier sends the NETCONF configuration message or the negotiation decision message to the attester.

Operation 3006: The attester sends a NETCONF configuration feedback or a negotiation decision feedback to the verifier.

In this way, remote attestation mode renegotiation between the attester and the verifier is implemented after the remote attestation mode supported by the verifier changes, thereby ensuring accuracy and reliability of subsequent remote attestation.

Figure 31:
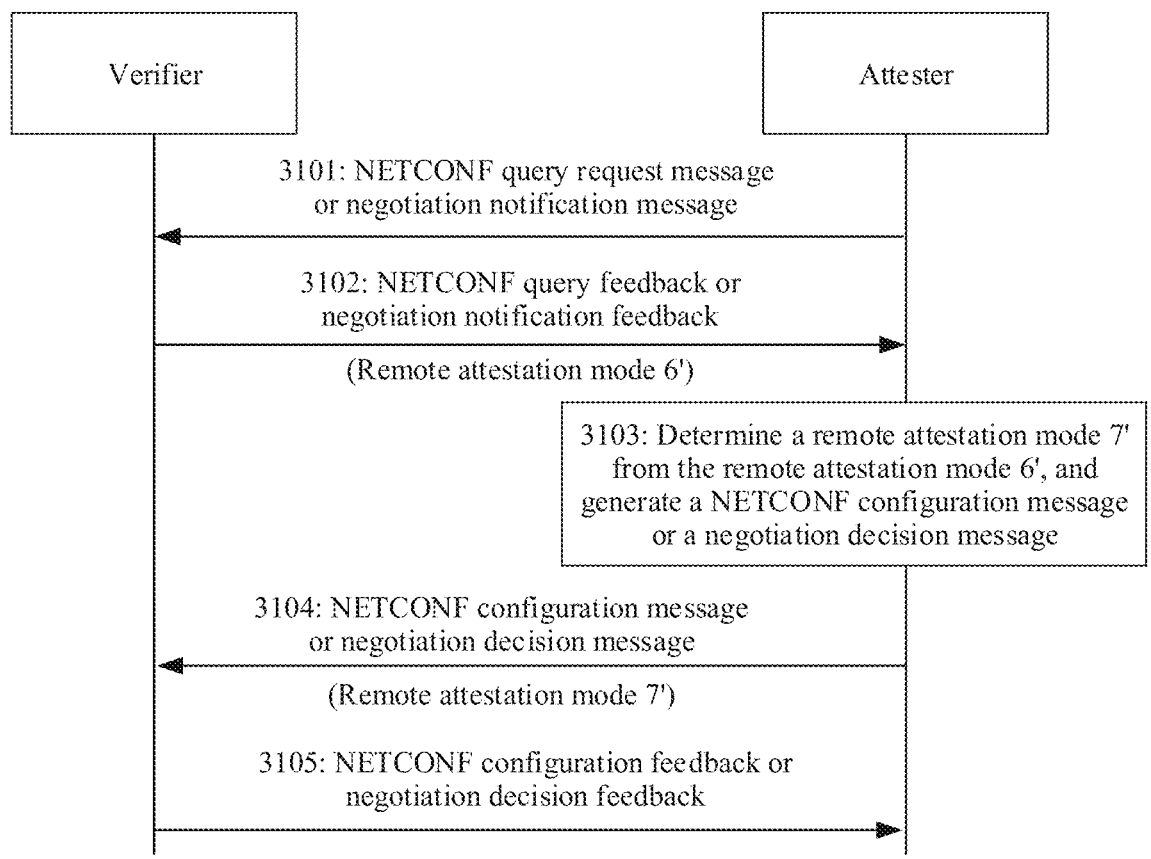
FIG. 31 is a signaling flowchart of a NETCONF protocol-based negotiation method according to an embodiment of this application.

In a second example, for the negotiation initiated by the attester to the verifier, refer to FIG. 31. The NETCONF protocol-based remote attestation mode negotiation method provided in the embodiments of this application may include operation 3101 to operation 3103.

Operation 3101: The attester sends a NETCONF query request message or a negotiation notification message to the verifier.

Operation 3102: The verifier sends a NETCONF query feedback or a negotiation notification feedback to the attester, where the NETCONF query feedback or the negotiation notification feedback is used to indicate a remote attestation mode 6', and the remote attestation mode 6' is a remote attestation mode supported by the verifier.

Operation 3103: The attester determines a remote attestation mode 7' from the remote attestation mode 6', and generates a NETCONF configuration message or a negotiation decision message, where the NETCONF configuration message or the negotiation decision message is used to indicate the remote attestation mode 7' supported by the attester.

Operation 3104: The attester sends the NETCONF configuration message or the negotiation decision message to the verifier, where the NETCONF configuration message or the negotiation decision message carries the remote attestation mode 7'.

Operation 3105: The verifier sends a NETCONF configuration feedback or a negotiation decision feedback to the attester.

It should be noted that the remote attestation mode 7' may be described by using the foregoing YANG data model.

Similar to the case in which remote attestation is performed between the attester and the verifier in the mode in FIG. 7 after remote attestation mode negotiation is performed in the negotiation mode in FIG. 4, for a process of performing remote attestation between the attester and the verifier after remote attestation mode negotiation is performed in the negotiation mode in FIG. 31, refer to related descriptions in the embodiment corresponding to FIG. 7. Details are not described herein again.

In some implementations, to ensure remote attestation accuracy, once the remote attestation mode supported by either of the verifier and the attester changes, the verifier and the attester need to renegotiate to determine a remote attestation mode used during remote attestation.

When the verifier is upgraded, the remote attestation mode supported by the verifier is very likely to change. In this case, the following two examples are used to describe the process of renegotiation between the verifier and the attester.

Figure 32:
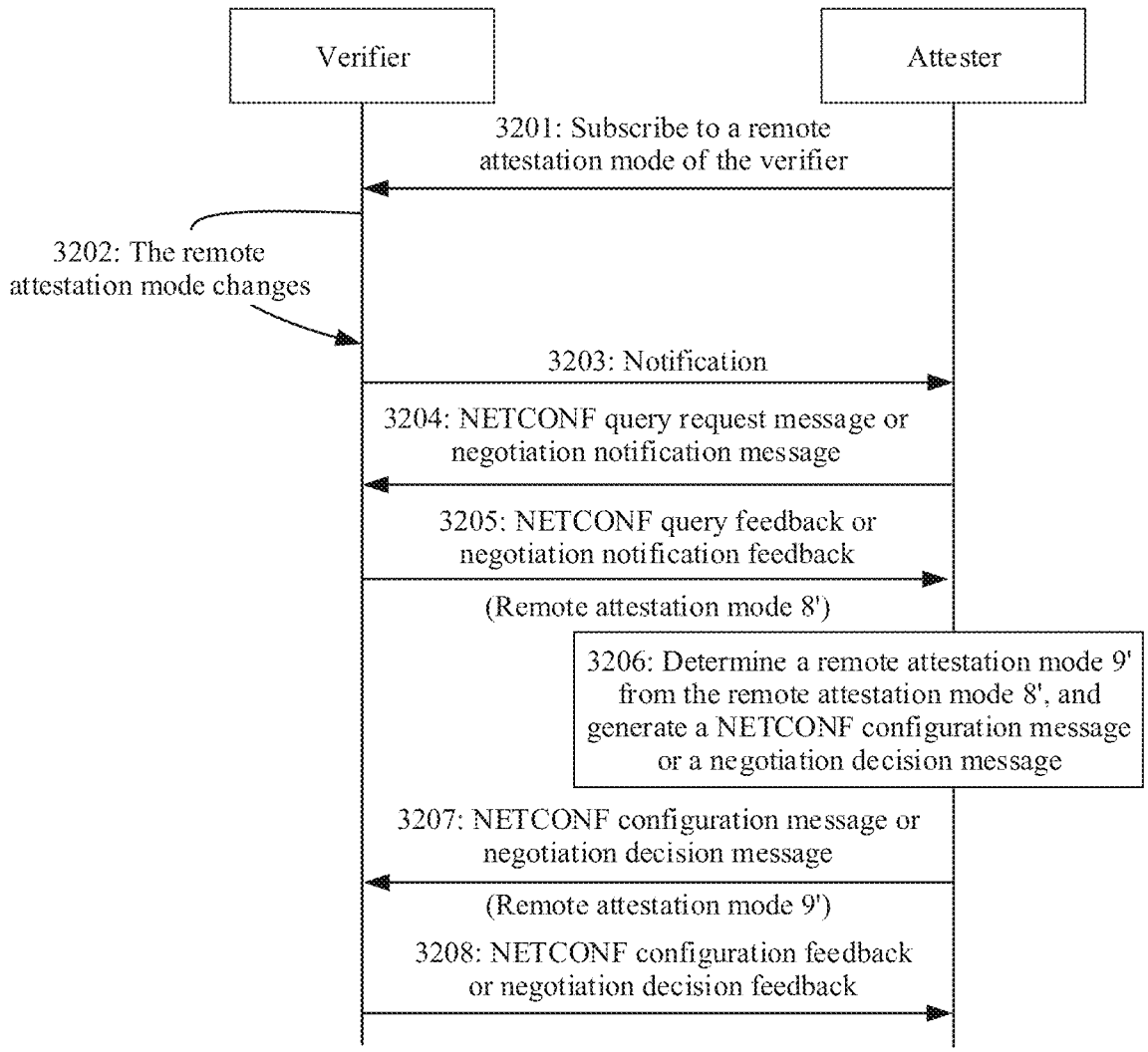
FIG. 32 is a signaling flowchart of another NETCONF protocol-based negotiation method according to an embodiment of this application.

In a first example, as shown in FIG. 32, the verifier may notify the attester that a remote attestation mode change event occurs on the verifier corresponding to the attester, and then the attester initiates remote attestation mode renegotiation. During implementation, the method may include the following operations.

Operation 3201: The attester subscribes to a remote attestation mode of the verifier from the verifier by using a mechanism such as a NETCONF notification.

Operation 3202: The remote attestation mode of the verifier changes.

Operation 3203: The verifier sends a notification to the attester.

In one case, the notification is only used to notify the attester of the event that the remote attestation mode supported by the verifier changes. In this case, operation 3204 and operation 3205 need to be performed to query a changed remote attestation mode supported by the verifier.

In another case, the notification may carry a changed remote attestation mode supported by the verifier or indicate changed content. In this case, operation 3204 and operation 3205 are optional operations, and may be performed to determine the changed remote attestation mode supported by the verifier. Alternatively, operation 3204 and operation 3205 may not be performed, but operation 3206 is directly performed for determining.

Operation 3204: The attester sends a NETCONF query request message or a negotiation notification message to the verifier.

Operation 3205: The verifier sends a NETCONF query feedback or a negotiation notification feedback to the attester, where the NETCONF query feedback or the negotiation notification feedback is used to indicate a remote attestation mode 8', and the remote attestation mode 8' is a remote attestation mode supported by the verifier.

Operation 3206: The attester determines a remote attestation mode 9' from the remote attestation mode 8', and generates a NETCONF configuration message or a negotiation decision message, where the NETCONF configuration message or the negotiation decision message is used to indicate the remote attestation mode 9' supported by the attester.

Operation 3207: The attester sends the NETCONF configuration message or the negotiation decision message to the verifier, where the NETCONF configuration message or the negotiation decision message carries the remote attestation mode 9'.

Operation 3208: The verifier sends a NETCONF configuration feedback or a negotiation decision feedback to the attester.

Figure 33:
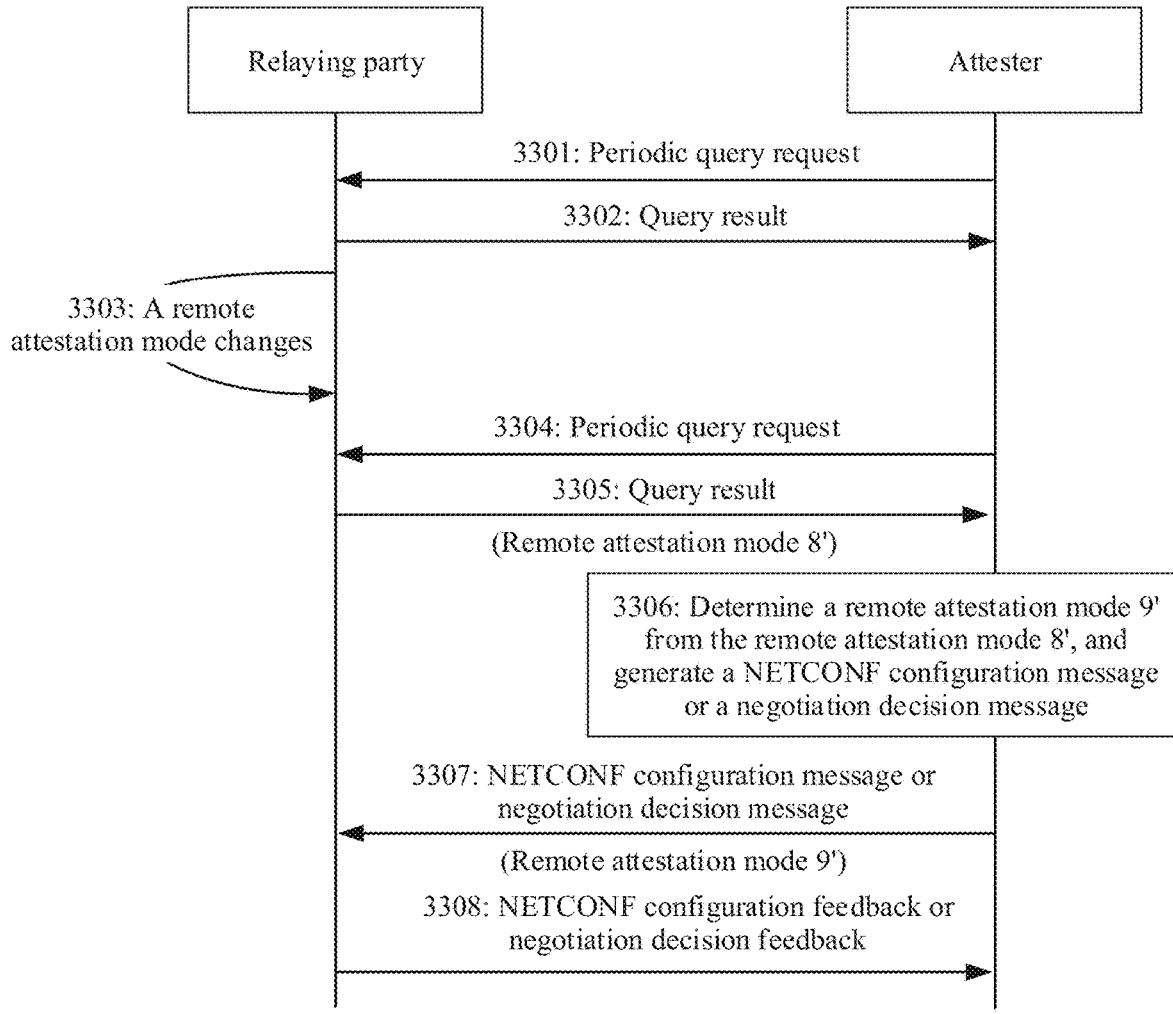
FIG. 33 is a signaling flowchart of still another NETCONF protocol-based negotiation method according to an embodiment of this application.

In a second example, as shown in FIG. 33, if the attester periodically queries a remote attestation mode supported by the verifier, the attester may perform renegotiation by querying a remote attestation mode in a next period. During implementation, the method may include the following operations.

Operation 3301: The attester sends a periodic query request to the verifier.

Operation 3302: The verifier returns a query result to the attester.

It should be noted that the query result may include a remote attestation mode currently supported by the verifier, or status information about whether a remote attestation mode changes. When the query result indicates that the remote attestation mode supported by the verifier remains unchanged, no renegotiation is required, that is, the attester does not need to re-determine a new remote attestation mode. When the query result indicates that the remote attestation mode supported by the verifier changes, operations similar to operation 3103 to operation 3105 in FIG. 31 need to be performed for re-determining.

Operation 3303: The remote attestation mode of the verifier changes.

Operation 3304: In a next period, the attester sends a periodic query request to the verifier.

Operation 3305: The verifier returns a query result to the attester, where the query result includes a changed remote attestation mode 8' supported by the verifier.

Operation 3306: The attester determines a remote attestation mode 9' from the remote attestation mode 8', and generates a NETCONF configuration message or a negotiation decision message, where the NETCONF configuration message or the negotiation decision message is used to indicate the remote attestation mode 9' supported by the attester.

Operation 3307: The attester sends the NETCONF configuration message or the negotiation decision message to the verifier, where the NETCONF configuration message or the negotiation decision message carries the remote attestation mode 9'.

Operation 3308: The verifier sends a NETCONF configuration feedback or a negotiation decision feedback to the attester.

In this way, in the foregoing two examples, remote attestation mode renegotiation between the verifier and the attester is implemented after the remote attestation mode supported by the verifier changes, thereby ensuring accuracy and reliability of subsequent remote attestation.

Figure 34:
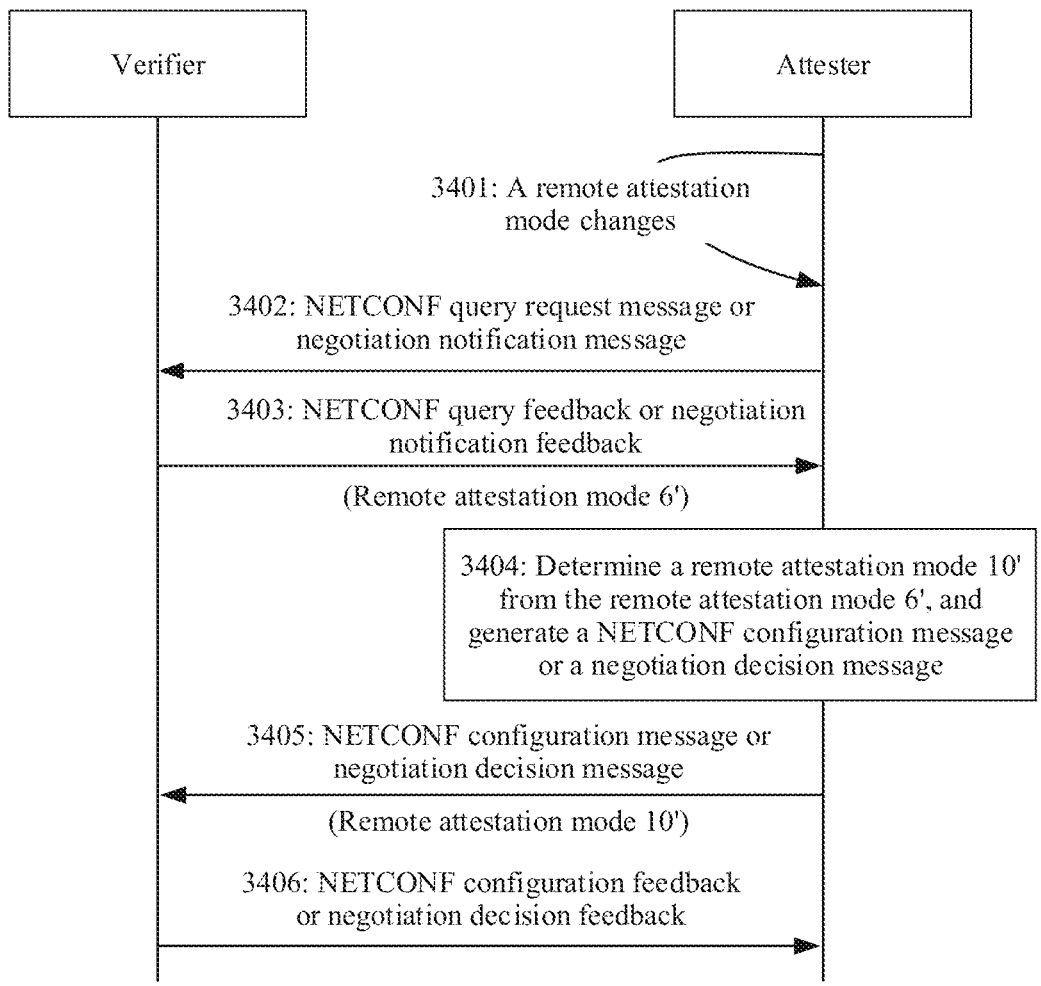
FIG. 34 is a signaling flowchart of yet another NETCONF protocol-based negotiation method according to an embodiment of this application.

When the attester is upgraded, the remote attestation mode supported by the attester is very likely to change. In this case, as shown in FIG. 34, the attester may actively initiate remote attestation mode renegotiation. During implementation, the method may include the following operations.

Operation 3401: A remote attestation mode supported by the attester changes.

Operation 3402: The attester sends a NETCONF query request message or a negotiation notification message to the verifier.

It should be noted that, because a remote attestation mode supported by the verifier remains unchanged, operation 3402 and operation 3403 are optional operations, that is, operation 3404 to operation 3406 may be directly performed for determining without querying the remote attestation mode supported by the verifier again. Alternatively, operation 3402 and operation 3403 may be performed to re-query a remote attestation mode currently supported by the verifier, so that the negotiation process is more reliable.

Operation 3403: The verifier sends a NETCONF query feedback or a negotiation notification feedback to the attester, where the NETCONF query feedback or the negotiation notification feedback is used to indicate a remote attestation mode 6', and the remote attestation mode 6' is a remote attestation mode supported by the verifier.

Operation 3404: The attester determines a remote attestation mode 10' from the remote attestation mode 6', and generates a NETCONF configuration message or a negotiation decision message, where the NETCONF configuration message or the negotiation decision message is used to indicate the remote attestation mode 10' supported by the attester.

Operation 3405: The attester sends the NETCONF configuration message or the negotiation decision message to the verifier, where the NETCONF configuration message or the negotiation decision message carries the remote attestation mode 10'.

Operation 3406: The verifier sends a NETCONF configuration feedback or a negotiation decision feedback to the attester.

In this way, remote attestation mode renegotiation between the verifier and the attester is implemented after the remote attestation mode supported by the attester changes, thereby ensuring accuracy and reliability of subsequent remote attestation.

It should be noted that, in the embodiments, the verifier and the attester may directly perform remote attestation negotiation without using the relying party. In this case, the verifier and the attester directly establish a connection. Alternatively, the relying party exists between the verifier and the attester, but the relying party functions as a relay and is only used to transfer messages such as a remote attestation mode negotiation request, a remote attestation mode negotiation reply, a renegotiation request, and a renegotiation reply between the verifier and the attester.

Figure 35:
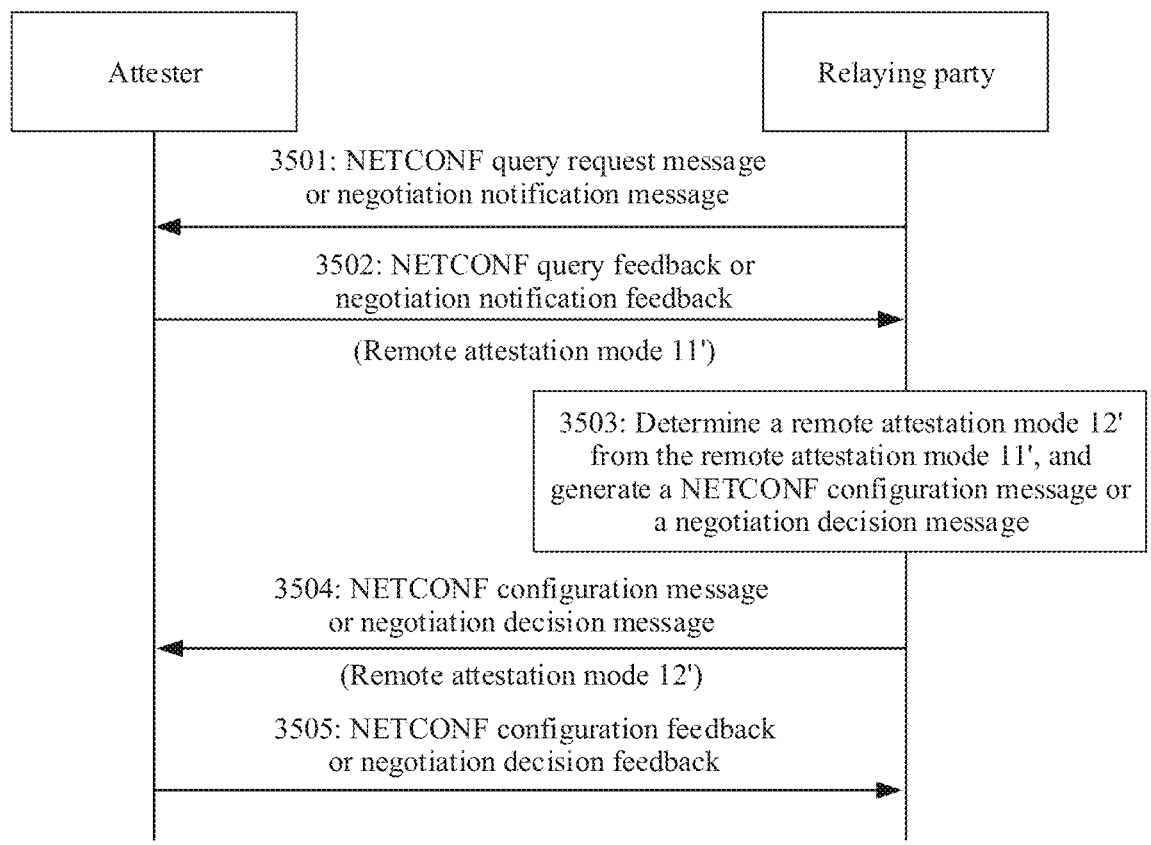
FIG. 35 is a signaling flowchart of a NETCONF protocol-based negotiation method according to an embodiment of this application.
Figure 39:
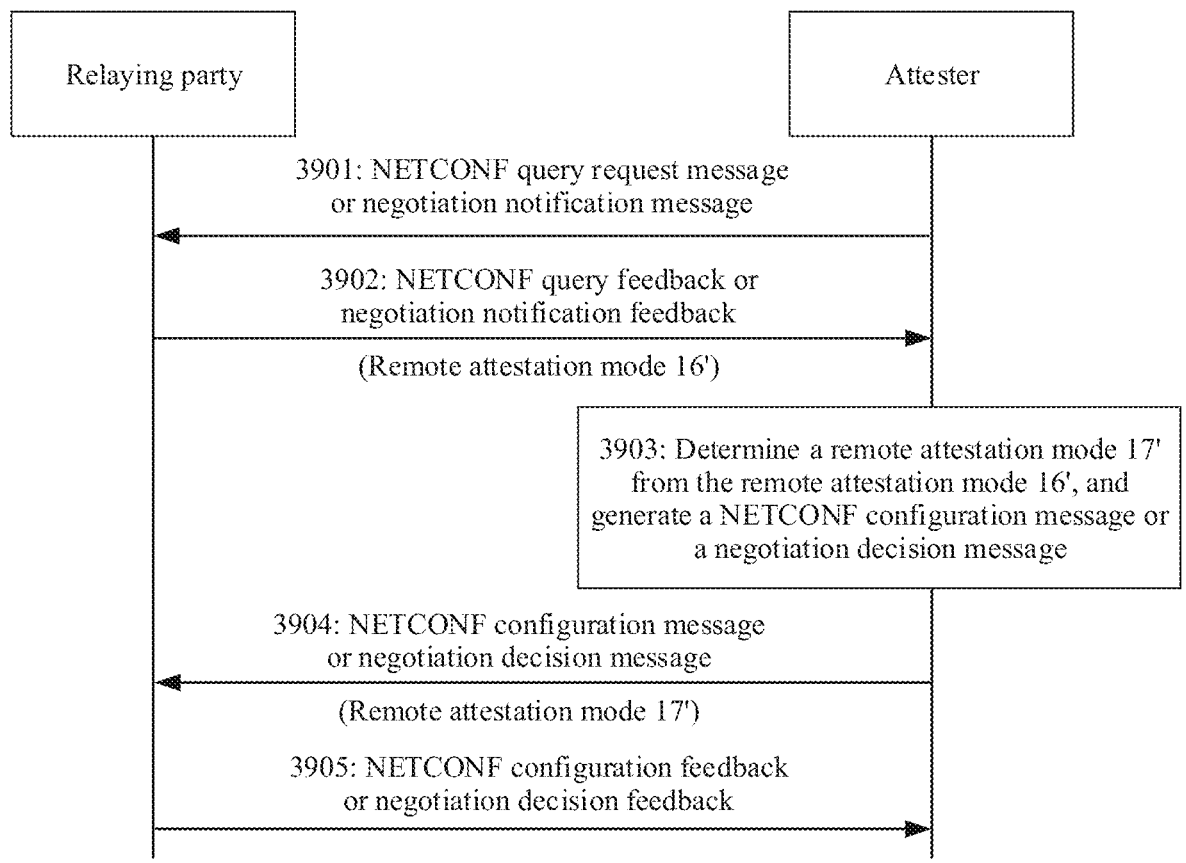
FIG. 39 is a signaling flowchart of a NETCONF protocol-based negotiation method according to an embodiment of this application.

It should be noted that, in the following embodiments of negotiation between the attester and the relaying party corresponding to FIG. 35 and FIG. 39, the relaying party may be a device that has a function of performing remote attestation with the attester. Therefore, FIG. 35 and FIG. 39 show a process in which the relaying party and the attester perform remote attestation mode negotiation. Alternatively, the relaying party may be a relying party, connects the attester and the verifier, and may learn of a remote attestation mode supported by the verifier. Therefore, FIG. 35 and FIG. 39 show a process in which the relaying party replaces the verifier to perform remote attestation mode negotiation with the attester, and the relaying party may notify the verifier of a remote attestation mode determined through negotiation.

In a third example, for the negotiation initiated by the relaying party to the attester, refer to FIG. 35. The NETCONF protocol-based remote attestation mode negotiation method provided in the embodiments of this application may include operation 3501 to operation 3503.

Operation 3501: The relaying party sends a NETCONF query request message or a negotiation notification message to the attester.

Operation 3502: The attester sends a NETCONF query feedback or a negotiation notification feedback to the relaying party, where the NETCONF query feedback or the negotiation notification feedback is used to indicate a remote attestation mode 11', and the remote attestation mode 11' is a remote attestation mode supported by the attester.

Operation 3503: The relaying party determines a remote attestation mode 12' from the remote attestation mode 11', and generates a NETCONF configuration message or a negotiation decision message, where the NETCONF configuration message or the negotiation decision message is used to indicate the remote attestation mode 12' supported by the relaying party.

Operation 3504: The relaying party sends the NETCONF configuration message or the negotiation decision message to the attester, where the NETCONF configuration message or the negotiation decision message carries the remote attestation mode 12'.

Operation 3505: The attester sends a NETCONF configuration feedback or a negotiation decision feedback to the relaying party.

Similar to the case in which remote attestation is performed between the relaying party and the attester in the mode in FIG. 7 after remote attestation mode negotiation is performed in the negotiation mode in FIG. 4, for a process of performing remote attestation between the relaying party and the attester after remote attestation mode negotiation is performed in the negotiation mode in FIG. 35, refer to related descriptions in the embodiment corresponding to FIG. 7. Details are not described herein again.

In some implementations, to ensure remote attestation accuracy, once the remote attestation mode supported by either of the attester and the relaying party changes, the attester and the relaying party need to renegotiate to determine a remote attestation mode used during remote attestation.

When the attester is upgraded, the remote attestation mode supported by the attester is very likely to change. In this case, the following two examples are used to describe the process of renegotiation between the attester and the relaying party.

Figure 36:
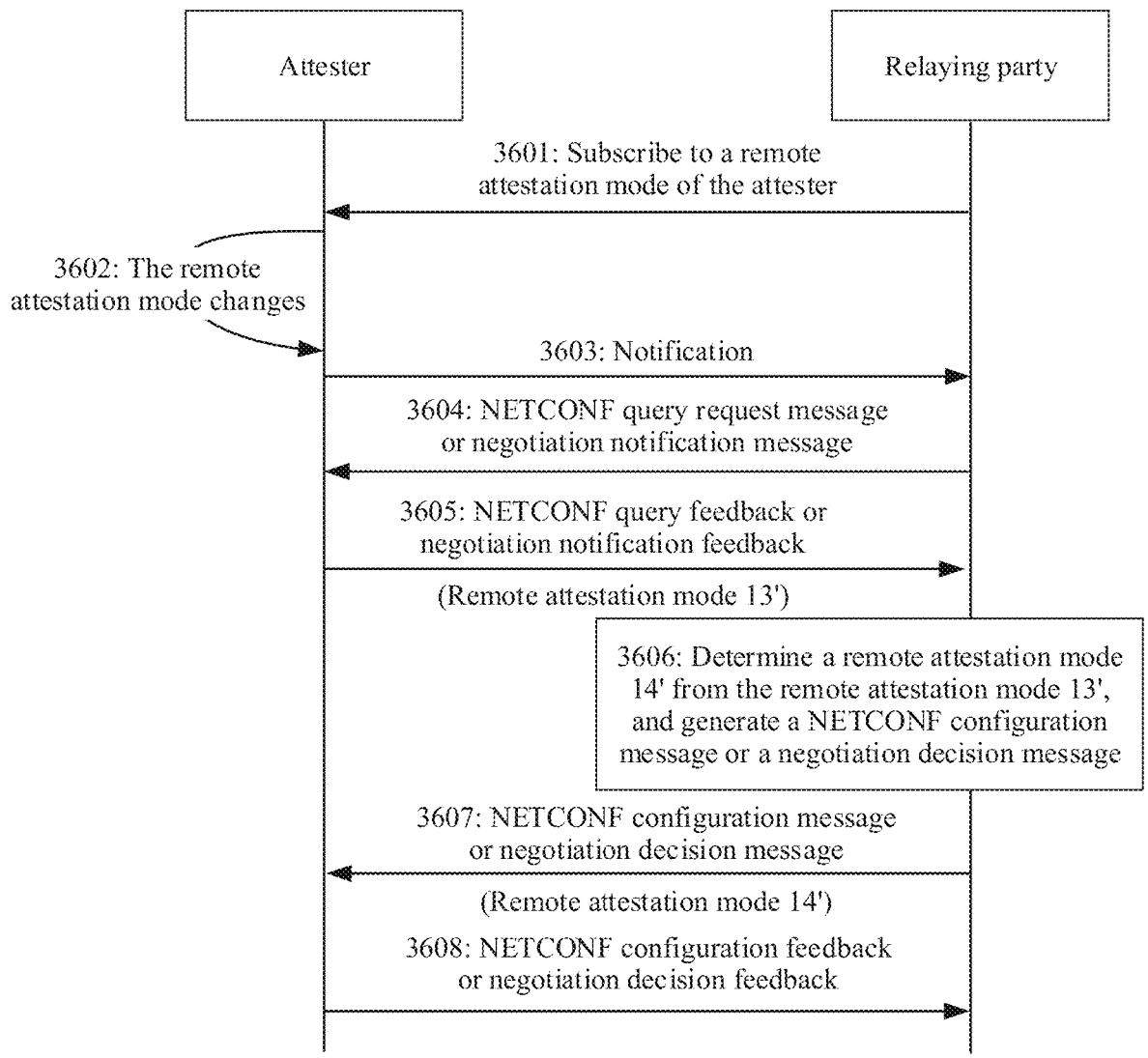
FIG. 36 is a signaling flowchart of another NETCONF protocol-based negotiation method according to an embodiment of this application.

In a first example, as shown in FIG. 36, the attester may notify the relaying party that a remote attestation mode change event occurs on the attester corresponding to the relaying party, and then the relaying party initiates remote attestation mode renegotiation. During implementation, the method may include the following operations.

Operation 3601: The relaying party subscribes to a remote attestation mode of the attester from the attester by using a mechanism such as a NETCONF notification.

Operation 3602: The remote attestation mode of the attester changes.

Operation 3603: The attester sends a notification to the relaying party.

In one case, the notification is only used to notify the relaying party of the event that the remote attestation mode supported by the attester changes. In this case, operation 3604 and operation 3605 need to be performed to query a changed remote attestation mode supported by the attester.

In another case, the notification may carry a changed remote attestation mode supported by the attester or indicate changed content. In this case, operation 3604 and operation 3605 are optional operations, and may be performed to determine the changed remote attestation mode supported by the attester. Alternatively, operation 3604 and operation 3605 may not be performed, but operation 3606 is directly performed for determining.

Operation 3604: The relaying party sends a NETCONF query request message or a negotiation notification message to the attester.

Operation 3605: The attester sends a NETCONF query feedback or a negotiation notification feedback to the relaying party, where the NETCONF query feedback or the negotiation notification feedback is used to indicate a remote attestation mode 13', and the remote attestation mode 13' is a remote attestation mode supported by the attester.

Operation 3606: The relaying party determines a remote attestation mode 14' from the remote attestation mode 13', and generates a NETCONF configuration message or a negotiation decision message, where the NETCONF configuration message or the negotiation decision message is used to indicate the remote attestation mode 14' supported by the relaying party.

Operation 3607: The relaying party sends the NETCONF configuration message or the negotiation decision message to the attester, where the NETCONF configuration message or the negotiation decision message carries the remote attestation mode 14'.

Operation 3608: The attester sends a NETCONF configuration feedback or a negotiation decision feedback to the relaying party.

Figure 37:
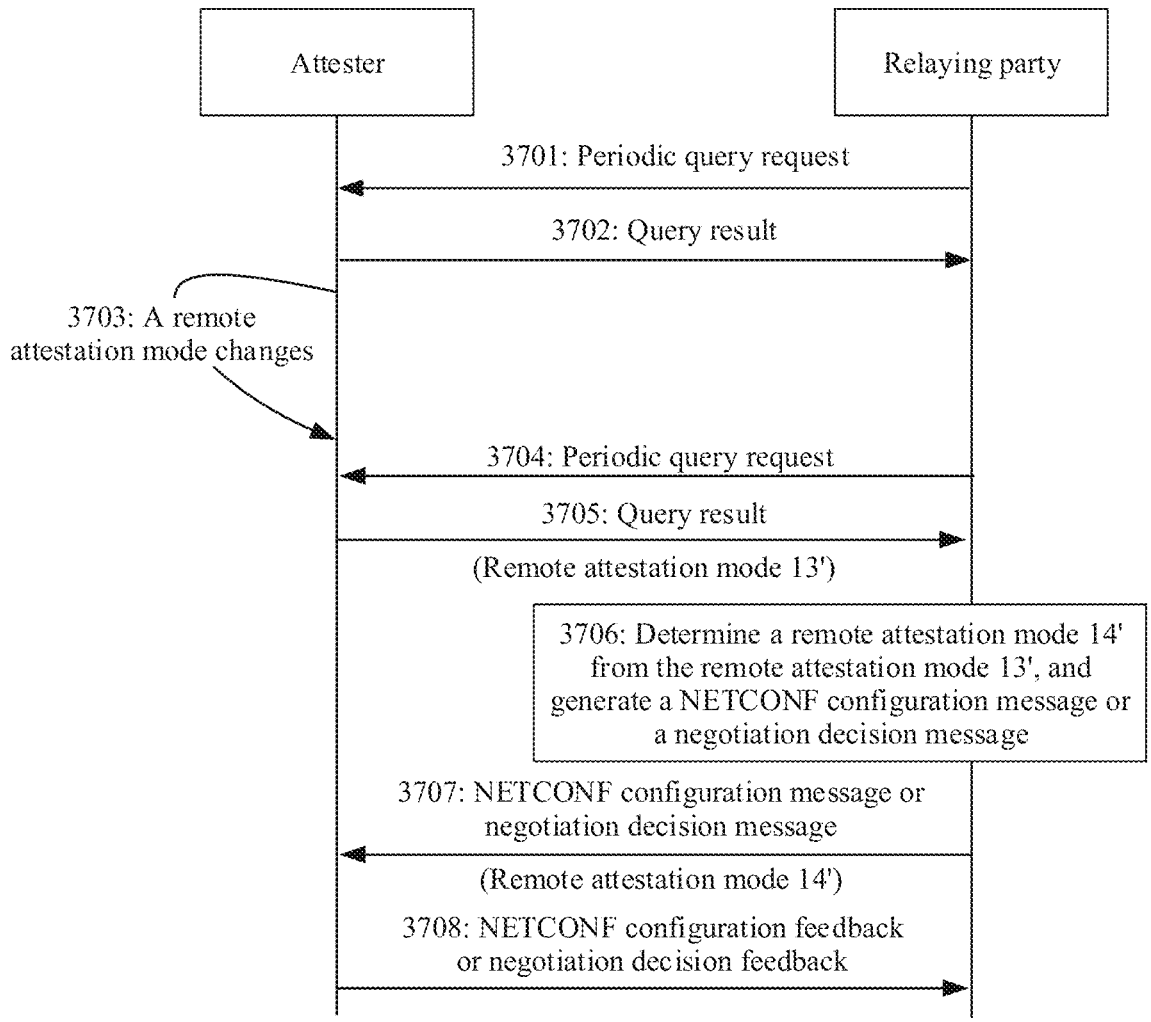
FIG. 37 is a signaling flowchart of still another NETCONF protocol-based negotiation method according to an embodiment of this application.

In a second example, as shown in FIG. 37, if the relaying party periodically queries a remote attestation mode supported by the attester, the relaying party may perform renegotiation by querying a remote attestation mode in a next period. During implementation, the method may include the following operations.

Operation 3701: The relaying party sends a periodic query request to the attester.

Operation 3702: The attester returns a query result to the relaying party.

It should be noted that the query result may include a remote attestation mode currently supported by the attester, or status information about whether a remote attestation mode changes. When the query result indicates that the remote attestation mode supported by the attester remains unchanged, no renegotiation is required, that is, the relaying party does not need to re-determine a new remote attestation mode. When the query result indicates that the remote attestation mode supported by the attester changes, operations similar to operation 3503 to operation 3505 in FIG. 35 need to be performed for re-determining.

Operation 3703: The remote attestation mode of the attester changes.

Operation 3704: In a next period, the relaying party sends a periodic query request to the attester.

Operation 3705: The attester returns a query result to the relaying party, where the query result includes a changed remote attestation mode 13' supported by the attester.

Operation 3706: The relaying party determines a remote attestation mode 14' from the remote attestation mode 13', and generates a NETCONF configuration message or a negotiation decision message, where the NETCONF configuration message or the negotiation decision message is used to indicate the remote attestation mode 14' supported by the relaying party.

Operation 3707: The relaying party sends the NETCONF configuration message or the negotiation decision message to the attester, where the NETCONF configuration message or the negotiation decision message carries the remote attestation mode 14'.

Operation 3708: The attester sends a NETCONF configuration feedback or a negotiation decision feedback to the relaying party.

In this way, in the foregoing two examples, remote attestation mode renegotiation between the attester and the relaying party is implemented after the remote attestation mode supported by the attester changes, thereby ensuring accuracy and reliability of subsequent remote attestation.

Figure 38:
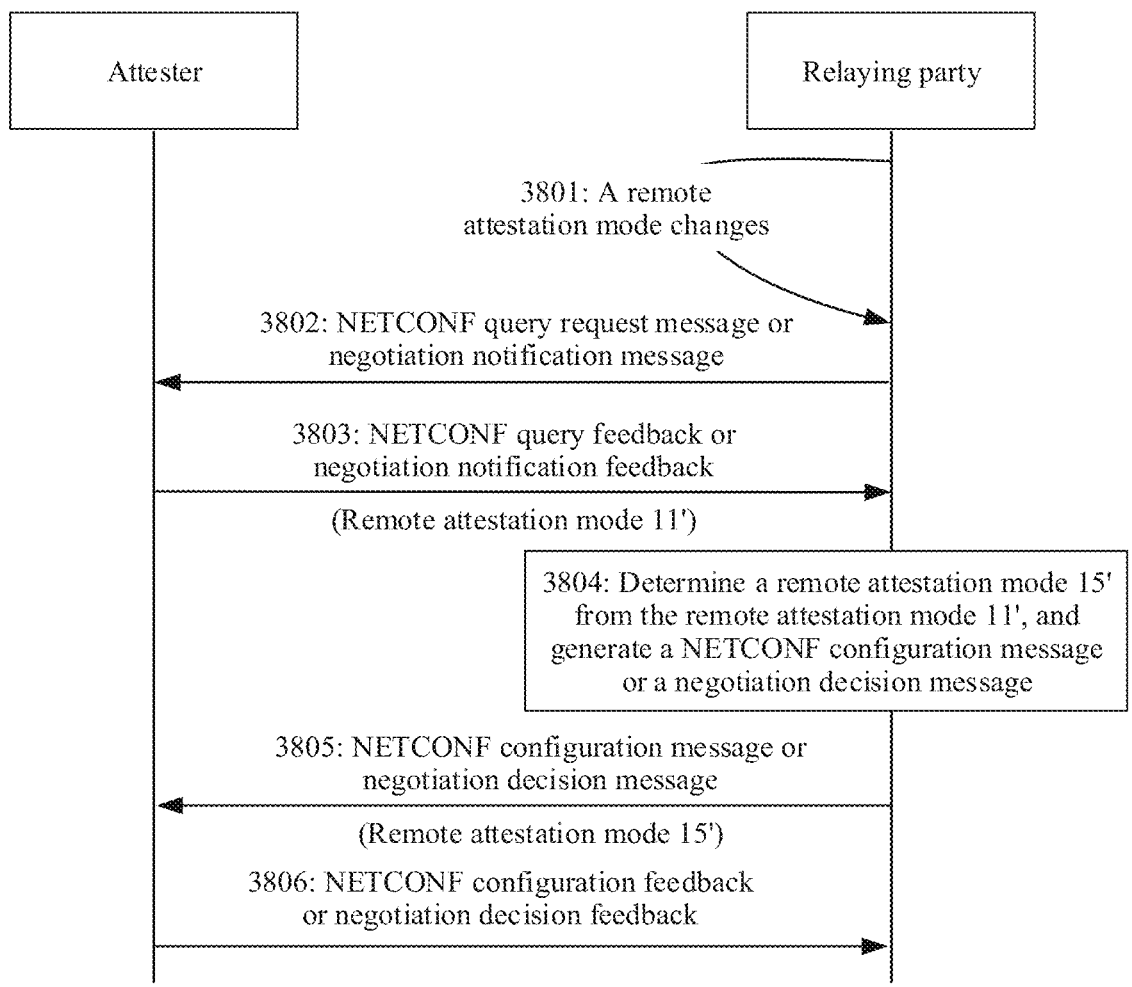
FIG. 38 is a signaling flowchart of yet another NETCONF protocol-based negotiation method according to an embodiment of this application.

When the relaying party is upgraded, the remote attestation mode supported by the relaying party is very likely to change. In this case, as shown in FIG. 38, the relaying party may actively initiate remote attestation mode renegotiation. During implementation, the method may include the following operations.

Operation 3801: A remote attestation mode supported by the relaying party changes.

Operation 3802: The relaying party sends a NETCONF query request message or a negotiation notification message to the attester.

It should be noted that, because a remote attestation mode supported by the attester remains unchanged, operation 3802 and operation 3803 are optional operations, that is, operation 3804 to operation 3806 may be directly performed for determining without querying the remote attestation mode supported by the attester again. Alternatively, operation 3802 and operation 3803 may be performed to re-query a remote attestation mode currently supported by the attester, so that the negotiation process is more reliable.

Operation 3803: The attester sends a NETCONF query feedback or a negotiation notification feedback to the relaying party, where the NETCONF query feedback or the negotiation notification feedback is used to indicate a remote attestation mode 11', and the remote attestation mode 11' is a remote attestation mode supported by the attester.

Operation 3804: The relaying party determines a remote attestation mode 15' from the remote attestation mode 11', and generates a NETCONF configuration message or a negotiation decision message, where the NETCONF configuration message or the negotiation decision message is used to indicate the remote attestation mode 15' supported by the relaying party.

Operation 3805: The relaying party sends the NETCONF configuration message or the negotiation decision message to the attester, where the NETCONF configuration message or the negotiation decision message carries the remote attestation mode 15'.

Operation 3806: The attester sends a NETCONF configuration feedback or a negotiation decision feedback to the relaying party.

In this way, remote attestation mode renegotiation between the attester and the relaying party is implemented after the remote attestation mode supported by the relaying party changes, thereby ensuring accuracy and reliability of subsequent remote attestation.

In a fourth example, for the negotiation initiated by the attester to the relaying party, refer to FIG. 39. The NETCONF protocol-based remote attestation mode negotiation method provided in the embodiments of this application may include operation 3901 to operation 3903.

Operation 3901: The attester sends a NETCONF query request message or a negotiation notification message to the relaying party.

Operation 3902: The relaying party sends a NETCONF query feedback or a negotiation notification feedback to the attester, where the NETCONF query feedback or the negotiation notification feedback is used to indicate a remote attestation mode 16', and the remote attestation mode 16' is a remote attestation mode supported by the relaying party.

Operation 3903: The attester determines a remote attestation mode 17' from the remote attestation mode 16', and generates a NETCONF configuration message or a negotiation decision message, where the NETCONF configuration message or the negotiation decision message is used to indicate the remote attestation mode 17' supported by the attester.

Operation 3904: The attester sends the NETCONF configuration message or the negotiation decision message to the relaying party, where the NETCONF configuration message or the negotiation decision message carries the remote attestation mode 17'.

Operation 3905: The relaying party sends a NETCONF configuration feedback or a negotiation decision feedback to the attester.

Similar to the case in which remote attestation is performed between the attester and the relaying party in the mode in FIG. 7 after remote attestation mode negotiation is performed in the negotiation mode in FIG. 4, for a process of performing remote attestation between the attester and the relaying party after remote attestation mode negotiation is performed in the negotiation mode in FIG. 39, refer to related descriptions in the embodiment corresponding to FIG. 7. Details are not described herein again.

In some implementations, to ensure remote attestation accuracy, once the remote attestation mode supported by either of the relaying party and the attester changes, the relaying party and the attester need to renegotiate to determine a remote attestation mode used during remote attestation.

When the relaying party is upgraded, the remote attestation mode supported by the relaying party is very likely to change. In this case, the following two examples are used to describe the process of renegotiation between the attester and the relaying party.

Figure 40:
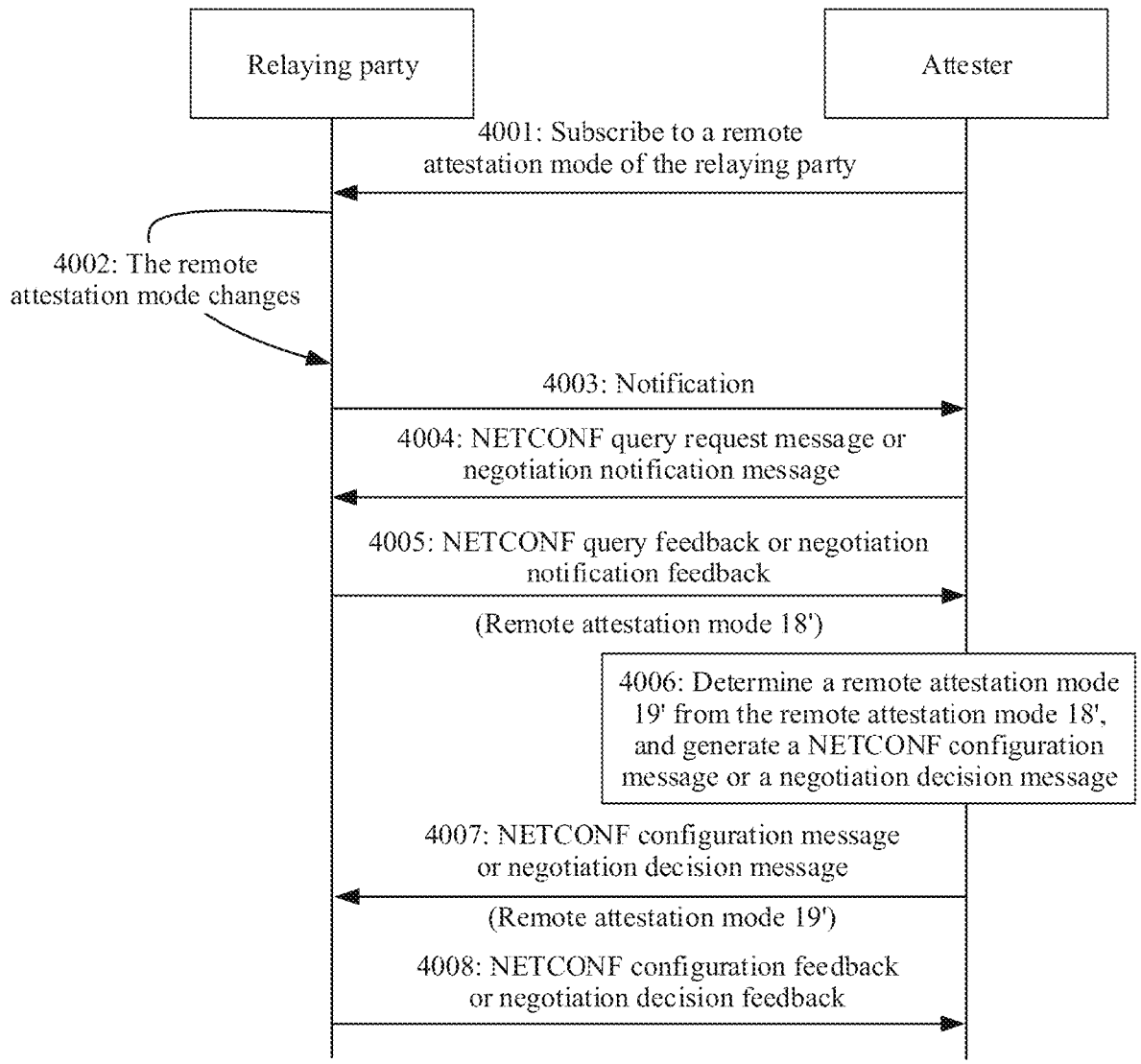
FIG. 40 is a signaling flowchart of another NETCONF protocol-based negotiation method according to an embodiment of this application.

In a first example, as shown in FIG. 40, the relaying party may notify the attester that a remote attestation mode change event occurs on the relaying party corresponding to the attester, and then the attester initiates remote attestation mode renegotiation. During implementation, the method may include the following operations.

Operation 4001: The attester subscribes to a remote attestation mode of the relaying party from the relaying party by using a mechanism such as a NETCONF notification.

Operation 4002: The remote attestation mode of the relaying party changes.

Operation 4003: The relaying party sends a notification to the attester.

In one case, the notification is only used to notify the attester of the event that the remote attestation mode supported by the relaying party changes. In this case, operation 4004 and operation 4005 need to be performed to query a changed remote attestation mode supported by the relaying party.

In another case, the notification may carry a changed remote attestation mode supported by the relaying party or indicate changed content. In this case, operation 4004 and operation 4005 are optional operations, and may be performed to determine the changed remote attestation mode supported by the relaying party. Alternatively, operation 4004 and operation 4005 may not be performed, but operation 4006 is directly performed for determining.

Operation 4004: The attester sends a NETCONF query request message or a negotiation notification message to the relaying party.

Operation 4005: The relaying party sends a NETCONF query feedback or a negotiation notification feedback to the attester, where the NETCONF query feedback or the negotiation notification feedback is used to indicate a remote attestation mode 18', and the remote attestation mode 18' is a remote attestation mode supported by the relaying party.

Operation 4006: The attester determines a remote attestation mode 19' from the remote attestation mode 18', and generates a NETCONF configuration message or a negotiation decision message, where the NETCONF configuration message or the negotiation decision message is used to indicate the remote attestation mode 19' supported by the attester.

Operation 4007: The attester sends the NETCONF configuration message or the negotiation decision message to the relaying party, where the NETCONF configuration message or the negotiation decision message carries the remote attestation mode 19'.

Operation 4008: The relaying party sends a NETCONF configuration feedback or a negotiation decision feedback to the attester.

Figure 41:
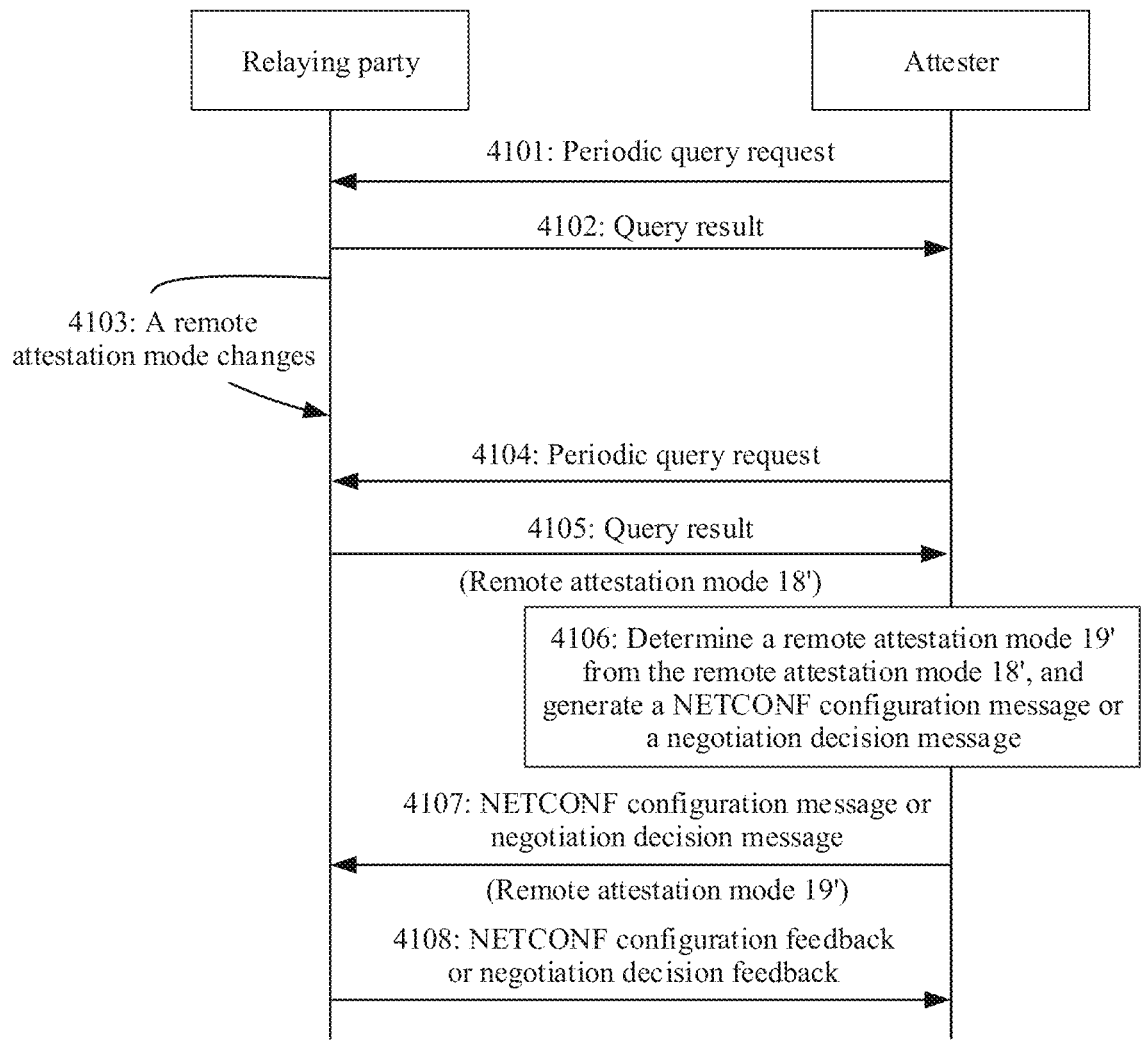
FIG. 41 is a signaling flowchart of still another NETCONF protocol-based negotiation method according to an embodiment of this application.

In a second example, as shown in FIG. 41, if the attester periodically queries a remote attestation mode supported by the relaying party, the attester may perform renegotiation by querying a remote attestation mode in a next period. During implementation, the method may include the following operations.

Operation 4101: The attester sends a periodic query request to the relaying party.

Operation 4102: The relaying party returns a query result to the attester.

It should be noted that the query result may include a remote attestation mode currently supported by the relaying party, or status information about whether a remote attestation mode changes. When the query result indicates that the remote attestation mode supported by the relaying party remains unchanged, no renegotiation is required, that is, the attester does not need to re-determine a new remote attestation mode. When the query result indicates that the remote attestation mode supported by the relaying party changes, operations similar to operation 3903 to operation 3905 in FIG. 39 need to be performed for re-determining.

Operation 4103: The remote attestation mode of the relaying party changes.

Operation 4104: In a next period, the attester sends a periodic query request to the relaying party.

Operation 4105: The relaying party returns a query result to the attester, where the query result includes a changed remote attestation mode 18' supported by the relaying party.

Operation 4106: The attester determines a remote attestation mode 19' from the remote attestation mode 18', and generates a NETCONF configuration message or a negotiation decision message, where the NETCONF configuration message or the negotiation decision message is used to indicate the remote attestation mode 19' supported by the attester.

Operation 4107: The attester sends the NETCONF configuration message or the negotiation decision message to the relaying party, where the NETCONF configuration message or the negotiation decision message carries the remote attestation mode 19'.

Operation 4108: The relaying party sends a NETCONF configuration feedback or a negotiation decision feedback to the attester.

In this way, in the foregoing two examples, remote attestation mode renegotiation between the relaying party and the attester is implemented after the remote attestation mode supported by the relaying party changes, thereby ensuring accuracy and reliability of subsequent remote attestation.

Figure 42:
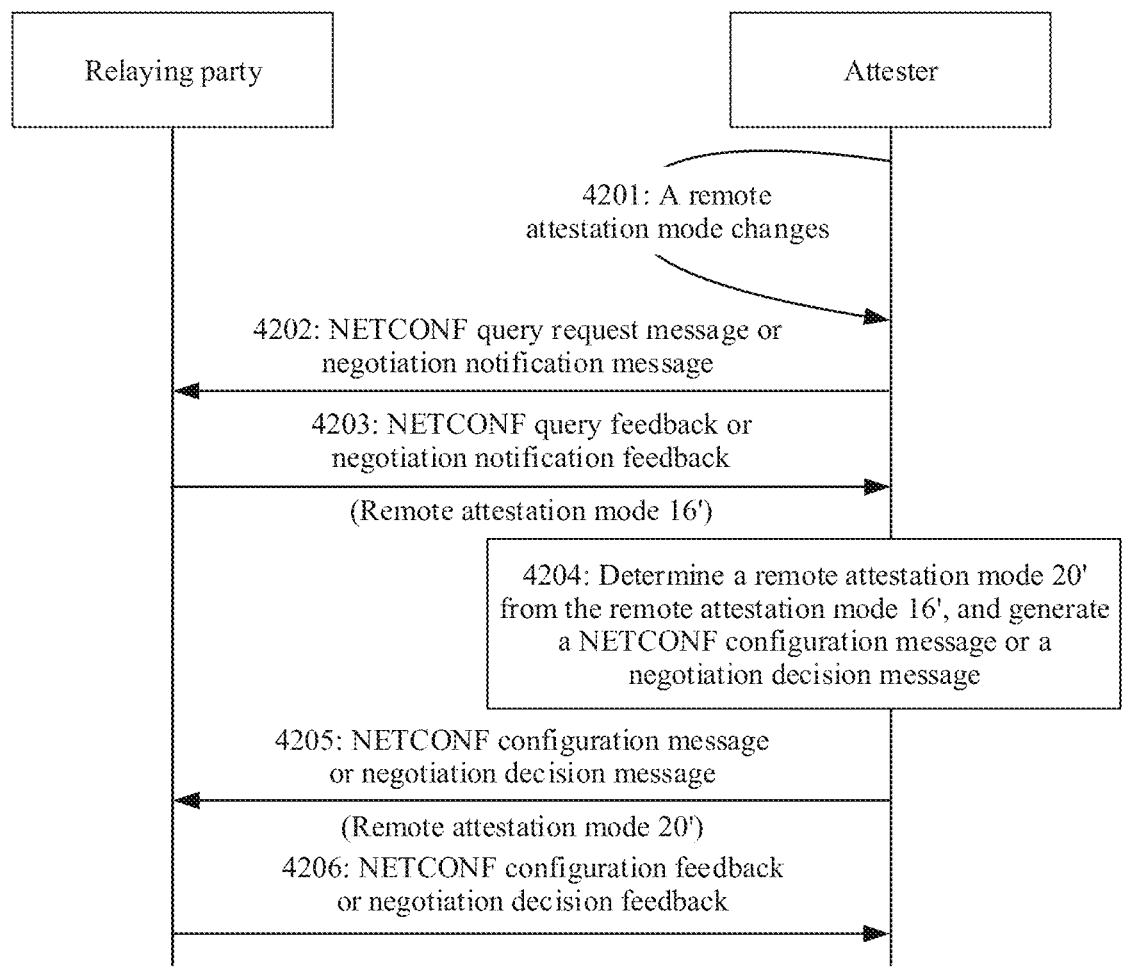
FIG. 42 is a signaling flowchart of yet another NETCONF protocol-based negotiation method according to an embodiment of this application.

When the attester is upgraded, the remote attestation mode supported by the attester is very likely to change. In this case, as shown in FIG. 42, the attester may actively initiate remote attestation mode renegotiation. During implementation, the method may include the following operations.

Operation 4201: A remote attestation mode supported by the attester changes.

Operation 4202: The attester sends a NETCONF query request message or a negotiation notification message to the relaying party.

It should be noted that, because a remote attestation mode supported by the relaying party remains unchanged, operation 4202 and operation 4203 are optional operations, that is, operation 4204 to operation 4206 may be directly performed for determining without querying the remote attestation mode supported by the relaying party again. Alternatively, operation 4202 and operation 4203 may be performed to re-query a remote attestation mode currently supported by the relaying party, so that the negotiation process is more reliable.

Operation 4203: The relaying party sends a NETCONF query feedback or a negotiation notification feedback to the attester, where the NETCONF query feedback or the negotiation notification feedback is used to indicate a remote attestation mode 16', and the remote attestation mode 16' is a remote attestation mode supported by the relaying party.

Operation 4204: The attester determines a remote attestation mode 20' from the remote attestation mode 16', and generates a NETCONF configuration message or a negotiation decision message, where the NETCONF configuration message or the negotiation decision message is used to indicate the remote attestation mode 20' supported by the attester.

Operation 4205: The attester sends the NETCONF configuration message or the negotiation decision message to the relaying party, where the NETCONF configuration message or the negotiation decision message carries the remote attestation mode 20'.

Operation 4206: The relaying party sends a NETCONF configuration feedback or a negotiation decision feedback to the attester.

In this way, remote attestation mode renegotiation between the relaying party and the attester is implemented after the remote attestation mode supported by the attester changes, thereby ensuring accuracy and reliability of subsequent remote attestation.

It can be learned from the foregoing example descriptions of the NETCONF protocol-based remote attestation mode negotiation method that, in the remote attestation mode negotiation method provided in the embodiments of this application, before remote attestation is performed, automatic negotiation is performed between the to-be-verified network device and the server, so that the to-be-verified network device and the server determine, from remote attestation modes supported by both the to-be-verified network device and the server, a remote attestation mode used to subsequently perform remote attestation between the network device and the server, and there is no need to manually statically configure a remote attestation mode for the network device and the server, thereby greatly reducing labor costs of determining the remote attestation mode. In addition, when there are a large quantity of devices, the automatic remote attestation mode negotiation method also helps configure a remote attestation mode more flexibly. System trustworthiness of remote attestation is one of the conditions for the network device to access a network. The remote attestation mode negotiation method also provides a basis for fast and reliable remote attestation, thereby improving network security.

Based on the scenario shown in FIG. 3, with reference to FIG. 43A and FIG. 43B, a preparation method for the attester to access a network for the first time, such as remote attestation mode negotiation, remote attestation, and identity validity verification in a BRSKI protocol framework, is described in the embodiments of this application. Before the attester accesses the network, at least the following requirements need to be met: Condition 1. BRSKI protocol-based identity verification succeeds. Condition 2. A system of the network device is trustworthy through remote attestation. During implementation, the embodiments may include the following operations.

Condition 1:

Operation 4301: The attester accesses a network for the first time, and executes a BRSKI protocol procedure.

Operation 4302: According to the BRSKI protocol procedure, the attester automatically discovers a relaying party, performs network access authentication by using a certificate of the attester, and executes an enrollment procedure.

Operation 4303: The relaying party receives the certificate of the attester and saves the certificate.

Operation 4304: The relaying party verifies the certificate of the attester with an MASA.

Operation 4305: The MASA returns information such as a voucher of an authorization result and an audit log to the relaying party.

The MASA may be a device that interacts with the verifier 302 in FIG. 3. The MASA may be used in a scenario in which remote attestation is combined with the IETF BRSKI protocol, to implement a function specified in the BRSKI protocol.

Operation 4306: The relaying party forwards the information such as the voucher to the attester, so that the attester verifies identity validity of the relaying party based on the information.

Condition 2: Two parts: remote attestation mode negotiation and remote attestation are included.

Operation 4307: The relaying party queries the attester about a remote attestation mode supported by the attester.

Operation 4308: The attester returns the remote attestation mode supported by the attester to the relaying party.

Operation 4309: The relaying party serves as a relying party and sends the remote attestation mode supported by the attester to the verifier.

Operation 4310: The verifier determines a remote attestation mode configuration to be used by the attester, and then delivers the configuration to the relaying party.

Operation 4311: The relaying party delivers the remote attestation mode configuration to the attester.

Operation 4312: The attester sends measurement information to the relaying party in a configured remote attestation mode.

Operation 4313: The relaying party forwards the measurement information to the verifier.

Operation 4314: The verifier verifies system trustworthiness of the attester in the configured remote attestation mode based on the measurement information, to obtain a attestation result.

Subsequent remote attestation-related operations are performed.

Operation 4315: The attester and the relaying party perform subsequent BRSKI protocol-related operations.

Operation 4316: When the remote attestation mode supported by the attester or the verifier changes, the attester and the verifier perform remote attestation mode renegotiation.

It should be noted that operation 4301 to operation 4306 and operation 4307 to operation 4311 in the foregoing two parts are not subject to a particular sequence. Generally, operation 4301 to operation 4306 and operation 4307 to operation 4311 are performed in the foregoing sequence. However, to save network resources, BRSKI protocol-based identity validity verification is performed first, and system trustworthiness verification on the network device on which remote attestation is to be performed is performed only when the verification succeeds. If the verification fails, remote authentication may not be performed, but the network device is directly prevented from accessing the network. In some cases, system trustworthiness verification on the network device on which remote attestation is to be performed may be performed first, and BRSKI protocol-based identity validity verification is performed only when a attestation result indicates that a system of the network device is trustworthy. When the system is untrustworthy, BRSKI protocol-based identity validity verification may not be performed, but the network device is directly prevented from accessing the network. In other cases, BRSKI protocol-based identity validity verification and system trustworthiness verification on the network device on which remote attestation is to be performed may be performed simultaneously. The network device is allowed to access the network only when the two pieces of verification succeed.

It should be noted that operation 4307 to operation 4311 are a remote attestation mode negotiation process. For implementation, refer to related descriptions in the embodiments corresponding to FIG. 4, FIG. 12, FIG. 17, FIG. 22, FIG. 27, FIG. 31, FIG. 35, and FIG. 39 in this application. For a process of performing remote attestation in the remote attestation mode determined through negotiation in operation 4312 to operation 4314, refer to related descriptions in the embodiment corresponding to FIG. 7 in this application. Operation 4316 is a process of performing renegotiation after the remote attestation mode supported by the verifier and/or the attester changes. For a implementation, refer to related descriptions in the embodiments corresponding to FIG. 8 to FIG. 11, FIG. 13 to FIG. 16, FIG. 18 to FIG. 21, FIG. 23 to FIG. 26, FIG. 28 to FIG. 30, FIG. 32 to FIG. 34, FIG. 36 to FIG. 38, and FIG. 40 to FIG. 42 in this application.

It can be learned that, in the embodiments, remote attestation mode negotiation is combined with the BRSKI protocol procedure, and a process in which the attester accesses the network for the first time is shown. By using the remote attestation mode negotiation method provided in the embodiments of this application, remote attestation on the attester can be more accurate, thereby improving reliability that the attester accesses the network for the first time.

Figure 44:
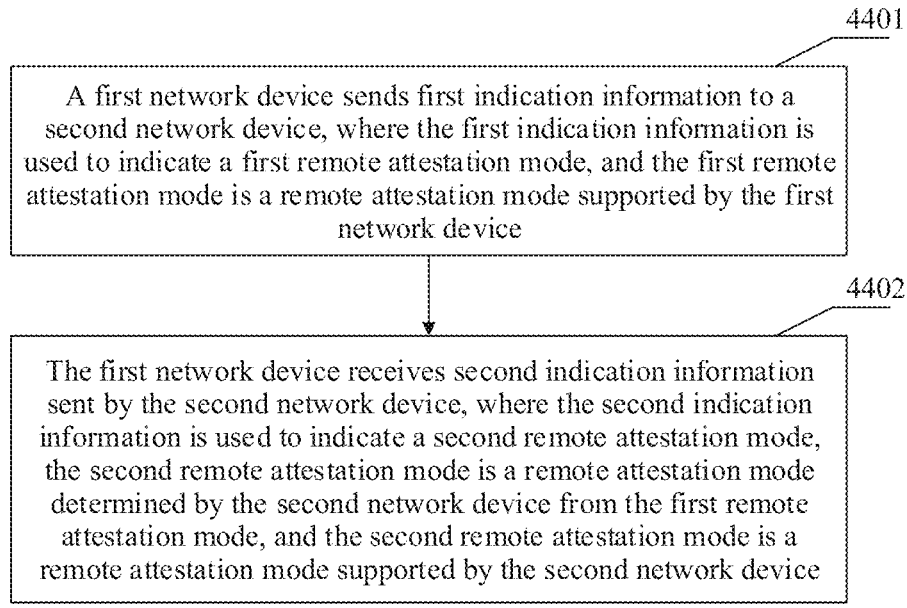
FIG. 44 is a schematic flowchart of a remote attestation mode negotiation method according to an embodiment of this application.

FIG. 44 is a schematic flowchart of a remote attestation mode negotiation method according to an embodiment of this application. Devices that participate in remote negotiation include a first network device and a second network device, and the first network device is used as an execution body. A negotiation process may include the following operations.

Operation 4401: The first network device sends first indication information to the second network device, where the first indication information is used to indicate a first remote attestation mode, and the first remote attestation mode is a remote attestation mode supported by the first network device.

Operation 4402: The first network device receives second indication information sent by the second network device, where the second indication information is used to indicate a second remote attestation mode, the second remote attestation mode is a remote attestation mode determined by the second network device from the first remote attestation mode, and the second remote attestation mode is a remote attestation mode supported by the second network device.

It should be noted that, in one case, the first network device may be a to-be-verified network device Attester, and the second network device may be a verification server Verifier or a relying party Relaying Party. Therefore, for implementations and effects of operation 4401 and operation 4402, refer to related descriptions in the embodiments corresponding to FIG. 4, FIG. 17, FIG. 27, and FIG. 35. In another case, the second network device may be a to-be-verified network device Attester, and the first network device may be a verification server Verifier or a relying party Relaying Party. Therefore, for implementations and effects of operation 4401 and operation 4402, refer to related descriptions in the embodiments corresponding to FIG. 12, FIG. 22, FIG. 31, and FIG. 39.

The first indication information and the second indication information may be sent by using a network configuration NETCONF protocol.

In some implementations, the first remote attestation mode may be described in the first indication information by using an Internet Engineering Task Force Yet Another Next Generation data model IETF YANG Data Model format. Likewise, the second remote attestation mode may be described in the second indication information by using the IETF YANG Data Model format. In one embodiment, the first indication information is carried in a NETCONF protocol-based first YANG data model, and the first YANG data model includes description information of the first remote attestation mode. Likewise, the second indication information is carried in a NETCONF protocol-based second YANG data model, and the second YANG data model includes description information of the second remote attestation mode. For details, refer to related descriptions about the YANG data model used to describe the remote attestation mode in the embodiment shown in FIG. 4.

In other implementations, the first indication information may be carried in a message payload of a first packet and sent by the first network device to the second network device. The second indication information may be carried in a message payload of a second packet and sent by the first network device to the second network device to indicate the second remote attestation mode. In one embodiment, the first remote attestation mode indicated by the first indication information is described by using TLV in the message payload of the first packet. Likewise, the second remote attestation mode indicated by the second indication information is described by using TLV in the message payload of the second packet. It should be noted that, for details, refer to related descriptions of another remote attestation mode in the embodiment shown in FIG. 4, for example, related descriptions of implementations in FIG. 5 and FIG. 6. Details are not described herein again.

In some implementations, after the remote attestation mode is determined through negotiation, remote attestation between the first network device and the second network device may be implemented.

In an example, if the first network device is an attester, and the second network device is a verifier/relaying party, a process of implementing remote attestation between the first network device and the second network device may include: The first network device sends first measurement information to the second network device in the second remote attestation mode, where the first measurement information is used to verify system trustworthiness of the first network device. In this case, the second network device may obtain a attestation result in the second remote attestation mode based on the first measurement information.

It may be understood that the system trustworthiness attestation result of the first network device is used to determine whether the first network device is allowed to access a network. For a preparation process in which the network device accesses the network, refer to related descriptions in the embodiment corresponding to FIG. 43A and FIG. 43B.

In another example, if the second network device is an attester, and the first network device is a verifier, a process of implementing remote attestation between the first network device and the second network device may include: The first network device receives, in the second remote attestation mode, second measurement information sent by the second network device. The first network device verifies system trustworthiness of the second network device in the second remote attestation mode based on the second measurement information. A system trustworthiness attestation result of the second network device is used to determine whether the second network device is allowed to access a network.

In still another example, if the second network device is an attester, and the first network device is a relaying party, a process of implementing remote attestation between the first network device and the second network device may include: The first network device receives, in the second remote attestation mode, third measurement information sent by the second network device. The first network device sends the third measurement information to a third network device, where the third measurement information is used to verify system trustworthiness of the second network device. The third network device is a verifier, and verifies system trustworthiness of the second network device, to obtain a attestation result. The system trustworthiness attestation result of the second network device is used to determine whether the second network device is allowed to access a network.

It should be noted that, for implementations and effects of the method for implementing remote attestation between the first network device and the second network device shown in the following three examples, refer to related descriptions in the embodiment corresponding to FIG. 7.

An occasion for triggering remote attestation mode negotiation may be implemented in three modes.

In one case, in a method for performing negotiation based on the NETCONF protocol or performing negotiation based on another protocol, before operation 4401, the first network device receives third indication information sent by the second network device, to trigger remote attestation mode negotiation. The third indication information is used to indicate the first network device to feed back the first indication information to the second network device. It may be understood that the third indication information may be a remote attestation mode query request or a remote attestation mode negotiation notification.

It should be noted that, for implementations and effects in this case, refer to related descriptions in the embodiments corresponding to FIG. 27, FIG. 31, FIG. 35, and FIG. 39.

In another case, when the remote attestation mode supported by the first network device changes, remote attestation mode negotiation may be triggered. In other words, operation 4401 may be: If the remote attestation mode supported by the first network device changes, the first network device sends the first indication information to the second network device. In this case, the first remote attestation mode is a changed remote attestation mode supported by the first network device. It should be noted that, for implementations and effects in this case, refer to related descriptions in the embodiments corresponding to FIG. 8 to FIG. 11, FIG. 13 to FIG. 16, FIG. 18 to FIG. 21, FIG. 23 to FIG. 26, FIG. 28 to FIG. 30, FIG. 32 to FIG. 34, FIG. 36 to FIG. 38, and FIG. 40 to FIG. 42.

In still another case, the first network device may periodically send the first indication information to the second network device, that is, trigger remote attestation mode negotiation by using a time period. It should be noted that, for implementations and effects in this case, refer to related descriptions in the embodiments corresponding to FIG. 8 to FIG. 11, FIG. 10, FIG. 15, FIG. 20, FIG. 25, FIG. 29, FIG. 33, FIG. 37, and FIG. 41.

To implement remote attestation more accurately, after the first network device and the second network device perform remote attestation mode negotiation, renegotiation may be performed according to a particular mechanism, to ensure that a used remote attestation mode is a currently valid remote attestation mode.

In an example, operation 4401 and operation 4402 may be repeatedly performed to implement renegotiation between the first network device and the second network device. A process is not described again.

Figure 45:
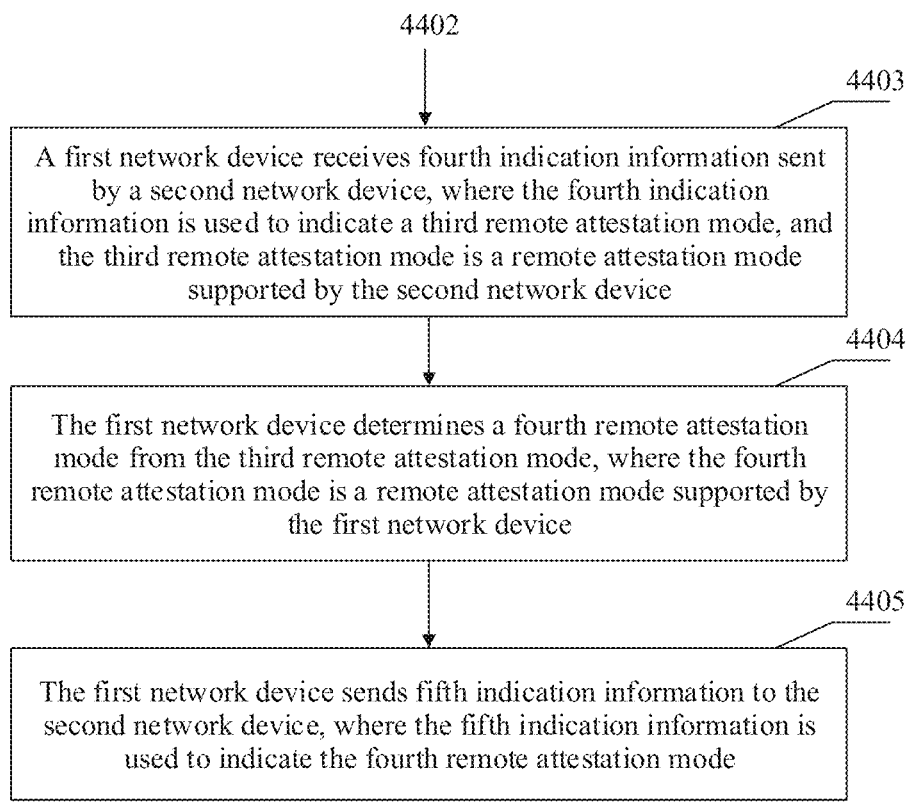
FIG. 45 is a schematic flowchart of another remote attestation mode negotiation method according to an embodiment of this application.

In another example, as shown in FIG. 45, renegotiation may be implemented by using operation 4403 to operation 4405.

Operation 4403: The first network device receives fourth indication information sent by the second network device, where the fourth indication information is used to indicate a third remote attestation mode, and the third remote attestation mode is a remote attestation mode supported by the second network device.

Operation 4404: The first network device determines a fourth remote attestation mode from the third remote attestation mode, where the fourth remote attestation mode is a remote attestation mode supported by the first network device.

Operation 4405: The first network device sends fifth indication information to the second network device, where the fifth indication information is used to indicate the fourth remote attestation mode.

In one case, an occasion for triggering renegotiation may be: Before operation 4403, the following operation is performed: The first network device sends sixth indication information to the second network device, where the sixth indication information is used to indicate the second network device to feed back the fourth indication information to the first network device. In another case, operation 4403 may be performed when the remote attestation mode supported by the first network device changes. In still another case, the first network device may periodically send sixth indication information to the second network device, to trigger renegotiation.

It should be noted that, for concepts and related descriptions of the third remote attestation mode, the fourth remote attestation mode, the fourth indication information, and the fifth indication information in operation 4403 to operation 4405, refer to related descriptions of the first remote attestation mode, the second remote attestation mode, the first indication information, and the second indication information in the foregoing embodiments. Details are not described herein again.

It should be noted that, for implementations and effects of performing renegotiation by using operation 4403 to operation 4405, refer to related descriptions in the embodiments corresponding to FIG. 4 and FIG. 8 to FIG. 42 in this application.

Figure 46:
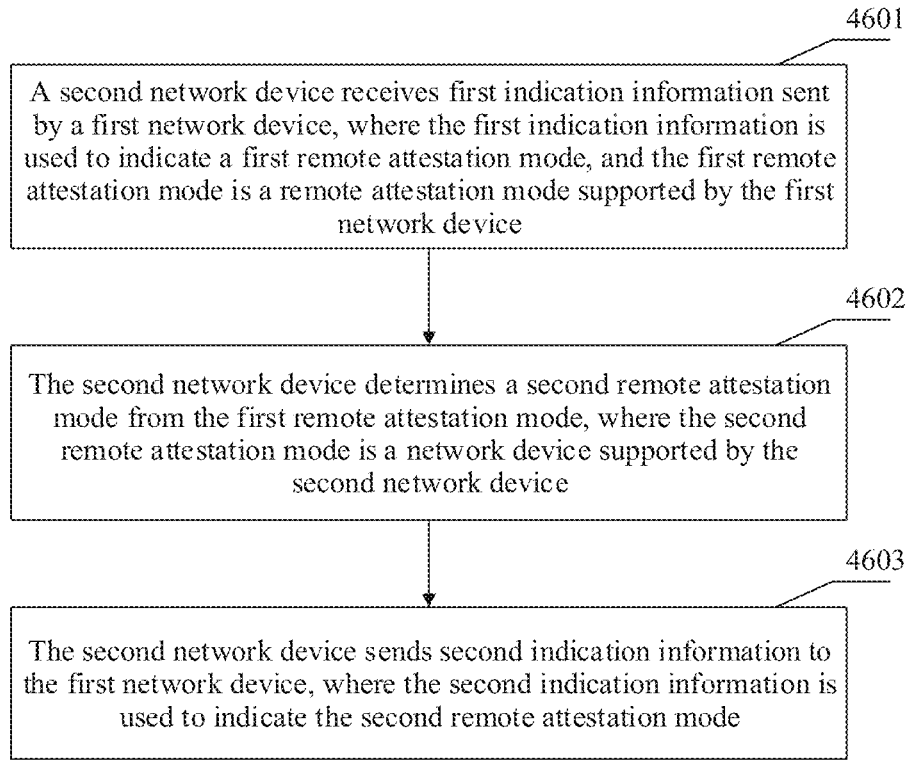
FIG. 46 is a schematic flowchart of a remote attestation mode negotiation method according to an embodiment of this application.

FIG. 46 is a schematic flowchart of a remote attestation mode negotiation method according to an embodiment of this application. Devices that participate in remote negotiation include a first network device and a second network device, and the second network device is used as an execution body. A negotiation process may include the following operations.

Operation 4601: The second network device receives first indication information sent by the first network device, where the first indication information is used to indicate a first remote attestation mode, and the first remote attestation mode is a remote attestation mode supported by the first network device.

Operation 4602: The second network device determines a second remote attestation mode from the first remote attestation mode, where the second remote attestation mode is a network device supported by the second network device.

Operation 4603: The second network device sends second indication information to the first network device, where the second indication information is used to indicate the second remote attestation mode.

The first indication information and the second indication information are sent by using a network configuration NETCONF protocol.

It may be understood that the first remote attestation mode may be described in the first indication information by using an Internet Engineering Task Force Yet Another Next Generation data model (IETF YANG) Data Model format. Likewise, the second remote attestation mode may be described in the second indication information by using the IETF YANG Data Model format. Alternatively, the first indication information may be carried in a message payload of a first packet and sent by the first network device to the second network device. Likewise, the second indication information may be carried in a message payload of a second packet and sent by the first network device to the second network device to indicate the second remote attestation mode. For example, TLV in the message payload is used to describe the remote attestation mode.

After the remote attestation mode is determined, a remote attestation process may be: In one case, the second network device sends first measurement information to the first network device in the second remote attestation mode, where the first measurement information is used to verify system trustworthiness of the second network device. A system trustworthiness attestation result of the second network device is used to determine whether the first network device is allowed to access a network. In another case, the second network device receives, in the second remote attestation mode, second measurement information sent by the first network device. The second network device verifies system trustworthiness of the first network device in the second remote attestation mode based on the second measurement information. A system trustworthiness attestation result of the first network device is used to determine whether the first network device is allowed to access a network. In still another case, the second network device receives, in the second remote attestation mode, third measurement information sent by the first network device. The second network device sends the third measurement information to a third network device in the second remote attestation mode, where the third measurement information is used to verify system trustworthiness of the first network device. A system trustworthiness attestation result of the first network device is used to determine whether the first network device is allowed to access a network.

An occasion for triggering negotiation may be implemented in the following three modes: In one case, before operation 4601, the second network device sends third indication information to the first network device, where the third indication information is used to indicate the first network device to feed back the first indication information to the second network device. In another case, operation 4601 may be performed when the remote attestation mode supported by the second network device changes. In still another case, operation 4601 to operation 4603 are periodically performed.

Figure 47:
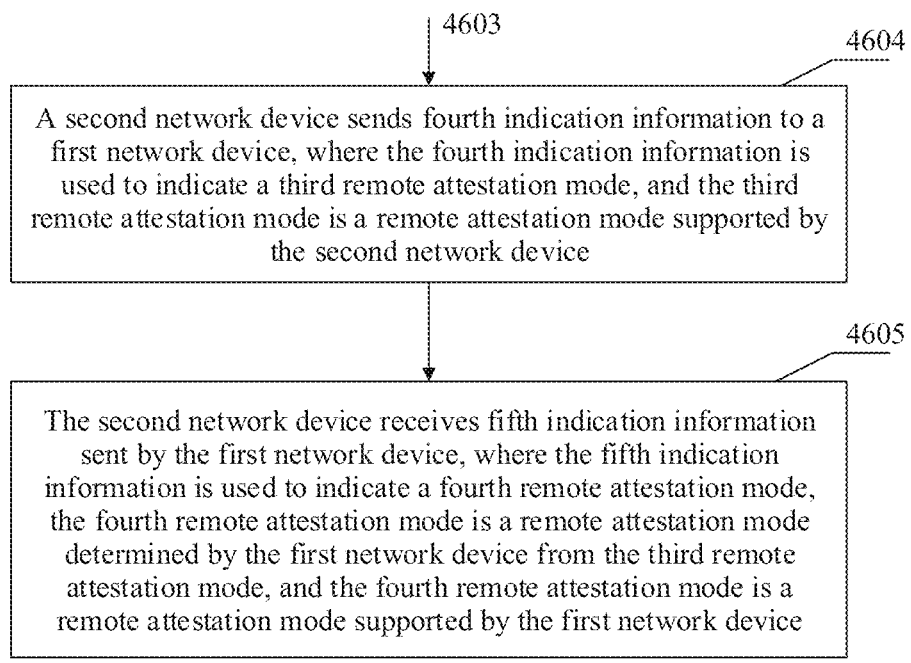
FIG. 47 is a schematic flowchart of another remote attestation mode negotiation method according to an embodiment of this application.

For renegotiation, in an example, to ensure that a more reliable remote attestation mode can be determined through bidirectional verification during renegotiation, renegotiation may be implemented in the mode shown in FIG. 47 after operation 4603.

Operation 4604: The second network device sends fourth indication information to the first network device, where the fourth indication information is used to indicate a third remote attestation mode, and the third remote attestation mode is a remote attestation mode supported by the second network device.

Operation 4605: The second network device receives fifth indication information sent by the first network device, where the fifth indication information is used to indicate the fourth remote attestation mode, the fourth remote attestation mode is a remote attestation mode determined by the first network device from the third remote attestation mode, and the fourth remote attestation mode is a remote attestation mode supported by the first network device.

In one case, an occasion for triggering renegotiation corresponding to FIG. 47 may be: Before operation 4604, the second network device receives sixth indication information sent by the first network device, where the sixth indication information is used to indicate the second network device to feed back the fourth indication information to the first network device. In another case, operation 4604 may be performed when the remote attestation mode supported by the second network device changes. In still another case, operation 4604 and operation 4605 are periodically performed.

It should be noted that, for implementations and effects of the remote attestation mode negotiation process implemented by using operation 4601 to operation 4603 and the remote attestation mode renegotiation process implemented by using operation 4604 and operation 4605, refer to related descriptions in the embodiments corresponding to FIG. 4, FIG. 8 to FIG. 42, FIG. 44, and FIG. 45 in this application.

Figure 48:
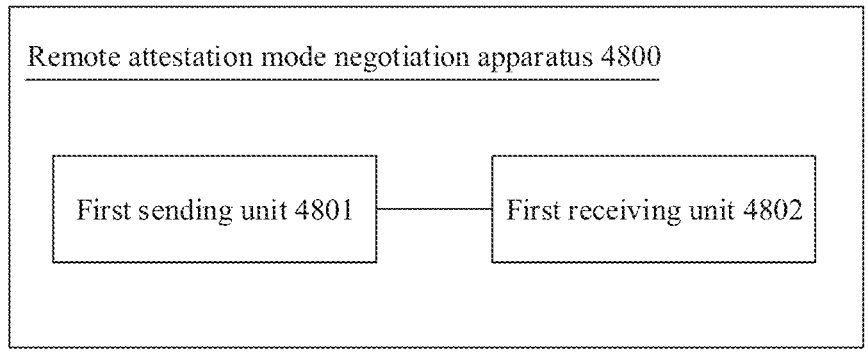
FIG. 48 is a schematic diagram of a structure of a remote attestation mode negotiation apparatus according to an embodiment of this application.

FIG. 48 is a schematic diagram of a structure of a remote attestation mode negotiation apparatus according to an embodiment of this application. The apparatus 4800 is applied to a first network device, and includes a first sending unit 4801 and a first receiving unit 4802.

The first sending unit 4801 is configured to send first indication information to a second network device, where the first indication information is used to indicate a first remote attestation mode, and the first remote attestation mode is a remote attestation mode supported by the first network device.

The first receiving unit 4802 is configured to receive second indication information sent by the second network device, where the second indication information is used to indicate a second remote attestation mode, the second remote attestation mode is a remote attestation mode determined by the second network device from the first remote attestation mode, and the second remote attestation mode is a remote attestation mode supported by the second network device.

In a implementation, the apparatus 4800 further includes a second sending unit. The second sending unit is configured to send first measurement information to the second network device in the second remote attestation mode, where the first measurement information is used to verify system trustworthiness of the first network device. A system trustworthiness attestation result of the first network device is used to determine whether the first network device is allowed to access a network.

In another implementation, the apparatus 4800 further includes a second receiving unit and a first processing unit. The second receiving unit is configured to receive, in the second remote attestation mode, second measurement information sent by the second network device. The first processing unit is configured to verify system trustworthiness of the second network device in the second remote attestation mode based on the second measurement information. A system trustworthiness attestation result of the second network device is used to determine whether the second network device is allowed to access a network.

In still another implementation, the apparatus 4800 further includes a third receiving unit and a third sending unit. The third receiving unit is configured to receive, in the second remote attestation mode, third measurement information sent by the second network device. The third sending unit is configured to send the third measurement information to a third network device, where the third measurement information is used to verify system trustworthiness of the second network device. A system trustworthiness attestation result of the second network device is used to determine whether the second network device is allowed to access a network.

In yet another implementation, the apparatus 4800 may further include a fourth receiving unit. The fourth receiving unit is configured to: before the first indication information is sent to the second network device, receive third indication information sent by the second network device, where the third indication information is used to indicate the first network device to feed back the first indication information to the second network device.

In still yet another implementation, the first sending unit 4801 in the apparatus 4800 may be configured to: if the remote attestation mode supported by the first network device changes, send the first indication information to the second network device, where the first remote attestation mode is a changed remote attestation mode supported by the first network device. Alternatively, the first sending unit 4801 may be configured to periodically send the first indication information to the second network device.

In a further implementation, the apparatus 4800 may further include a fifth receiving unit, a second processing unit, and a fourth sending unit. The fifth receiving unit is configured to receive fourth indication information sent by the second network device, where the fourth indication information is used to indicate a third remote attestation mode, and the third remote attestation mode is a remote attestation mode supported by the second network device. The second processing unit is configured to determine a fourth remote attestation mode from the third remote attestation mode, where the fourth remote attestation mode is a remote attestation mode supported by the first network device. The fourth sending unit is configured to send fifth indication information to the second network device, where the fifth indication information is used to indicate the fourth remote attestation mode.

In a still further implementation, the apparatus 4800 may further include a fifth sending unit. The fifth sending unit is configured to send sixth indication information to the second network device before the fourth indication information sent by the second network device is received, wherein the sixth indication information is used to indicate the second network device to feed back the fourth indication information to the first network device. The fifth sending unit may be configured to: if the remote attestation mode supported by the first network device changes, send the sixth indication information to the second network device. Alternatively, the fifth sending unit may be configured to periodically send the sixth indication information to the second network device.

It may be understood that the first indication information and the second indication information are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

It should be noted that the apparatus 4800 is applied to the first network device, and corresponds to the method applied to the first network device provided in the embodiment corresponding to FIG. 44. Therefore, for various implementations and technical effects of the apparatus 4800, refer to related descriptions in the embodiment corresponding to FIG. 44.

Figure 49:
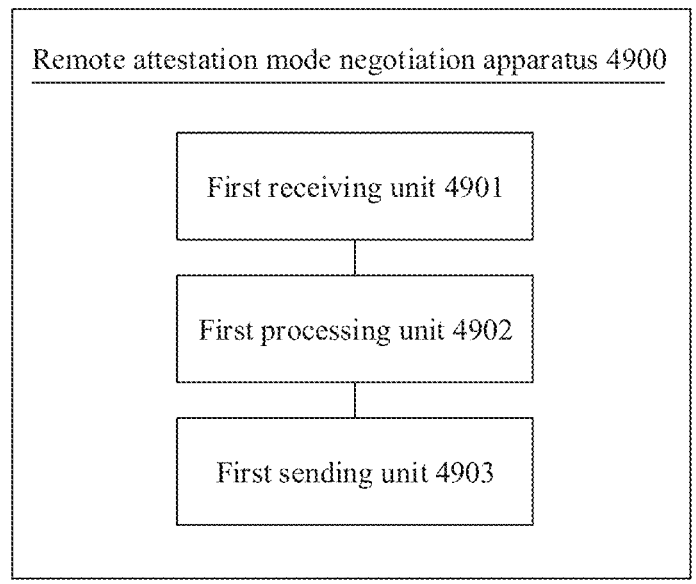
FIG. 49 is a schematic diagram of a structure of another remote attestation mode negotiation apparatus according to an embodiment of this application.

FIG. 49 is a schematic diagram of a structure of a remote attestation mode negotiation apparatus according to an embodiment of this application. The apparatus 4900 is applied to a second network device, and includes a first receiving unit 4901, a first processing unit 4902, and a first sending unit 4903.

The first receiving unit 4901 is configured to receive first indication information sent by a first network device, where the first indication information is used to indicate a first remote attestation mode, and the first remote attestation mode is a remote attestation mode supported by the first network device.

The first processing unit 4902 is configured to determine a second remote attestation mode from the first remote attestation mode, where the second remote attestation mode is a network device supported by the second network device.

The first sending unit 4903 is configured to send second indication information to the first network device, where the second indication information is used to indicate the second remote attestation mode.

In a implementation, the apparatus 4900 may further include a second sending unit. The second sending unit is configured to send first measurement information to the first network device in the second remote attestation mode, where the first measurement information is used to verify system trustworthiness of the second network device. A system trustworthiness attestation result of the second network device is used to determine whether the first network device is allowed to access a network.

In another implementation, the apparatus 4900 may further include a second receiving unit and a second processing unit. The second receiving unit is configured to receive, in the second remote attestation mode, second measurement information sent by the first network device. The second processing unit is configured to verify system trustworthiness of the first network device in the second remote attestation mode based on the second measurement information. A system trustworthiness attestation result of the first network device is used to determine whether the first network device is allowed to access a network.

In still another implementation, the apparatus 4900 may further include a third receiving unit and a third sending unit. The third receiving unit is configured to receive, in the second remote attestation mode, third measurement information sent by the first network device. The third sending unit is configured to send the third measurement information to a third network device in the second remote attestation mode, where the third measurement information is used to verify system trustworthiness of the first network device. A system trustworthiness attestation result of the first network device is used to determine whether the first network device is allowed to access a network.

In yet another implementation, the apparatus 4900 may further include a fourth sending unit. The fourth sending unit is configured to send third indication information to the first network device, where the third indication information is used to indicate the first network device to feed back the first indication information to the second network device. The fourth sending unit may be configured to: if the remote attestation mode supported by the second network device changes, send the third indication information to the first network device. Alternatively, the fourth sending unit may be configured to periodically send the third indication information to the first network device.

In still yet another implementation, the apparatus 4900 may further include a fifth sending unit and a fourth receiving unit. The fifth sending unit is configured to send fourth indication information to the first network device, where the fourth indication information is used to indicate a third remote attestation mode, and the third remote attestation mode is a remote attestation mode supported by the second network device. The fourth receiving unit is configured to receive fifth indication information sent by the first network device, where the fifth indication information is used to indicate the fourth remote attestation mode, the fourth remote attestation mode is a remote attestation mode determined by the first network device from the third remote attestation mode, and the fourth remote attestation mode is a remote attestation mode supported by the first network device.

In a further implementation, the apparatus 4900 may further include a fifth receiving unit. The fifth receiving unit is configured to: before the fourth indication information is sent to the first network device, receive sixth indication information sent by the first network device, where the sixth indication information is used to indicate the second network device to feed back the fourth indication information to the first network device.

In a still further implementation, the fifth sending unit in the apparatus 4900 may be configured to: if the remote attestation mode supported by the second network device changes, send the fourth indication information to the first network device, where the third remote attestation mode is a changed remote attestation mode supported by the second network device. Alternatively, the fifth sending unit may be configured to periodically send the fourth indication information to the first network device.

It may be understood that the first indication information and the second indication information are sent by using a network configuration (NETCONF) protocol. The first remote attestation mode may be described in the first indication information by using an Internet Engineering Task Force Yet Another Next Generation data model (IETF YANG) Data Model format. The second remote attestation mode may be described in the second indication information by using the IETF YANG Data Model format. The first indication information may be carried in a message payload of a first packet and sent by the first network device to the second network device. The second indication information may be carried in a message payload of a second packet and sent by the first network device to the second network device to indicate the second remote attestation mode.

It should be noted that the apparatus 4900 is applied to the second network device, and corresponds to the method applied to the second network device provided in the embodiment corresponding to FIG. 46. Therefore, for various implementations and technical effects of the apparatus 4900, refer to related descriptions in the embodiment corresponding to FIG. 46.

Figure 50:
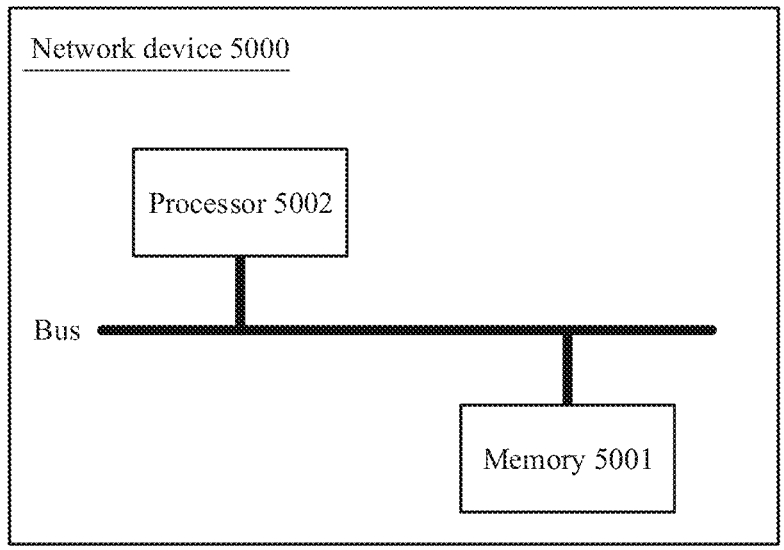
FIG. 50 is a schematic diagram of a structure of a network device according to an embodiment of this application.
Figure 51:
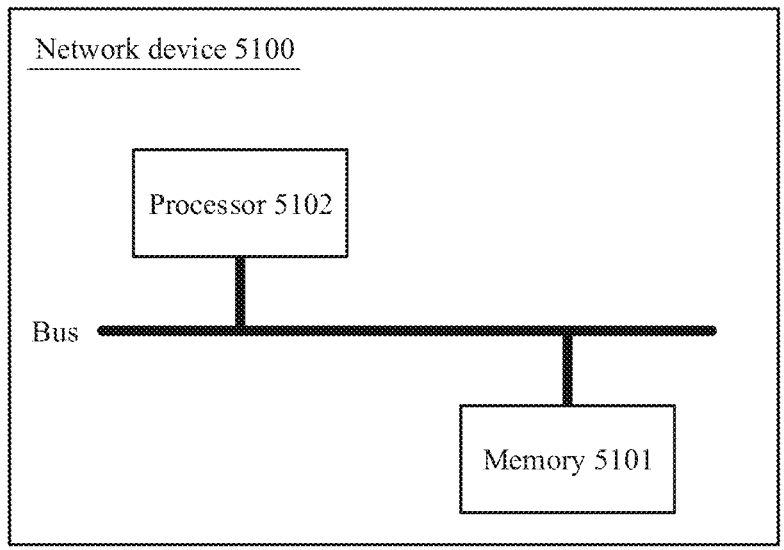
FIG. 51 is a schematic diagram of a structure of another network device according to an embodiment of this application.

In addition, an embodiment of this application further provides a network device 5000. As shown in FIG. 50, the network device 5000 includes a memory 5001 and a processor 5002.

The memory 5001 is configured to store program code.

The processor 5002 is configured to run instructions in the program code, so that the network device 5000 performs the remote attestation mode negotiation method in any implementation in the embodiment corresponding to FIG. 44.

In addition, an embodiment of this application further provides a network device 5100. The network device 5100 includes a memory 5101 and a processor 5102.

The memory 5101 is configured to store program code.

The processor 5102 is configured to run instructions in the program code, so that the network device 5100 performs the remote attestation mode negotiation method in any implementation in the embodiment corresponding to FIG. 46.

In addition, an embodiment of this application further provides a computer program product. When the computer program product is run on a computer, the computer is enabled to perform the remote attestation mode negotiation method in any implementation.

In addition, an embodiment of this application further provides a computer-readable storage medium. The computer-readable storage medium stores instructions, and when the instructions are run on a computer, the computer is enabled to perform the remote attestation mode negotiation method in any implementation.

"First" in names such as "the first network device" and "the first indication information" mentioned in the embodiments of this application is merely used as a name identifier, and does not represent first in sequence. This rule is also applicable to "second" and the like.

It can be learned from the foregoing descriptions of the implementations that, a person skilled in the art may clearly understand that all or some operations of the methods in the foregoing embodiments may be implemented by software and a universal hardware platform. Based on such an understanding, the technical solutions of this application may be implemented in a form of a software product. The computer software product may be stored in a storage medium, for example, a read-only memory (ROM)/RAM, a magnetic disk, or an optical disc, and include several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and device embodiments are basically similar to a method embodiment, and therefore is described briefly. For related parts, refer to partial descriptions in the method embodiment. The described device and apparatus embodiments are merely examples. The modules described as separate parts may or may not be physically separate, and parts displayed as modules may or may not be physical modules, may be located in one position, or may be distributed on a plurality of network units. Some or all the modules may be selected based on actual needs to achieve the objectives of the solutions of the embodiments. A person of ordinary skill in the art may understand and implement the embodiments without creative efforts.

The foregoing descriptions are merely example implementations of this application, but are not intended to limit the protection scope of this application.

What is claimed is:

1. A remote attestation mode negotiation method comprising:
   sending, by a first network device, first indication information to a second network device, wherein the first indication information indicates a first remote attestation mode supported by the first network device; and
   receiving, by the first network device, second indication information sent by the second network device, wherein the second indication information indicates a second remote attestation mode supported by the second network device, wherein the second remote attestation mode is determined by the second network device based on the first remote attestation mode and to be performed in the first network device.

2. The method according to claim 1, further comprising:
   sending, by the first network device, first measurement information to the second network device in the second remote attestation mode to verify system trustworthiness of the first network device.

3. The method according to claim 1, further comprising:
   receiving, by the first network device in the second remote attestation mode, second measurement information sent by the second network device; and
   verifying, by the first network device, system trustworthiness of the second network device in the second remote attestation mode based on the second measurement information.

4. The method according to claim 1, further comprising:
   receiving, by the first network device in the second remote attestation mode, third measurement information sent by the second network device; and
   sending, by the first network device, the third measurement information to a third network device to verify system trustworthiness of the second network device.

5. The method according to claim 1, wherein before the sending, by a first network device, first indication information to a second network device, the method further comprises:
   receiving, by the first network device, third indication information sent by the second network device, wherein
   the third indication information indicates the first network device is to feed back the first indication information to the second network device.

6. The method according to claim 1, wherein the sending, by a first network device, first indication information to a second network device comprises:
   when the remote attestation mode supported by the first network device changes, sending, by the first network device, the first indication information to the second network device, wherein
   the first remote attestation mode is a changed remote attestation mode supported by the first network device.

7. A remote attestation mode negotiation apparatus, applied to a first network device, comprising:
   a memory comprising instructions;
   a processor coupled to the memory, the instructions when executed by the processor, cause the apparatus to:
   send first indication information to a second network device, wherein the first indication information indicates a first remote attestation mode supported by the first network device; and
   receive second indication information sent by the second network device, wherein the second indication information indicates a second remote attestation mode supported by the second network device, wherein the second remote attestation mode is determined by the second network device based on the first remote attestation mode, and to be performed in the first network device.

8. The apparatus according to claim 7, wherein the instructions further cause the apparatus to:
   send first measurement information to the second network device in the second remote attestation mode to verify system trustworthiness of the first network device.

9. The apparatus according to claim 7, wherein the instructions further cause the apparatus to:
   receive, in the second remote attestation mode, second measurement information sent by the second network device; and
   verify system trustworthiness of the second network device in the second remote attestation mode based on the second measurement information.

10. The apparatus according to claim 7, wherein the instructions further cause the apparatus to:
    receive, in the second remote attestation mode, third measurement information sent by the second network device; and
    send the third measurement information to a third network device to verify system trustworthiness of the second network device.

11. The apparatus according to claim 7, wherein the instructions further cause the apparatus to:
    before sending the first indication information, receive third indication information sent by the second network device, wherein
    the third indication information indicates the first network device is to feed back the first indication information to the second network device.

12. The apparatus according to claim 7, wherein the instructions further cause the apparatus to:
    when the remote attestation mode supported by the first network device changes, send the first indication information to the second network device, wherein
    the first remote attestation mode is a changed remote attestation mode supported by the first network device.

13. A remote attestation mode negotiation apparatus, applied to a second network device, comprising:

a memory comprising instructions;
a processor coupled to the memory, the instructions when executed by the processor, cause the apparatus to:
receive first indication information sent by a first network device, wherein the first indication information indicates a first remote attestation mode supported by the first network device;
send second indication information to the first network device, wherein the second indication information indicates a second remote attestation mode supported by the second network device, wherein the second remote attestation mode is determined based on the first remote attestation mode, and to be performed in the first network device.

14. The apparatus according to claim 13, wherein the instructions further cause the apparatus to:
send first measurement information to the first network device in the second remote attestation mode to verify system trustworthiness of the second network device.

15. The apparatus according to claim 13, wherein the instructions further cause the apparatus to:
receive, in the second remote attestation mode, second measurement information sent by the first network device; and
verify system trustworthiness of the first network device in the second remote attestation mode based on the second measurement information.

16. The apparatus according to claim 13, wherein the instructions further cause the apparatus to:
receive, in the second remote attestation mode, third measurement information sent by the first network device; and
send the third measurement information to a third network device in the second remote attestation mode to verify system trustworthiness of the first network device.

17. The apparatus according to claim 13, wherein the instructions further cause the apparatus to:
send third indication information to the first network device, wherein
the third indication information indicates the first network device is to feed back the first indication information to the second network device.

18. The apparatus according to claim 17, wherein the instructions further cause the apparatus to:
if the remote attestation mode supported by the second network device changes, send the third indication information to the first network device.

19. The apparatus according to claim 13, wherein the first indication information and the second indication information are sent by using a network configuration (NETCONF) protocol.

20. The apparatus according to claim 13, wherein
the first indication information is carried in a message payload of a first packet and sent by the first network device to the second network device; and
the second indication information is carried in a message payload of a second packet and sent by the first network device to the second network device to indicate the second remote attestation mode.

* * * * *